(12) United States Patent
Inaji et al.

(10) Patent No.: US 6,950,274 B2
(45) Date of Patent: Sep. 27, 2005

(54) DISK STORAGE APPARATUS AND DISK STORAGE APPARATUS CONTROL METHOD

(75) Inventors: Toshio Inaji, Osaka (JP); Hiroshi Kohso, Osaka (JP); Keizo Miyata, Osaka (JP); Makoto Umeda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 141 days.

(21) Appl. No.: 10/305,366

(22) Filed: Nov. 27, 2002

(65) Prior Publication Data

US 2003/0123182 A1 Jul. 3, 2003

(30) Foreign Application Priority Data

Nov. 28, 2001 (JP) .................................... P2001-362719
May 10, 2002 (JP) .................................... P2002-135121

(51) Int. Cl.[7] .............................................. G11B 5/596
(52) U.S. Cl. ................................ 360/78.14; 360/77.04
(58) Field of Search ......................... 360/78.14, 77.04, 360/31, 69, 77.03, 78.04, 78.09

(56) References Cited

U.S. PATENT DOCUMENTS

| | | | |
|---|---|---|---|
| 4,246,536 A | | 1/1981 | Bradley et al. |
| 4,679,103 A | | 7/1987 | Workman |
| 4,947,093 A | | 8/1990 | Dunstan et al. |
| 4,954,905 A | * | 9/1990 | Wakabashi et al. ...... 360/77.03 |
| 5,483,438 A | * | 1/1996 | Nishimura ................... 700/29 |
| 5,491,394 A | | 2/1996 | Harwood et al. |
| 5,602,688 A | * | 2/1997 | Yokoyama et al. ........... 360/69 |
| 5,654,840 A | | 8/1997 | Patton et al. |
| 5,781,363 A | | 7/1998 | Rowan et al. |
| 5,844,743 A | | 12/1998 | Funches |
| 5,844,744 A | * | 12/1998 | Suzuki et al. ............ 360/78.09 |
| 5,923,491 A | * | 7/1999 | Kisaka et al. ............ 360/77.04 |
| 5,949,608 A | * | 9/1999 | Hunter .................... 360/78.09 |
| 6,097,564 A | * | 8/2000 | Hunter .................... 360/78.04 |
| 6,359,748 B1 | | 3/2002 | Goker |
| 6,549,349 B2 | * | 4/2003 | Sri-Jayantha et al. ......... 360/31 |
| 6,661,599 B1 | * | 12/2003 | Chen et al. .............. 360/77.04 |

FOREIGN PATENT DOCUMENTS

| | | |
|---|---|---|
| EP | 0 509 545 | 10/1992 |
| EP | 0 735 522 | 10/1996 |
| JP | 05-62385 | 3/1993 |
| JP | 09-231701 | 9/1997 |
| JP | 2714149 | 10/1997 |
| JP | P2996772 | 10/1999 |
| WO | WO 00/68938 | 11/2000 |

* cited by examiner

*Primary Examiner*—David Hudspeth
*Assistant Examiner*—Fred F. Tzeng
(74) *Attorney, Agent, or Firm*—McDermott Will & Emery LLP

(57) ABSTRACT

A disk storage apparatus includes: an actuator positioning a head with respect to a disk; a drive device driving the actuator; a voltage detection device detecting a voltage signal induced in driving the actuator; a disturbance estimation unit estimating the magnitude of load disturbance exerted on the head from a drive signal and the voltage signal, and outputting a disturbance estimation signal; a filter unit cutting off a high frequency component of the disturbance estimation signal, and outputting a filter signal; a position detection unit producing a position error signal corresponding to a current position of the head; a position control unit producing a position control signal based on the position error signal; and a correction unit outputting the drive signal based on the filter signal and the position control signal, and the apparatus controls stable positioning of the head against a resistance value fluctuation of a drive coil of the actuator and a resistance value change.

44 Claims, 24 Drawing Sheets

F I G. 8A
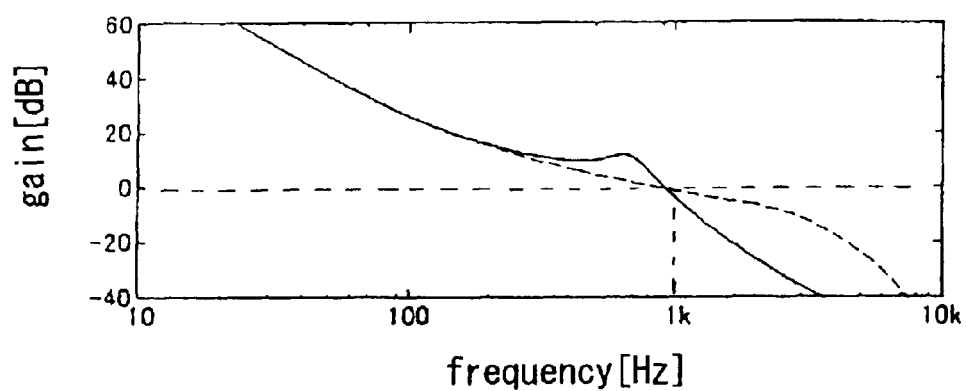
F I G. 8B
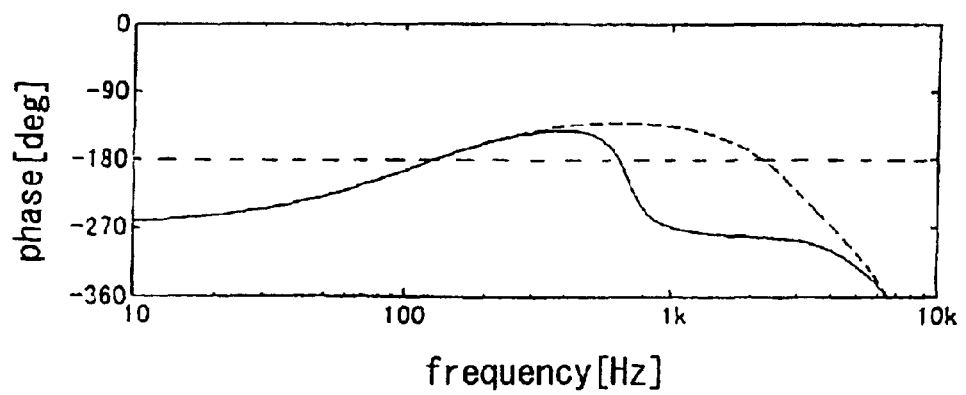

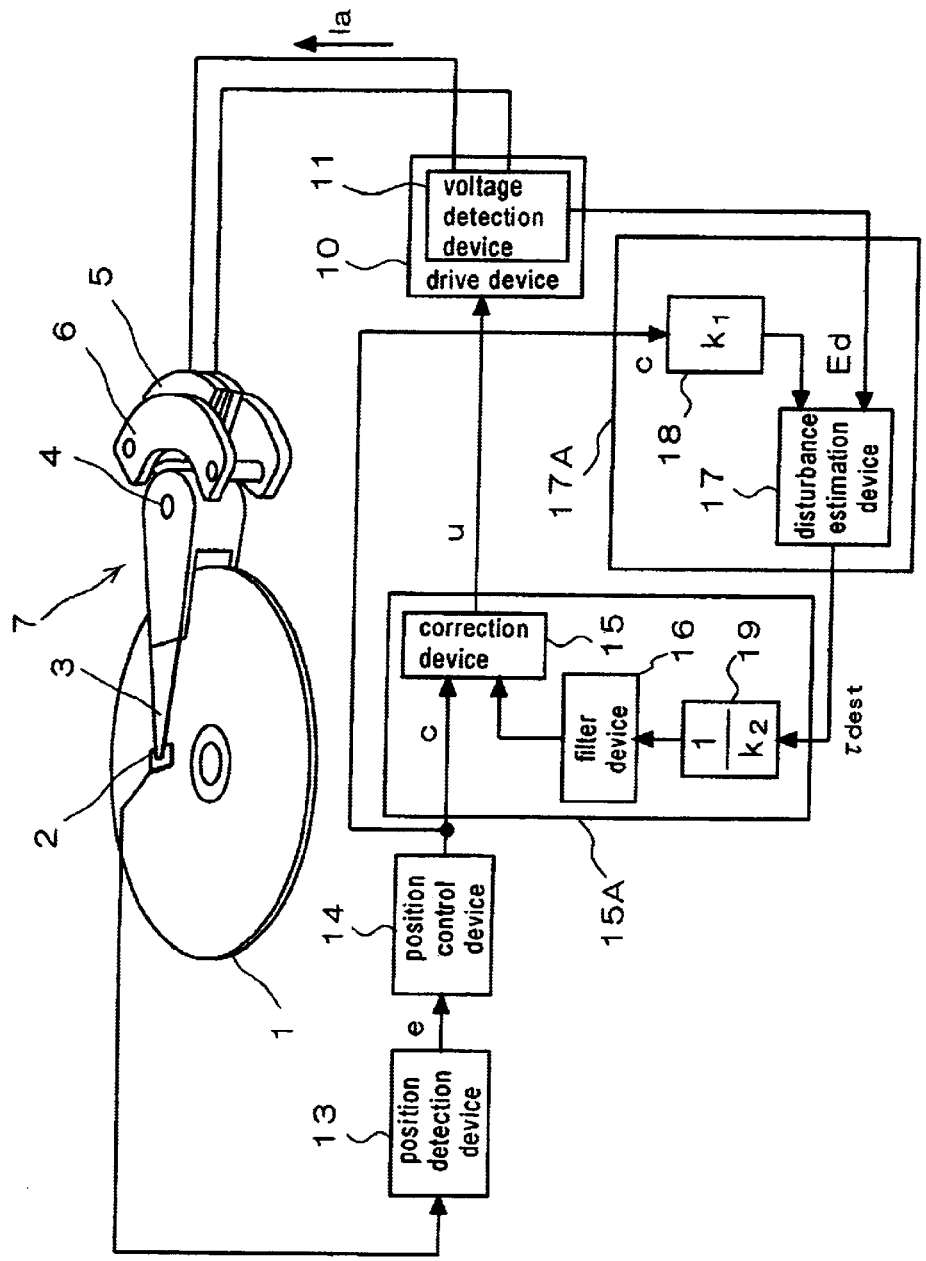

DISK STORAGE APPARATUS AND DISK STORAGE APPARATUS CONTROL METHOD

BACKGROUND OF THE INVENTION

1. Field of the Invention

The present invention relates to a disk storage apparatus for positioning a head to a target track of a disk which serves as a record medium, and to a technique of inhibiting a track dislocation of the head due to a disturbance to which the apparatus is subject.

2. Description of the Related Art

A positioning control system reads servo information previously recorded on a disk using a head, and minimizes a position error signal for a target track. In this case, to improve positioning accuracy, there is known a method of setting control frequency at high level and thereby accelerating track following operation. However, if control frequency is set high, the positioning control system becomes unstable due to the inherent mechanical resonance of the actuator of the head. This results in a limit to the increase of control frequency. Considering this disadvantage, there is proposed reducing a disturbance (such as pivot bearing friction, an elastic force, and an inertia force due to shock/vibration) which acts on the actuator. That is, based on a head position signal obtained from servo information and a drive signal for the actuator, the disturbance is estimated and compensated by feed-forward control. By doing so, head positioning accuracy is improved.

However, the head position signal based on the servo information discretely recorded on the disk is not a continuous signal. A control band in which a disturbance estimation device can estimate a disturbance is affected by the sampling frequency of a sector servo, and has an upper limit. It is difficult to correctly estimate the disturbance and to compensate the disturbance so that the disturbance has no effect on the actual use of the control system. Furthermore, if the resistance of the drive coil of the actuator fluctuates or the resistance is changed following temperature rise after a drive current is carried to the drive coil to heat the drive coil, the positioning control system including the disturbance estimation device becomes disadvantageously unstable.

SUMMARY OF THE INVENTION

To solve the above-stated disadvantages, the present invention takes the following measures. To negate a disturbance caused by a pivot bearing friction, an elastic force, an inertia force due to shock/vibration or the like exerted on an actuator device, the magnitude of the disturbance is estimated. In estimating the magnitude of the disturbance, two elements are used. First, a voltage signal which is obtained as a detection result of detecting a voltage induced in driving the actuator device, is used. Second, a drive signal of the drive device for driving the actuator device is used. The drive signal of the drive device may be inputted into the drive device or outputted from the drive device. Alternatively, not the drive signal of the drive device but a position control signal, based on which the drive signal is produced, may be used. That is, a disturbance estimation device for estimating the magnitude of the disturbance is provided. The disturbance estimation device receives a voltage signal, which is obtained by detecting the voltage induced in driving the actuator device by a voltage detection device, and the drive signal or position control signal of the drive device, and products a disturbance estimation signal. The disturbance estimation signal produced based on the two elements, correctly estimates the magnitude of the disturbance exerted on the head. As a result, it is possible to correctly estimate the magnitude of the disturbance exerted on the actuator device. The disturbance related to the estimation is indicated by the disturbance estimation signal. The disturbance estimation device produces the disturbance estimation signal based on either the drive signal or the position control signal and the voltage signal induced in driving the actuator device. The voltage induced in driving the actuator device is a continuous signal. Due to this, compared with conventional art for estimating a disturbance using a discontinuous head position signal as a result of reading servo information discretely recorded on the disk, it is possible to correctly estimate a disturbance.

Meanwhile, if there are fluctuations in the resistance value of the drive coil and changes of the resistance value, a phase with a gain crossover frequency with which open loop gain becomes zero, has no phase margin, with the result that a control system becomes unstable. To solve this disadvantage, according to the present invention, the drive signal is produced based on the position control signal for a head position and the disturbance estimation signal, the high frequency component of the disturbance estimation signal is cut off by a filter device to thereby produce a filter signal. Thereafter, the position control signal for the head position is combined with the filter signal, thereby producing the drive signal.

By so constituting, the high frequency components of frequencies higher than a filter low-pass cut-off frequency are cut off by the filter device. The high frequency components of the disturbance estimation signal outputted from the disturbance estimation signal are not included equivalently in the drive signal. As a result, even if the resistance value of the drive coil of the actuator device is changed according to resistance fluctuation or temperature rise, it is possible to secure a phase margin with the gain crossover frequency and to constitute a stable head positioning control system.

A correction device combines the disturbance estimation signal after filtering (filter signal) with the position control signal from the position control device, and thereby produces a drive signal so as to negate the disturbance exerted on the actuator device using the disturbance estimation signal thus correctly estimated. By driving the actuator device of the head using the drive signal, it is possible to stably negate a disturbance such as a pivot bearing friction, an elastic force or an inertia force exerted on the actuator device. That is, it is possible to compensate the disturbance acting on the actuator device. Therefore, even if the fluctuation of the disturbance acting on the actuator device is large during following operation toward the target track, it is possible to stably control positioning the head to the target track. Furthermore, even if the resistance value of the drive coil of the actuator device is changed by resistance fluctuation or temperature rise, it is possible to stably control positioning the head to the target track. That is, it is possible to improve positioning accuracy against more diverse conditional change. In addition, as an effect resulting from this improvement, it is possible to substantially increase track density and to accelerate the embodiment of a large capacity disk storage apparatus.

As another means for solving the disadvantages, the present invention takes the following measures. The disturbance estimation device produces the disturbance estimation signal based on a signal obtained by multiplying the drive signal by $k_1$, where $k_1$ is a coefficient of a real number greater than 1, and the voltage signal. The correction device combines a signal obtained by multiplying the disturbance estimation signal by $1/k_2$, where $k_2$ is a coefficient of a real number greater than 1, with the position control signal, and produces a drive signal. By doing so, the change of open loop gain from the position error signal to the head position can be suppressed to be small. As a result, even if the resistance value of the drive coil of the actuator device is changed according to resistance fluctuation or temperature rise, it is possible to stabilize the position control system. In this case, if the filter device is employed, it is possible to attain a more preferable effect.

The present invention explained above will be described more concretely.

As the first solving means, the disk storage apparatus according to the present invention comprises: an actuator device for positioning a head with respect to a disk; a drive device for driving the actuator device in accordance with an input drive signal; a voltage detection device for detecting a voltage induced in driving the actuator device, and for outputting a voltage signal; a disturbance estimation device for estimating a magnitude of a disturbance exerted on the head from the drive signal and the voltage signal, and for producing a disturbance estimation signal; a filter device for cutting off a high frequency component of the disturbance estimation signal, and for outputting a filter signal; a position detection device for producing a position error signal corresponding to a current position of the head from servo information previously recorded on the disk and detected by the head, and for outputting the position error signal; a position control device for producing a position control signal corresponding to the position error signal, and for outputting the position control signal; and a correction device for combining the position control signal with the filter signal to produce the drive signal, and for outputting the drive signal. With this constitution, the drive signal of the drive device may be a signal inputted into the drive device or a signal outputted from the drive signal. This applies hereafter.

The functions resulting from this first solving means are as follows. The disturbance estimation device can correctly estimate the magnitude of the disturbance exerted on the actuator device based on the drive signal applied to the drive device to drive the actuator device, and the voltage signal detected from the actuator device. A disturbance related to the estimation is a disturbance estimation signal. Here, it is particularly important that it is possible to correctly estimate the magnitude of the disturbance exerted on the actuator device for the drive signal and the voltage signal during following operation for allowing the head to follow up the target track. The reason is as follows. The voltage signal detected from the actuator device is a voltage induced in driving the actuator device. This signal, unlike servo information recorded on the disk discretely, is a continuous signal.

After the high frequency component of the disturbance estimation signal is cut off through the filter device so as to negate the disturbance exerted on the actuator device using the disturbance estimation signal thus correctly estimated, the resultant signal is combined with the position control signal outputted from the position control device to thereby produce the drive signal. By driving the actuator device using the drive signal, it is possible to stably negate the disturbance exerted on the actuator device. That is, since it is possible to compensate the disturbance exerted on the actuator device, the position control of the head toward the target track can be stable even if the fluctuation of the disturbance during the following operation for allowing the head to follow up the target track is large. In particular, even if the resistance value of the drive coil of the actuator device is changed by resistance fluctuation or temperature rise, in particular, it is possible to stably control positioning the head to the target track. That is, it is possible to improve positioning accuracy against more diverse conditional change.

The first solving means will be described as a disk storage apparatus control method as follows. That is, the method comprises the steps of: producing a position error signal corresponding to a current position of a head from servo information previously recorded on a disk and detected by the head; producing a position control signal corresponding to the position error signal; estimating a magnitude of a disturbance exerted on the head from a drive signal of an actuator device for positioning the head and from a voltage signal induced in driving the actuator device, and producing a disturbance estimation signal; cutting off a high frequency component of the disturbance estimation signal, and producing a filter signal; combining the position control signal with the filter signal, and producing the drive signal; and positioning the head with respect to the disk by the drive signal. This disk storage apparatus control method can exhibit the same functions as stated above.

As the second solving means, the disk storage apparatus according to the present invention comprises: an actuator device for positioning a head with respect to a disk; a drive device for driving the actuator in accordance with an input drive signal; a voltage detection device for detecting a voltage induced in driving the actuator device, and for outputting a voltage signal; a position detection device for producing a position error signal corresponding to a current position of the head from servo information previously recorded on the disk and detected by the head, and for outputting the position error signal; a position control device for producing a position control signal corresponding to the position error signal, and for outputting the position control signal; a disturbance estimation device for estimating a magnitude of a disturbance exerted on the head from the voltage signal and the position control signal, and for producing a disturbance estimation signal; a filter device for cutting off a high frequency component of the disturbance estimation signal, and for outputting a filter signal; and a correction device for combining the position control signal with the filter signal to produce the drive signal, and for outputting the drive signal.

The functions resulting from this second solving means are as follows. The disturbance estimation device can correctly estimate the magnitude of the disturbance exerted on the actuator device based on the drive signal applied to the drive device to drive the actuator device, and the voltage signal detected from the actuator device. Here, it is particularly important that it is possible to correctly estimate the magnitude of the disturbance exerted on the actuator device from the drive signal and the voltage signal during following operation for allowing the head to follow up the target track. The reason is as follows. The voltage signal detected from the actuator device is, unlike servo information recorded on the disk discretely, a continuous signal.

After the high frequency component of the disturbance estimation signal is cut off through the filter device so as to negate the disturbance exerted on the actuator device using the disturbance estimation signal thus correctly estimated, the resultant signal is combined with the position control signal outputted from the position control device to thereby produce the drive signal. By driving the actuator device using the drive signal, it is possible to stably negate the disturbance exerted on the actuator device. That is, it is possible to compensate the disturbance exerted on the actuator device. Therefore, even if the fluctuation of the disturbance during the following operation for allowing the head to follow up the target track is large and even if the resistance value of the drive coil of the actuator device is changed according to resistance fluctuation or temperature rise, it is possible to stably control positioning the head to the target track. That is, it is possible to improve positioning accuracy against more diverse conditional change.

The second solving means will be described as a disk storage apparatus control method as follows. That is, the method comprises the steps of: producing a position error signal corresponding to a current position of a head from servo information previously recorded on a disk and detected by the head; producing a position control signal corresponding to the position error signal; estimating a magnitude of a disturbance exerted on the head from the position control signal and a voltage signal induced in driving an actuator device for positioning the head, and producing a disturbance estimation signal; cutting off a high frequency component of the disturbance estimation signal, and producing a filter signal; combining the position control signal with the filter signal, and producing the drive signal; and positioning the head with respect to the disk by the drive signal. This disk storage apparatus control method can exhibit the same functions as stated above.

As the third solving means, the disk storage apparatus according to the present invention comprises: an actuator device for positioning a head with respect to a disk; a drive device for driving the actuator device in accordance with an input drive signal; a voltage detection device for detecting a voltage induced in driving the actuator device, and for outputting a voltage signal; a disturbance estimation device for estimating a magnitude of a disturbance exerted on the head from a signal obtained by multiplying the drive signal by $k_1$, where $k_1$ is a coefficient of a real number greater than 1, and from the voltage signal, and for producing a disturbance estimation signal; a position detection device for producing a position error signal corresponding to a current position of the head from servo information previously recorded on the disk and detected by the head, and for outputting the position error signal; a position control device for producing a position control signal corresponding to the position error signal, and for outputting the position control signal; and a correction device for receiving the position control signal and the disturbance estimation signal, combining a signal obtained by multiplying the disturbance estimation signal by $1/k_2$, where $k_2$ is a coefficient of a real number greater than 1, with the position control signal to produce the drive signal, and for outputting the drive signal.

The functions resulting from this third solving means are as follows. Besides the same functions as those resulting from the first solving means, it is possible to suppress the change of open loop again from the position error signal to the head position to be small since the drive signal is applied to the disturbance estimation device after being multiplied by $k_1$ ($k_1 > 1$) and the disturbance estimation signal is applied to the correction device after being multiplied by $1/k_2$ ($k_2 > 1$). As a result, even if the resistance value of the drive coil of the actuator device is changed according to resistance fluctuation or temperature rise, it is possible to stabilize the position control system. That is, it is possible to improve positioning accuracy against more diverse conditional change. In this case, if the filter device provided by the first solving means is used, it is possible to obtain a more preferable effect.

The third solving means will be described as a disk storage apparatus control method as follows. That is, the method comprises the steps of: producing a position error signal corresponding to a current position of a head from servo information previously recorded on a disk and detected by the head; producing a position control signal corresponding to the position error signal; estimating a magnitude of disturbance exerted on the head from a signal obtained by multiplying a drive signal of an actuator device for positioning the head by $k_1$, where $k_1$ is a coefficient of a real number greater than 1, and from a voltage signal induced in driving the actuator device, and producing a disturbance estimation signal; combining a signal obtained by multiplying the disturbance estimation signal by $1/k_2$, where $k_2$ is a coefficient of a real number greater than 1, with the position control signal, and producing the drive signal; and positioning the head with respect to the disk by the drive signal. This disk storage apparatus control method can exhibit the same functions as stated above.

As the fourth solving means, the disks storage apparatus according to the present invention comprises: a actuator device for positioning a head with respect to a disk; a drive device for driving the actuator device in accordance with an input drive signal; a voltage detection device for detecting a voltage induced in driving the actuator device, and for outputting a voltage signal; a position detection device for producing a position error signal corresponding to a current position of the head from servo information previously recorded on the disk and detected by the head, and for outputting the position error signal; a position control device for producing a position control signal corresponding to the position error signal, and for outputting the position control signal; a disturbance estimation device for estimating a magnitude of a disturbance exerted on the head from a signal obtained by multiplying the position control signal by $k_1$, where $k_1$ is a coefficient of a real number greater than 1, and from the voltage signal, and for producing a disturbance estimation signal; and a correction device for receiving the position control signal and the disturbance estimation signal, combining a signal obtained by multiplying the disturbance estimation signal by $1/k_2$, where $k_2$ is a coefficient of a real number greater than 1, with the position control signal to produce the drive signal, and for outputting the drive signal.

With this constitution, the disturbance estimation device can correctly estimate the magnitude of the disturbance exerted on the actuator device based on the position control signal outputted from the position control device so as to be applied to the drive device for driving the actuator device and the voltage signal detected from the actuator device. It is possible to correctly estimate the magnitude of the disturbance exerted on the actuator device from the position control signal and the voltage signal particularly during following operation for allowing the head to follow up the target track. The disturbance estimation signal is combined with the position control signal outputted from the position control device so as to negate the disturbance exerted on the actuator device using the disturbance estimation signal thus correctly estimated, to thereby produce the drive signal. By driving the actuator device of the head using the drive signal, it is possible to stably negate the disturbance exerted on the actuator device. That is, it is possible to compensate the disturbance exerted on the actuator device. Therefore, even if the fluctuation of the disturbance is large during the following operation for allowing the head to follow up the target track and even if the resistance value of the drive coil of the actuator device is changed according to resistance fluctuation or temperature rise, it is possible to stably control positioning the head to the target track. That is, it is possible to improve positioning accuracy against more diverse conditional change.

The fourth solving means will be described as a disk storage apparatus control method as follows. That is, the method comprises the steps of: producing a position error signal corresponding to a current position of a head from servo information previously recorded on a disk and detected by the head; producing a position control signal corresponding to the position error signal; estimating a magnitude of a disturbance exerted on the head from a signal obtained by multiplying the position control signal by $k_1$, where $k_1$ is a coefficient of a real number greater than 1, and from a voltage signal induced in driving an actuator device for positioning the head, and producing a disturbance estimation signal; combining a signal obtained by multiplying the disturbance estimation signal by $1/k_2$, where $k_2$ is a coefficient of a real number greater than 1, with the position control signal, and producing the drive signal; and positioning the head with respect to the disk by the drive signal. This disk storage apparatus control method can exhibit the same functions as stated above.

Alternatively, the first solving means may be combined with the third solving means. The second solving means may be combined with the fourth solving means. These combination means are fifth and sixth solving means, respectively.

As the fifth solving means, the disk storage apparatus according to the present invention comprises: an actuator device for positioning a head with respect to a disk; a drive device for driving the actuator device in accordance with an input drive signal; a voltage detection device for detecting a voltage induced in driving the actuator device, and for outputting a voltage signal; a disturbance estimation device for estimating a magnitude of a disturbance exerted on the head from a signal obtained by multiplying the drive signal by $k_1$, where $k_1$ is a coefficient of a real number greater than 1, and from the voltage signal, and for producing a disturbance estimation signal; a position detection device for producing a position error signal corresponding to a current position of the head from servo information previously recorded on the disk and detected by the head, and for outputting the position error signal; a position control device for producing a position control signal corresponding to the position error signal, and for outputting the position control signal; and a correction device for receiving the position control signal and the disturbance estimation signal, cutting off a high frequency component of a signal, which is obtained by multiplying the disturbance estimation signal by $1/k_2$, where $k_2$ is a coefficient of a real number greater than 1, to produce a filter signal, combining the position control signal with the filter signal to produce the drive signal, and for outputting the drive signal.

The fifth solving means will be described as a disk storage apparatus control method as follows. That is, the method comprises the steps of: producing a position error signal corresponding to a current position of a head from servo information previously recorded on a disk and detected by the head; producing a position control signal corresponding to the position error signal; estimating a magnitude of a disturbance exerted on the head from a signal obtained by multiplying a drive signal of an actuator device for positioning the head by $k_1$, where $k_1$ is a coefficient of a real number greater than 1, and from a voltage signal induced in driving the actuator device, and producing a disturbance estimation signal; cutting off a high frequency component of a signal, which is obtained by multiplying the disturbance estimation signal by $1/k_2$, where $k_2$ is a coefficient of a real number greater than 1, and producing a filter signal; combining the position control signal with the filter signal, and producing the drive signal; and positioning the head with respect to the disk by the drive signal.

Further, as the sixth solving means, the disk storage apparatus according to the present invention comprises: an actuator device for positioning a head with respect to a disk; a drive device for driving the actuator device in accordance with an input drive signal; a voltage detection device for detecting a voltage induced in driving the actuator device, and for outputting a voltage signal; a position detection device for producing a position error signal corresponding to a current position of the head from servo information previously recorded on the disk and detected by the head, and for outputting the position error signal; a position control device for producing a position control signal corresponding to the position error signal, and for outputting the position control signal; a disturbance estimation device for estimating a magnitude of a disturbance exerted on the head from a signal obtained by multiplying the position control signal by $k_1$, where $k_1$ is a coefficient of a real number greater than 1, and from the voltage signal, and for producing a disturbance estimation signal; and a correction device for receiving the position control signal and the disturbance estimation signal, cutting off a high frequency component of a signal, which is obtained by multiplying the disturbance estimation signal by $1/k_2$, where $k_2$ is a coefficient of a real number greater than 1, to produce a filter signal, combining the position control signal with the filter signal to produce the drive signal, and for outputting the drive signal.

The sixth solving means will be described as a disk storage apparatus control method as follows. That is, the method comprises the steps of: producing a position error signal corresponding to a current position of a head from servo information previously recorded on a disk and detected by the head; producing a position control signal corresponding to the position error signal; estimating a magnitude of a disturbance exerted on the head from a signal obtained by multiplying the position control signal by $k_1$, where $k_1$ is a coefficient of a real number greater than 1, and from a voltage signal induced in driving an actuator device for positioning the head, ad producing a disturbance estimation signal; cutting off a high frequency component of a signal, which is obtained by multiplying the disturbance estimation signal by $1/k_2$, where $k_2$ is a coefficient of a real number greater than 1, and producing a filter signal; combining the position control signal with the filter signal, and producing the drive signal; and positioning the head with respect to the disk by the drive signal.

The fifth and sixth solving means have synergistic effects. That is, even if the change width of the resistance value of the drive coil is quite large, it is possible to implement stable head positioning control over higher control frequency bands.

According to the third to sixth solving means, it is preferable that the coefficients $k_1$ and $k_2$ are set almost equal to each other.

By doing so, in the substantial transfer function from the position control signal to the drive current to the actuator device, components related to the resistance value of the drive coil of the actuator device can be ignored. Accordingly, even if the resistance value of the drive coil of the actuator device is changed by resistance fluctuation or temperature rise, it is possible to sufficiently, stably control positioning the head to the target track.

According to the first, third or fifth solving means in which the drive signal out of the drive signal and the position control signal is applied to the disturbance estimation device, it is preferable to constitute the apparatus as follows. The disturbance estimation device comprises: a comparison device for receiving the voltage signal detected by the voltage detection device; a first multiplication device for multiplying the drive signal or a signal obtained by multiplying the drive signal by $k_1$, by a coefficient consisting of a first transfer function; a second multiplication device for multiplying an output of the comparison device by a coefficient consisting of a second transfer function; a first integration device for integrating the output of the comparison device; and a second integration device for integrating a value obtained by subtracting the added value of the output of the second multiplication device and the output of the first integration device from the output of the first multiplication device, and the comparison device is configured to compare the voltage signal with the output of the second integration device, and to output a comparison result to the second multiplication device and the first integration device.

The functions resulting from this constitution are as follows. The output of the first multiplication device which inputs the drive signal or a signal obtained by multiplying the drive signal by $k_1$, becomes a drive torque estimation signal corresponding to the drive torque acting on the actuation device. The output of the second integration device becomes a feedback element for the voltage signal inputted from the voltage detection device. The output of the comparison device which obtains the difference between the voltage signal and the feedback element from the second integration device, is applied to the first integration device and the second multiplication device. The output of the first integration device which integrates the difference, becomes a disturbance estimation signal corresponding to the disturbance exerted on the actuator device. The output of the second multiplication device obtained by multiplying the difference by a predetermined coefficient, is added to the disturbance estimation signal. The added value is subtracted from the drive torque estimation signal and the result is applied to the second integration device.

As a result, the disturbance estimation signal outputted from the first integration device corresponds to the correct estimate of the disturbance exerted on the actuator device. Further, using the disturbance estimation signal thus correctly estimated, feed-forward control is implemented so as to negate the disturbance exerted on the actuator device. It is, therefore, possible to compensate the disturbance acting on the actuator device during following operation. Even if the fluctuation of the disturbance in the actuator device is large during the following operation, and even if the resistance value of the drive coil of the actuator device is changed according to resistance fluctuation or temperature rise, it is possible to stably control positioning the head to the target track and to improve positioning accuracy against more diverse conditional changes.

According to the second, fourth or sixth solving means in which the position control signal out of the drive signal and the position control signal is applied to the disturbance estimation device, it is preferable to constitute the apparatus as follows. The disturbance estimation device comprises: a comparison device for receiving the voltage signal detected by the voltage detection device; a first multiplication device for multiplying the position control signal or the signal, which is obtained by multiplying the position control signal by $k_1$, by a coefficient consisting of a first transfer function; a second multiplication device for multiplying an output of the comparison device by a coefficient consisting of a second transfer function; a first integration device for integrating the output of the comparison device; and a second integration device for integrating a value obtained by subtracting the output of the second multiplication device from the output of the first multiplication device, and the comparison device compares the voltage signal with the output of the second integration device, and outputs a comparison result to the second multiplication device and the first integration device.

The functions resulting from this constitution are as follows. The output of the first multiplication device which inputs the position control signal from the position control device signal or a signal obtained by multiplying the position control signal by $k_1$, becomes a drive torque estimation signal corresponding to the drive torque acting on the actuation device. The output of the second integration device becomes a feedback element for the voltage signal inputted from the voltage detection device. The output of the comparison device which obtains the difference between the voltage signal and the feedback element from the second integration device, is applied to the first integration device and the second multiplication device. The output of the first integration device which integrates the difference, becomes a distance estimation signal corresponding to the disturbance exerted on the actuator device. The output of the second multiplication device obtained by multiplying the difference by a predetermined coefficient, is subtracted from the drive torque estimation signal and the result is applied to the second integration device.

As a result, the disturbance estimation signal outputted from the first integration device corresponds to the correct estimate of the disturbance exerted on the actuator device. Further, using the disturbance estimation signal thus correctly estimated, feed-forward control is implemented so as to negate the disturbance exerted on the actuator device. It is, therefore, possible to compensate the disturbance acting on the actuator device during following operation. Even if the fluctuation of the disturbance in the actuator device is large during the following operation, and even if the resistance value of the drive coil of the actuator device is changed according to resistance fluctuation or temperature rise, it is possible to stably control positioning the head to the target track, and to improve positioning accuracy. Besides, the addition of the first integration device and the second multiplication device is unnecessary. It is, therefore, possible to thereby simplify the constitution.

Further, according to the above-stated invention, it is preferable that an estimation frequency of the disturbance estimation signal produced by the disturbance estimation device is set at a value larger than a control frequency band of the position control device.

The functions resulting from the above are as follows. To widen the control frequency band of the positioning control system device to increase proportional gain. However, the gain has an upper limit by the sampling frequency of the sector servo of the disk storage apparatus or the inherent mechanical resonance frequency of the actuator device. In contrast, the disturbance estimation device is not affected by the sampling frequency of the sector servo of the disk storage apparatus. Accordingly, in the disturbance estimation device, it is possible to set the estimation frequency band of the disturbance estimation signal produced by the disturbance estimation device, higher than the control frequency band of the positioning control system. As a result, it is possible to make the head correctly follow up the target track over higher control frequency bands.

Further, according to the above-stated invention, it is preferable that a cut-off frequency of the filter device is set at a value smaller than a control band of the position control device.

The functions resulting from this are as follows. Normally, there is a fluctuation in the resistance value of the drive coil of the actuator device. In addition, by conducting a drive current to the drive coil, the drive coil is heated to raise temperature and the temperature rise changes the resistance value. Consequently, the change of the resistance value of the drive coil of the actuator device makes the positioning control system including the disturbance estimation device unstable, with the result that the system oscillates with frequency near the control band of the position control device. To solve this disadvantage, the drive signal is produced based on the position control signal for the head position and the disturbance estimation signal. The high frequency component of the disturbance estimation signal is cut off by the filter device to thereby produce a filter signal. The position control signal for the head position is combined with the filter signal to thereby produce the drive signal. In this case, if the cut-off frequency of the filter signal by the filter device or correction device is set lower than the control band of the position control device, then the disturbance estimation signal having higher frequency components than the cut-off frequency is cut off by the filter device and not fed back to the positioning control system. Therefore, even if the resistance value of the drive coil of the actuator device is changed according to resistance fluctuation or temperature rise, it is possible to stabilize the position control system.

Furthermore, according to the above-stated invention, it is preferable that the actuator device is configured by a permanent magnet fixedly attached to at least one yoke of a pair of yokes in a cavity of the pair of yokes opposite to each other through the cavity, and a drive coil provided in a magnetic cavity formed by the permanent magnet and the yokes, and that a circuit having a capacitor and a resistor connected in series, is connected to the drive coil in parallel.

The functions resulting from this are as follows. Normally, the drive coil which constitutes the actuator device contains not only a resistance component but also an inductance component. Since the inductance component is smaller than the coil resistance, it is difficult to accurately constitute a circuit therefor. Further, since the inductance component is a derivative element, it tends to be affected by noise. As a result, if the control band of the disturbance estimation device is set high, the control system becomes unstable due to the influence of this inductance. This results in a limit in increasing the control band of the disturbance estimation device. Considering this disadvantage, the circuit having the capacitor and the resistor connected in series is connected to the drive coil in parallel, whereby the influence of the inductance of the drive coil can be eliminated and the control band thereof can be set higher than the control band of the positioning control system. As a result, it is possible to make the head correctly follow up the target track over higher control bands. In addition, in the constitution of a circuit, it is unnecessary to take account of the inductance component which requires high accuracy, so that the voltage detection device can be simplified.

Moreover, according to the above-stated invention, it is preferable that the capacitor and the resistor connected to the drive coil in parallel are set to have a capacitance value C and a resistance value r as expressed by $C=La/Ra^2$, and $r=Ra$, or approximate to $C=La/Ra^2$, and $r=Ra$, respectively, wherein Ra is a resistance value of the drive coil.

By so setting, the composite impedance of the impedance of the drive coil and that of the parallel circuit becomes substantially equal to the resistance of the drive coil, making it possible to equivalently negate the inductance component of the drive coil. Accordingly, even if there is a fluctuation in the inductance component which tends to be affected by the noise because it is a derivative element, it is possible to stably implement positioning control without being influenced by the noise.

As is obvious from the above explanation, the position control device, the disturbance estimation device, the correction device, and the filter device, which are the constituent elements of the disk storage apparatus, may be configured by hardware or software.

Additionally, as is evident from the above explanation, the comparison device, the respective multiplication device, and the respective integration device, which are the constituent elements of the disk storage apparatus, may be by hardware or software.

While the present invention functions most advantageously if being applied to a magnetic disk storage apparatus, the present invention is not limited to the magnetic disk storage apparatus but can be applied to the other information recording apparatuses such as an optical disk storage apparatus and a magneto-optical storage apparatus.

The foregoing and other aspects will become apparatus from the following description of the invention when considered in conjunction with the accompanying drawing figures.

BRIEF DESCRIPTION OF THE DRAWINGS

FIG. 8A is a frequency gain characteristic view of the open loop of a positioning control system in a case where the disturbance estimation device of the disk storage apparatus in the first embodiment according to the present invention does not take account of the inductance of the drive coil, and FIG. 8B is a frequency to phase characteristic view corresponding to FIG. 8A;

FIG. 25 is a block diagram showing the configuration of a disk storage apparatus in an embodiment which is a combination of the second and fourth embodiments according to the present invention.

In all these figures, like components are indicated by the same numerals.

DETAILED DESCRIPTION OF THE PREFERRED EMBODIMENTS

Figure 1:
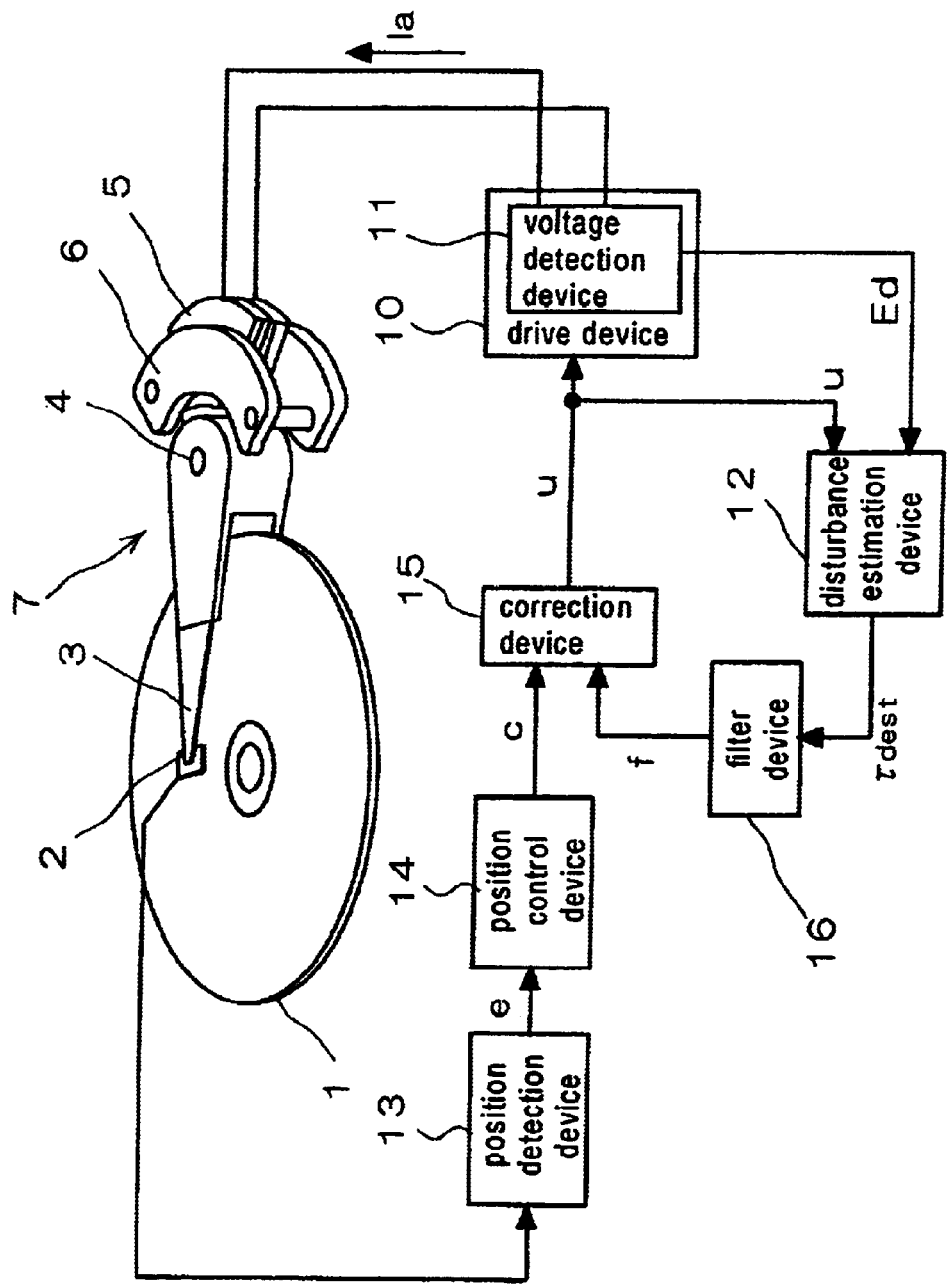
FIG. 1 is a block diagram showing the configuration of a disk storage apparatus in the first embodiment according to the present invention.

With reference to the drawings, concrete embodiments of a disk storage apparatus and a disk storage apparatus control method according to the present invention will be explained hereinafter in detail. It is noted that components having the same functions are denoted by the same reference numerals, respectively.

First Embodiment

FIG. 1 is a block diagram showing the configuration of an example of a disk storage apparatus of the present invention in the first embodiment.

In FIG. 1, the numeral 1 indicates a magnetic disk rotated by a spindle motor (not shown); the numeral 2, a magnetic head for recording/reproducing data for the disk 1; and the numeral 3, an arm which moves the head 2 to a target track on the disk 1 by pivoting the head 2 mounted on the one end of the arm 3 around a bearing 4. The numeral 5 indicates a drive coil provided on the rear end of the arm 3; and the numeral 6, a stator (yoke) in which a magnet (a permanent magnet, not shown) is arranged on the surface opposite to the drive coil 5. The stator 6 consists, through a gap, of a pair of opposite yokes, and within the gap, the above-mentioned magnet is fixed to at least one of the yokes. The interaction between the magnetic flux generated by the magnet arranged on the stator 6 and the magnetic field produced by the current conducted through the drive coil 5 causes the arm 3 to be subject to a rotational force. An actuator 7 is configured by the arm 3, the bearing 4, the drive coil 5 and the stator 6.

The numeral 10 indicates a drive device; and the numeral 11, a voltage detection device, which is included in the drive device 10, detects a voltage generated across the drive coil 5, and outputs a voltage signal $E_d$. The numeral 12 indicates a disturbance estimation device which estimates a disturbance torque $\tau_d$ exerted on the arm 3 from the voltage signal $E_d$ outputted by the voltage detection device 11 and from a drive signal u as an input of the drive device 10, and outputs a disturbance estimation signal $\tau_{dest}$. A position signal of the track, which has been previously recorded as servo information on respective sectors of the disk 1, is read by the head 2. A position detection device 13 detects a current position of the head 2 from the position signal read by the head 2, and produces a position error signal e indicating a difference from a target position r of the target track. A position control device 14 receives the position error signal e produced by the position detection device 13, amplifies and phase compensates the signal, and produces a position control signal c.

The numeral 16 indicates a filter device which cuts off high frequency components of the disturbance estimation signal $\tau_{dest}$ applied from the disturbance estimation device 12 to a correction device 15 and which does not output the high frequency components to the correction device 15 so as to stabilize a positioning control system. The filter device 16 outputs a filter signal f obtained by cutting off the high frequency components from the disturbance estimation signal $\tau_{dest}$, to the correction device 15.

The numeral 15 indicates the correction device which receives the position control signal c from the position control device 14 and the filter signal f from the filter device 16. The correction device 15 performs a correction computation, and then outputs the drive signal u to the drive device 10.

The drive device 10 is configured such that it conducts a drive current $I_a$ to the drive coil 5 in response to the inputted drive signal u, pivots the arm 3 about the bearing 4 as a center, rotationally moves the head 2 mounted on the top end of the arm 3, and positions, with high accuracy, the head 2 to the target track formed at narrow track pitches in order to record/reproduce data on the disk 1.

Figure 2:
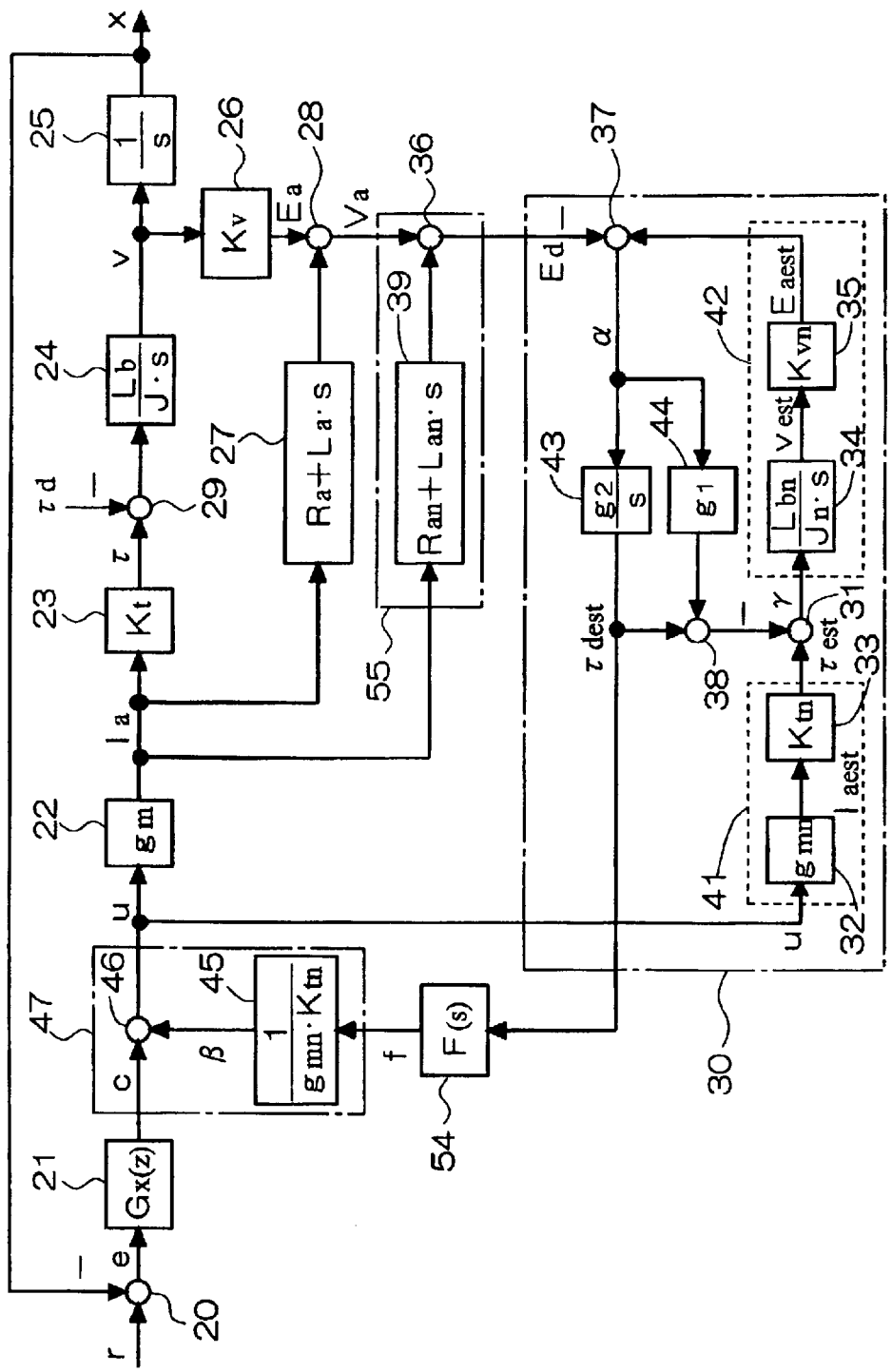
FIG. 2 is a block diagram showing the whole configuration of the positioning control system of the disk storage apparatus in the first embodiment according to the present invention.

Using FIG. 2, the operation of the positioning control system of the disk storage apparatus in the first embodiment will be explained hereinafter. FIG. 2 is a block diagram showing the whole configuration of the positioning control system of the disk storage apparatus in the first embodiment.

A portion 30 surrounded with a single-dot chain line in the figure is a block of the disturbance estimation device 12. Similarly, a portion 47 surrounded with a single-dot chain line in the figure is a block of correction device 15. A portion 55 surrounded with a single-dot chain line in the figure is a block of the voltage detection device 11. In FIG. 2, the symbol s indicates Laplace operator. In FIG. 2, hold elements by the sampling of the sector servo are omitted to simplify the explanation.

In FIG. 2, expressing the current track position detected by the head 2 as x, the position error signal e with respect to the target track position r is expressed by formula 1, which position error signal e is obtained at a comparator (which is also referred to as "comparison device") 20.

$$e = r - x \quad (1)$$

The position control device 14 expressed by a block 21 in FIG. 2 applies a digital filter processing of a transfer function Gx (z) to the position error signal e outputted from the comparator 20, produces the position control signal c, and outputs it to the correction device 15 expressed by a block 47. The positioning control system is applied with a normal PID control, and the transfer function of the position control device 14 can be expressed by formula 2:

$$G_X(z) = K_X \left\{ 1 + a_d(1 - z^{-1}) + a_i \frac{z^{-1}}{1 - z^{-1}} \right\} \quad (2)$$

Here, the symbol $z^{-1}$ indicates a one-sample delay, and the symbol $K_x$ indicates a proportional gain of the positioning control system. The coefficients $a_d$, $a_i$ indicate constants for expressing frequency characteristic, in which the coefficient $a_d$ is a derivative coefficient, while the coefficient $a_i$ is an integral coefficient. The position control signal c passes through an adder 46, and becomes the drive signal u. The drive signal u is converted from the voltage signal to a $g_m$-time current signal at the drive device 10 of a block 22 (the transfer function is $g_m$), where the drive current $I_a$ is outputted. In the actuator 7 expressed by a block 23, the drive current $I_a$ is converted by a transfer function $K_t$ to the drive torque $\tau$ by an interaction between the magnetic field produced by the drive current $I_a$ and the above-mentioned magnetic flux of the stator 6. Here, the transfer function $K_t$ is a torque constant of the actuator 7. A transfer function $(L_b/J \cdot s)$ of a block 24 expresses a transfer characteristic from the drive torque $\tau$ exerted on the arm 3 to a moving velocity v of the head 2. Here, the symbol J indicates an inertia moment of the arm 3, and the symbol $L_b$ indicates a distance from the bearing 4 of the arm 3 to the head 2. A block 25 indicates an integrator (which is also referred to as "integration device"), where the transfer function is expressed by 1/s, and the moving velocity v of the head 2 is converted to the current track position x.

In the actuator 7, a block 26 outputs an induced voltage $E_a$ generated across the drive coil 5 by the rotation of the actuator 7, while a block 27 outputs a voltage drop $(R_a + L_a \cdot s) \cdot I_a$ generated by the conduction of the drive current $I_a$ into the drive coil 5, and outputs a terminal voltage Va of the actuator 7 by adding the induced voltage and the voltage drop to each other at an adder 28. That is, the relationship therebetween is as follows:

$$V_a = E_a + (R_a + L_a \cdot s) I_a \quad (3)$$

Wherein $R_a$ indicates coil resistance of the drive coil 5 and $L_a$ indicates the inductance of the drive coil 5.

A disturbance $\tau_d$ exerted on the arm 3 such as a pivot bearing friction of the actuator 7, an elastic force of an FPC connecting the actuator 7 with an electronic circuit board, and an inertia force received by the actuator 7 due to shock or vibration exerted on the disk storage apparatus from the outside can be expressed as a form inputted into the front stage of the block 24 at a comparator 29.

The portion 55 surrounded with a single-dot chain line in FIG. 2 shows the detail of the voltage detection device 11, which block 55 includes a block 39 having the same transfer function as that of the block 27 included in the actuator 7, and a subtracter 36. The block 39 outputs voltage drop $(R_a n + L_a n \cdot s) I_a$ which is generated by conducting the drive current $I_a$ to the drive coil 5, and outputs the drive signal $E_d$ by subtracting the voltage drop from the terminal voltage Va of the actuator 7 using the subtracter 36.

The portion 30 surrounded with a single-dot chain line in FIG. 2 shows the detail of the disturbance estimation device 12, which block 30 includes a block 32 having the same transfer function as that of the block 22 as the drive device 10, a block 33 having the same transfer function as that of the block 23 as the actuator 7, a block 34 having the same transfer function as that of the block 24, and a block 35 having the same transfer function as that of the block 26. The first multiplier (which is also referred to as "multiplication device") 41 is configured by the combination of the block 32 and the block 33. The numeral 43 indicates a first integrator and 44 indicates a second multiplier. The second integrator 42 is configured by the combination of the block 34 and the block 35. Here, respective constants with the suffix "n" in the block 30 indicate nominal values, and variables with the suffix "$_{est}$" indicate estimates.

The drive signal u inputted into the block 22 is also inputted into the block 32 constituting the disturbance estimation device 12, and a multiplication of $g_{mn} \cdot K_{tn}$ times the drive signal u in the block 32 and the block 33 causes the same drive torque estimation signal $\tau_{est}$ as the drive torque $\tau$ exerted on the arm 3 to be obtained.

In FIG. 2, a velocity estimation signal $v_{est}$ is outputted from the block 34. In the block 35, an induced voltage estimation signal $E_{aest}$ obtained by increasing the velocity estimation signal $v_{est}$ by $K_{vn}$ times is inputted into a comparator 37 and is compared with the voltage signal $E_d$ actually detected. A resultant deviation signal $\alpha$ (=$E_{aest}$-$E_d$) is inputted into the first integrator 43 and the second multiplier 44. The first integrator 43 integrates the deviation signal $\alpha$ by $g_2$ times, and outputs a disturbance estimation signal $\tau_{dest}$ for disturbance. The deviation signal $\alpha$ is inputted into the second multiplier 44, and increased by $g_1$ times, and then added to an adder 38. The output of the adder 38 is inputted into a subtracter 31, where a resultant value $\gamma$ obtained by subtracting the output of the adder 38 from the drive torque estimation signal $\tau_{est}$ outputted from the block 33 is outputted to the block 34.

A coefficient $g_1$ of the second multiplier 44 and a coefficient $g_2$ of the first integrator 43 are constants for stabilizing the operation of the disturbance estimation device 12, the detail of which will be described later.

In FIG. 2, a block 54 is a block diagram of the filter device 16. The filter device 16 expressed by the block 54 subjects the disturbance estimation signal $\tau_{dest}$ outputted from the disturbance estimation device 12 to a filter processing of a transfer function F(s), generates a filter signal f, and outputs the filter signal f to the correction device 15 expressed by the block 47. The transfer function of the filter device 16 can be expressed by formula 4:

$$F(s) = \frac{1}{1 + T_X \cdot s} \tag{4}$$

Here, $T_x$ indicates a time constant of a filter and $T_x$ and a filter low-pass cut-off frequency $f_x$ hold the following relationship:

$$T_X = \frac{1}{2\pi fx} \tag{5}$$

In FIG. 1, a state in which the filter signal f is outputted from the filter device 16 to the correction device 15 is shown.

The filter of the block 54 is to stabilize the operation of the positioning control system of the disk storage apparatus in the first embodiment, the detail of which will be described later.

In FIG. 2, a block 47 surrounded with a single-dot chain line is a block diagram of the correction device 15. A block 45 included in the correction device 15 produces a correction signal $\beta$ to the drive device 10 required to make the arm 3 generate a drive force having a magnitude equivalent to the disturbance estimation signal $\tau_{dest}$ by increasing the disturbance estimation signal $\tau_{dest}$ by $1/(g_{mn} \cdot K_{tn})$ times. The correction signal $\beta$ is added to the position control signal c at an adder 46.

With reference to FIG. 3, the operation of the disturbance estimation device 12 of the block 30 will be explained hereinafter.

Figure 3A:
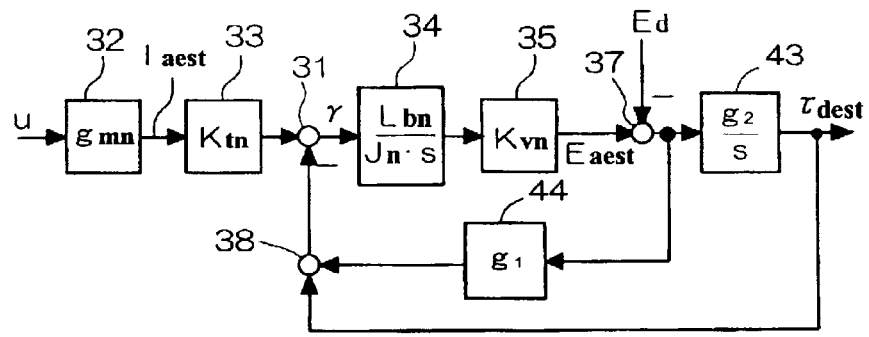
FIG. 3A is a block diagram for explaining the disturbance estimation operation of the disturbance estimation device of the disk storage apparatus in the first embodiment according to the present invention.
Figure 3B:
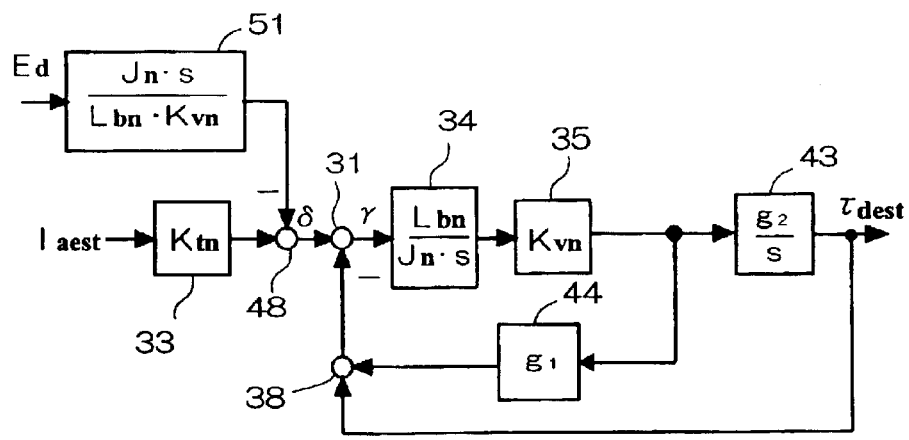
FIG. 3B is a block diagram obtained by equivalently transforming the block diagram of FIG. 3A.

FIG. 3A is a block diagram obtained by changing the block 30 of FIG. 2, and shows the transfer from the input of the drive signal u to the output of the disturbance estimation signal $\tau_{dest}$. FIG. 3B is a block diagram obtained in the block diagram of FIG. 3A by transfer moving equivalently the input position (at the comparator 37) of the voltage signal $E_d$, thereby transforming the block diagram of FIG. 3A. Here, to simplify the explanation, assuming that the value $g_m$ of the block 22 is equal to the value $g_{mn}$ of the block 32 in FIG. 2 as shown in the following formula, the drive current $I_a$ (=$g_m \cdot u$) is considered to be equal to the estimation current $I_{aest}$ (=$g_{mn} \cdot u$).

$$g_m = g_{mn} \tag{6}$$

By increasing the magnitude of the voltage signal $E_d$ by $(J_n \cdot s)/(L_{bn} \cdot K_{vn})$ times, the input position of the comparator 37 of FIG. 3A can be equivalently move to the input position of a subtracter 48 shown in FIG. 3B.

Noting the subtracter 48 of FIG. 3B, the value $\delta$ as the output of the subtracter 48 is expressed as shown in formula 7:

$$\delta = K_{tn} \cdot I_a - \frac{J_n \cdot s}{L_{bn} \cdot K_{vn}} E_a \tag{7}$$

Here, to simplify the formula 7, assuming that there exists a relationship as shown in formulas 8 and 9 as ideal conditions:

$$R_a = R_{an} \tag{8}$$

$$L_a = L_{an} \tag{9}$$

Noting the subtracter 36 and substituting the formula (3), the voltage signal $E_d$ is expressed by the following formula 10:

$$E_d = V_a - (R_{an} + L_{an} \cdot s)I_a \tag{10}$$
$$= E_a + (R_a + L_a \cdot s)I_a - (R_{an} + L_{an} \cdot s)I_a$$
$$= E_a$$

Then, noting the comparator 29, and the blocks 24 and 26 of FIG. 2, there exists a relationship as shown in the formula 11:

$$E_a = \frac{L_b \cdot K_v}{J \cdot s}(K_t \cdot I_a - \tau d) \tag{11}$$

Here, assuming the relationships shown in formulas 12 and 13 as ideal conditions, and substituting the formulas 10, 6, and 7 in the formula 7, the formula 7 is transformed as shown in the formula 14:

$$K_t = K_{tn} \tag{12}$$

$$\frac{L_b \cdot K_v}{J} = \frac{L_{bn} \cdot K_{vn}}{J_n} \tag{13}$$

$$\delta = \tau_d \tag{14}$$

$\delta = \tau d$

That is, the value $\delta$ as the output of the subtracter 48 is equal to the disturbance $\tau_d$ exerted on the arm 3.

Therefore, determining a transfer function from the disturbance $\tau_d$ exerted on the arm 3 to the disturbance estimation signal $\tau_{dest}$, the function is obtained as shown in the formula 15:

$$\tau_{dest} = \frac{\frac{L_{bn}}{J_n} \cdot K_{vn} \cdot g_2}{s^2 + \frac{L_{bn}}{J_n} \cdot K_{vn} \cdot g_1 \cdot s + \frac{L_{bn}}{J_n} \cdot K_{vn} \cdot g_2} \cdot \tau_d \quad (15)$$

$$\tau dest = \frac{\frac{Lbn}{Jn} \cdot Kvn \cdot g2}{s^2 + \frac{Lbn}{Jn} \cdot Kvn \cdot g1 \cdot s + \frac{Lbn}{Jn} \cdot Kvn \cdot g2} \cdot \tau d$$

From the formula 15, the disturbance estimation device 12 is understood that the actual disturbance $\tau_d$ can be estimated in a secondary delay system from the drive signal u and the voltage signal $E_d$ by the loop in the block 30 surrounded with a single-dot chain line of FIG. 2.

Here, expressing the natural angular frequency (estimated angular frequency) of the secondary delay system as $\omega_o$ and the damping factor as $\zeta_o$, the constants $g_1$ and $g_2$ to stabilize the operation of the disturbance estimation device 12 are expressed by the following formulas 16 and 17, respectively:

$$g_1 = 2\zeta_O \cdot \omega_O \cdot \frac{J_n}{L_{bn} \cdot K_{vn}} \quad (16)$$

$$g_2 = \omega_O^2 \cdot \frac{J_n}{L_{bn} \cdot K_{vn}} \quad (17)$$

$$g2 = \omega o^2 \cdot \frac{J_n}{L_{bn} \cdot K_{vn}}$$

Here, setting the estimated angular frequency $\omega_o$ at a value higher than a position control band fc, and selecting the damping factor as $\zeta_o$ as 0.7 through 1, the disturbance $\tau_d$ such as a pivot bearing friction, an elastic force and an inertia force can be correctly estimated by the disturbance estimation device 12.

Transforming the formula 15 by the use of the formulas 16 and 17, the following formula 18 is obtained:

$$\tau_{dest} = \frac{\omega_O^2}{s^2 + 2\zeta_O \cdot \omega_O \cdot s + \omega_O^2} \cdot \tau_d \quad (18)$$

$$\tau d_{est} = \frac{\omega o^2}{s^2 + 2\zeta_O \cdot \omega o \cdot s + \omega o^2} \cdot \tau d$$

Figure 3C:
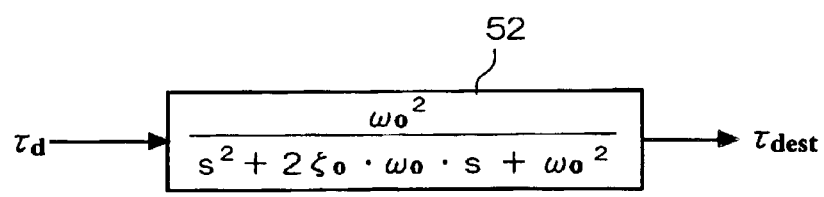
FIG. 3C is a block diagram collectively expressing the block diagram of FIG. 3A.

That is, the block diagram of the disturbance estimation device 12 of FIG. 3A can be simplified as shown in a block 52 of FIG. 3C.

With reference to FIG. 4, the operation of the correction device 15 shown in the block 47 will be explained in detail hereinafter, on the assumption that the transfer function F(s) of the filter device 16 is 1 to simplify the explanation. This corresponds to the operation of the positioning control system with a basic configuration in which the filter device 16 is not provided between the disturbance estimation device 12 and the correction device 15.

The block 47 of a portion surrounded with a single-dot chain line of FIG. 2 indicates the detail of the correction device 15. The block 45 outputs the correction signal β obtained by increasing the disturbance estimation signal $\tau_{dest}$ by $1/(g_{mn} \cdot K_m)$ times to the adder 46. That is, by increasing the disturbance estimation signal $\tau_{dest}$ by $1/(g_{mn} \cdot K_m)$ times, the correction signal β required to make the actuator 7 generate a drive force having a magnitude equivalent to the disturbance estimation signal $\tau_{dest}$ is outputted to the adder 46. Further, the correction signal β is increased $g_{mn} \cdot K_m$ times by the blocks 22 and 23, so that the disturbance estimation signal $\tau_{dest}$ is previously increased $1/(g_{mn} \cdot K_m)$ times to match the magnitude with each other.

Concluding the above explanation, it can be said that the disk storage apparatus of the first embodiment is configured such that the disturbance estimation signal $\tau_{dest}$ is made to be exerted on the actuator 7 in a manner to negate the disturbance $\tau_d$ due to a pivot bearing friction of the actuator 7, an elastic force of FPC connecting the actuator 7 with an electronic circuit board, an inertia forces exerted on the actuator 7 by a shock or vibration exerted on the disk storage apparatus from the outside, and the like.

Figure 4A:
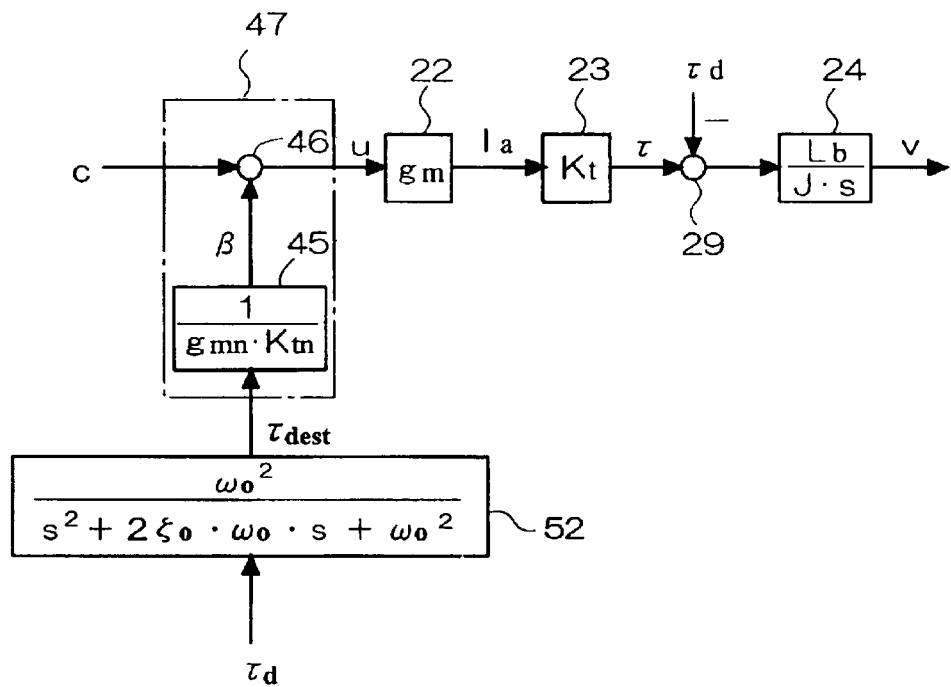
FIG. 4A is a block diagram for explaining an operation of inhibiting a disturbance exerted on the disk storage apparatus in the first embodiment according to the present invention.
Figure 4B:
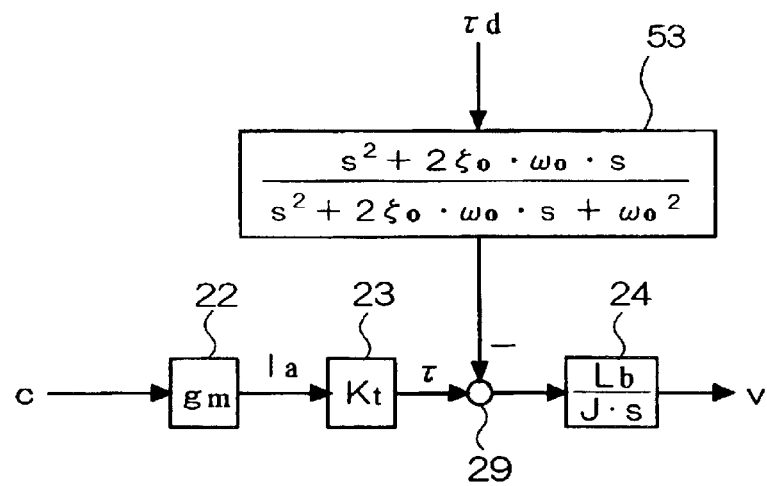
FIG. 4B is a block diagram obtained by equivalently transforming the block diagram of FIG. 4A.

FIG. 4A is a block diagram obtained by picking portions from the adder 46 to the comparator 29, and the block 24 relating to the operation of the correction device 15. FIG. 4B is a block diagram in which the disturbance $\tau_d$ exerted on the comparator 29 and the one exerted on a block 52 are integrated into one disturbance $\tau_d$. Components having the same function as those in the block diagram of FIG. 2 are indicated by the same symbols to omit a duplicated explanation.

In the block diagram of FIG. 4A, the block 52 is equivalent to the block 52 of FIG. 3C, an has a transfer function expressed by the formula 15.

Therefore, from FIG. 4B, the disturbance $\tau_d$ exerted on the arm 3 from the outside can be considered to be exerted through a filter expressed by a transfer function of the formula 19 on the head positioning control system.

$$G_d(s) = 1 - \frac{\omega_o^2}{s^2 + 2\zeta_o \cdot \omega_o \cdot s + \omega_o^2} \quad (19)$$

$$= \frac{s^2 + 2\zeta_o \cdot \omega_o \cdot s}{s^2 + 2\zeta_o \cdot \omega_o \cdot s + \omega_o^2}$$

$$G_d(s) = 1 - \frac{\omega_O^2}{s^2 + 2\zeta_O \cdot \omega_O \cdot s + \omega_O^2}$$

$$= \frac{s^2 + 2\zeta_O \cdot \omega_O \cdot s}{s^2 + 2\zeta_O \cdot \omega_O \cdot s + \omega_O^2}$$

Figure 5:
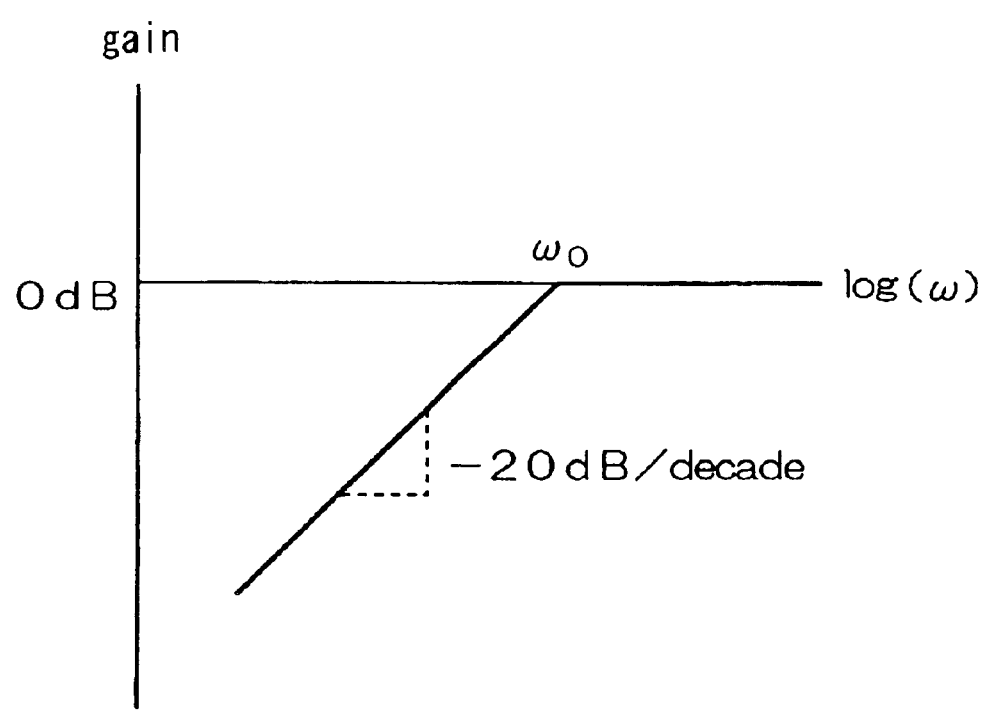
FIG. 5 is a cut-off frequency characteristic graph for the disturbance exerted on the disk storage apparatus in the first embodiment according to the present invention.

FIG. 5 shows the frequency characteristic of a transfer function $G_d(s)$ expressed by the formula 19 as a polygonal line approximation. From the frequency characteristic of the transfer function $G_d(s)$ shown in FIG. 5, at an angular frequency lower than the angular frequency $\omega_0$, the gain is 0 dB or less, and as the angular frequency ω drops, the gain is damped at a damping ratio of −20 dB/decade. The decade means ten times. That is, from FIG. 5, transfer function $G_d(s)$ has a low frequency cut-off filter characteristic capable of inhibiting a frequency lower than the angular frequency $\omega_0$.

That is, the disk storage apparatus of the first embodiment is configured such that even when the disturbance $\tau_d$ due to a pivot bearing friction, an elastic force, an inertia force or the like is exerted on the arm 3, the disturbance $\tau_d$ is estimated by the disturbance estimation device 12, and controlled in a manner to negated the disturbance $\tau_d$ exerted from the outside with the disturbance estimation signal $\tau_{dest}$. Therefore, the disturbance $\tau_d$ exerted from the outside acts as if the disturbance $\tau_d$ is exerted through a filter having the cut-off frequency characteristic of the formula 19 and FIG. 5 on the head positioning control system.

Therefore, at a frequency lower than the angular frequency $\omega_o$, the first-order low frequency cut-off characteristic can inhibit the disturbance due to a pivot bearing friction of the actuator 7, an elastic force of FPC connecting the actuator 7 with an electronic circuit board, an inertia forces exerted on the actuator 7 by a shock or vibration exerted on the disk storage apparatus from the outside, and the like.

That is, even when a vibration or a shock is applied to the apparatus to cause the disturbance $\tau_d$ to be exerted on the actuator 7, the disturbance $\tau_d$ is estimated by the disturbance estimation device 12, and controlled in a manner to negated the disturbance $\tau_d$ exerted from the outside, so that there is an effect as if the disk storage apparatus is provided with a mechanical vibration-proof mechanism.

Figure 6A:
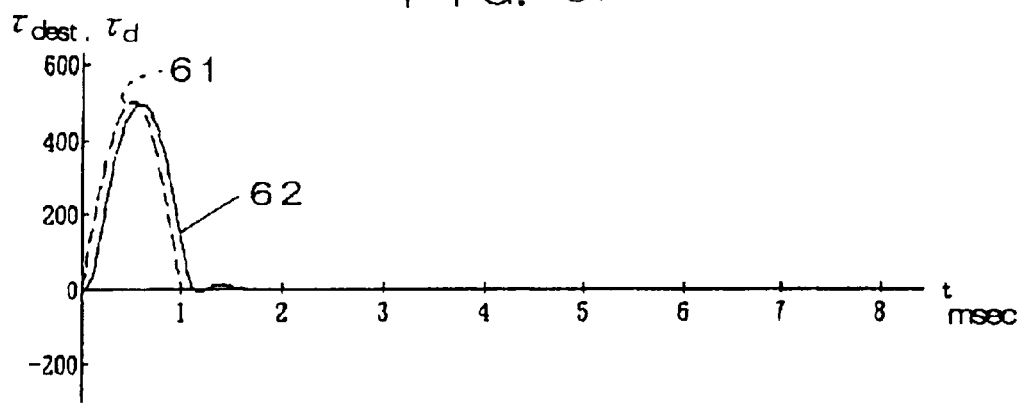
FIG. 6A is a waveform chart of the fluctuation of the disturbance exerted on the disk storage apparatus and a disturbance estimation signal outputted from the disturbance estimation device with respect to time response in the first embodiment according to the present invention.
Figure 6B:
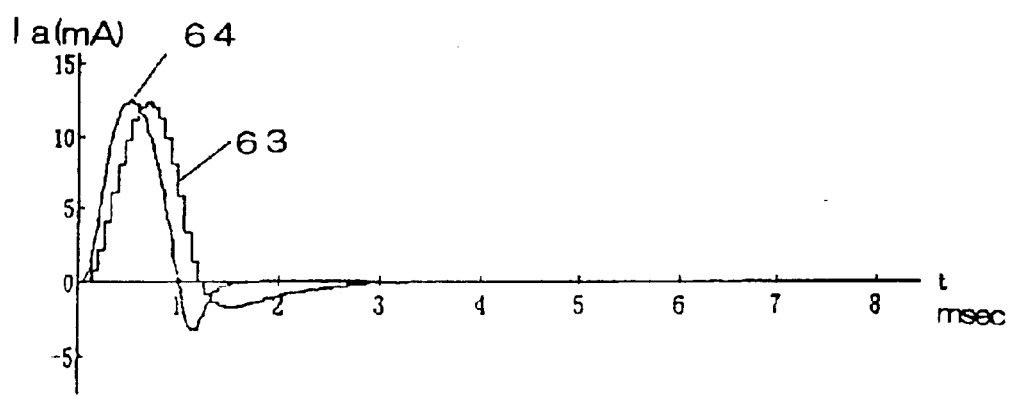
FIG. 6B is a waveform chart of a drive current with respect to time response in a case where the disturbance estimation signal outputted from the disturbance estimation device is inputted into the correction device and in a case where the distance estimation signal is not inputted into the correction device.
Figure 6C:
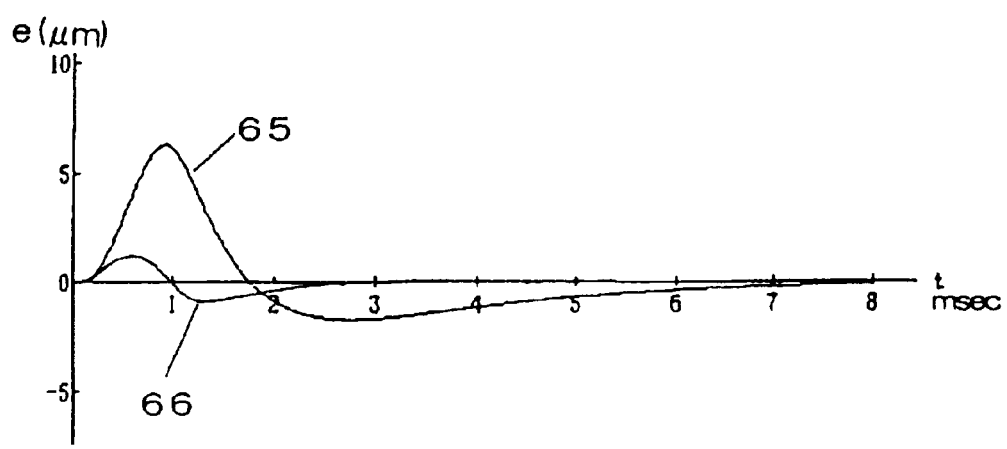
FIG. 6C is a waveform chart of a track error with respect to time response in a case where the disturbance estimation signal outputted from the disturbance estimation device is inputted into the correction device to negate the fluctuation of the disturbance.

FIGS. 6A to 6C are time response waveform views for explaining the disturbance inhibiting effect of the disturbance estimation device 12 of the disk storage apparatus in the first embodiment in more detail.

FIG. 6A shows a waveform 61 (shown by the broken line) of the disturbance $\tau_d$ due to an inertia force exerted on the actuator 7 and a waveform 62 of the disturbance estimation signal $\tau_{dest}$ outputted by the disturbance estimation device 12 when a half-sine wave-shaped rotational shock with the maximum angular acceleration $d\omega_o/dt$ of 5000 radian/sec² is exerted on the disk storage apparatus from the outside. Expressing an inertia moment J about the bearing 4 of the actuator 7 as 0.1 g·cm², the maximum value of the disturbance $\tau_d$ becomes as follows:

$$\tau d_{max} = J \cdot \frac{d\omega_o}{dt} \quad (20)$$

$$\tau_{d\,max} = J \cdot \frac{d\omega_O}{dt}$$

$$= 500 \text{ dyn·cm}$$

Here, selecting the values of an estimation frequency $f_o$ ($\omega_o=2\pi f_o$) and a damping factor $\zeta_o$ for determining control parameters of the formulas 16 and 17 as 3 kHz and 1, respectively, and setting the control band of the positioning control system at 800 Hz, a simulation has been performed.

The disturbance estimation device 12 estimates the disturbance torque $\tau_d$ exerted on the actuator 7 from the drive signal u as the input of the drive device 10 and from the voltage signal $E_d$ outputted by the voltage detection device 11, and outputs the disturbance estimation signal $\tau_{dest}$ substantially similar to the actual disturbance $\tau_d$, though a little time delay exists.

FIG. 6B shows a waveform 64 of the drive current $I_a$ when the disturbance estimation signal $\tau_{dest}$ has been exerted on the actuator 7 in a manner that the disturbance estimation signal $\tau_{dest}$ outputted by the disturbance estimation device 12 is inputted into the correction device 15 to negate a fluctuation due to the disturbance $\tau_d$, and shows a simulation result of a waveform 63 of the drive current $I_a$ when the disturbance estimation signal $\tau_{dest}$ is not inputted into the correction device 15. The torque constant $K_t$ of the actuator 7 is 23 dyn·cm/mA.

Servo information recorded on the disk 1 has been recorded on the disk in a discrete condition having a certain sampling period, so that the head position signal is not a continuous signal. Therefore, the position control signal c of the position control device 14 for implementing digital processing is changed into a step-shaped one. As a result, the waveform of the drive current $I_a$ of the actuator 7 when the disturbance estimation signal $\tau_{dest}$ is not inputted into the correction device 15 becomes the same waveform as that of the position control signal c, so that the waveform is changed into a step-shaped one as shown in the waveform 63 of FIG. 6B ($I_a=g_m\cdot c=g_m\cdot u$). The waveform 64 of the drive current $I_a$ of the actuator 7 when the disturbance estimation signal $\tau_{dest}$ has been inputted into the correction device 15 is produced by adding the disturbance estimation signal $\tau_{dest}$ of the disturbance estimation device 12 to the control signal c of the position control device 14 by the correction device 15, so tha the time delay thereof from a point (t=0) when a rotational shock is exerted on the disk storage apparatus is smaller than that of the waveform 63 of FIG. 6B. In addition, the waveform 64 is changed smoothly.

FIG. 6C shows a waveform 66 of the track position error signal e when the disturbance estimation signal $\tau_{dest}$ has been exerted on the actuator 7 in a manner that the disturbance estimation signal $\tau_{dest}$ outputted by the disturbance estimation device 12 is inputted into the correction device 15 to negate a fluctuation due to the disturbance, and shows a simulation result of a waveform 65 of the position error signal e when the disturbance estimation device 12 is not applied. Even when a half-sine wave-shaped rotational shock is exerted on the disk storage apparatus from the outside, if the disturbance estimation device 12 is applied, the position error signal e is not largely fluctuated as with the waveform 66, so that compared to the waveform 65 when the disturbance estimation device 12 is not applied, the disturbance inhibiting effect has been improved.

As a result, the disk storage apparatus of the first embodiment correctly detects the disturbance due to an inertia force exerted on the actuator 7 by a vibration or a shock exerted from the outside by the use of the disturbance estimation device 12 to allow a track dislocation due to the disturbance to be inhibited, whereby the head 2 is controlled at a high accuracy to be positioned to the target track. Therefore, the tracking control stable against the shock or vibration can be implemented, thereby improving the reliability of the disk storage apparatus.

Figure 7A:
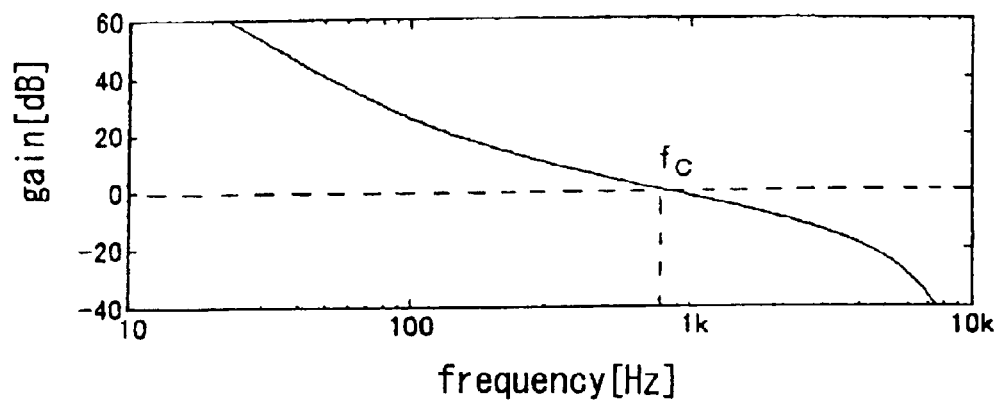
FIG. 7A is a frequency gain characteristic view of the open loop of a positioning control system in a case where the disturbance estimation device of the disk storage apparatus in the first embodiment according to the present invention takes account of the inductance of a drive coil.
Figure 7B:
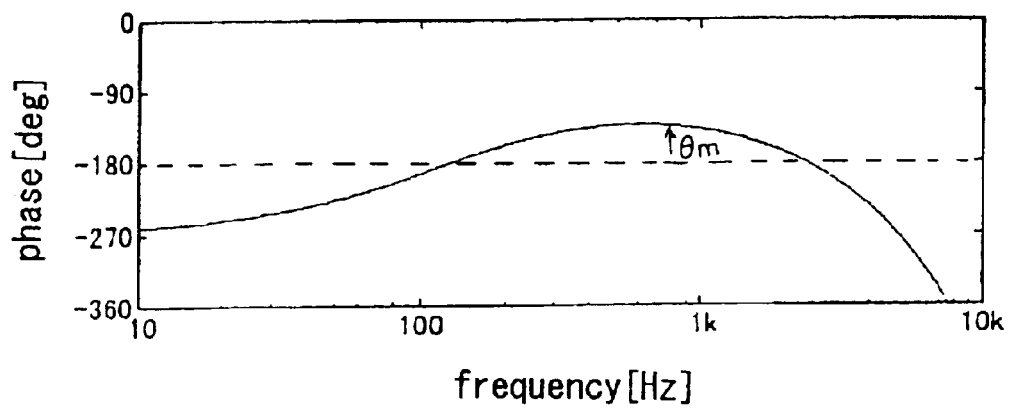
FIG. 7B is a frequency to phase characteristic view corresponding to FIG. 7A.

FIGS. 7A and 7B are open loop frequency characteristic views showing the transfer from the position error signal e to a head position x in the block diagram of the positioning control system of the disk storage apparatus of the first embodiment shown in FIG. 2. As can be understood from the gain characteristic view of FIG. 7A, a gain crossover frequency $f_c$ with which the open loop gain becomes zero is 800 Hz. In addition, as can be understood from the phase characteristic view of FIG. 7B, with the gain crossover frequency $f_c$, a phase margin $\theta_m$ is 50 degrees, thus constituting a stable head positioning control system. The reason is as follows. In the block 55 of the voltage detection device 11 surrounded with a single-dot chain line shown in FIG. 2, the block 39 with the voltage drop ($R_{an}+L_{an}\cdot s$) is faithfully expressed to obtain the voltage drop of a coil resistance $R_{an}$ and a coil inductance $L_{an}$ generated by conducting the drive current $I_a$ to the drive coil 5. Using the formula 10, the voltage signal $E_d$ of the voltage detection device 11 is the pure output of a induced voltage $E_a$ induced across the drive coil 5 by the rotation of the actuator 7.

Actually, however, since the coil inductance $L_{an}$ is lower than the coil resistance $R_{an}$, it is difficult to accurately configure a circuit. Further, since $L_{an}\cdot s$ is a derivative element, it tends to be particularly influenced by noise and attention should be particularly taken to configure a circuit.

FIGS. 8A and 8B are open loop frequency characteristic views showing the transfer from the position error signal e to the head position x if only the voltage drop of the coil resistance $R_{an}$ is considered among those generated by conducting the drive current $I_a$ to the drive coil 5 while ignoring the voltage drop of the coil inductance $L_{an}$ in the block 39 included in the voltage detection device 11 in the block diagram of the positioning control system shown in FIG. 2.

As is obvious from the gain characteristic view of FIG. 8A and the phase characteristic view of FIG. 8B, if the coil inductance $L_{an}$ of the drive coil 5 is omitted for simplification in the block 39 included in the voltage detection device 11, the head positioning control system including the disturbance estimation device 12 becomes unstable. That is, as can be understood from the gain characteristic view of FIG. 8A, the gain crossover frequency fc with which the open loop gain becomes zero is 900 Hz and the phase at that time is a lag phase from −180 degrees, so that the control system becomes unstable. The voltage drop caused by the coil inductance $L_{an}$ included in the drive coil 5 is smaller than that caused by the coil resistance $R_{an}$. However, the term ($L_{an}\cdot s$) included in the block 39 included in the voltage detection device 11 is an important element to stabilize the positioning control system shown in FIG. 2.

The positioning control system shown in FIG. 2 becomes unstable if the term ($L_{an}\cdot s$) included in the block 39 is omitted for the following reason. Although the actual drive coil 5 contains the component of the coil resistance $R_a$ and that of the coil inductance $L_a$, the voltage detection device 11 does not include the component of the coil inductance $L_{an}$. Therefore, to stabilize the positioning control system, the coil inductance of the drive coil 5 may be made equivalently zero.

Figure 9:
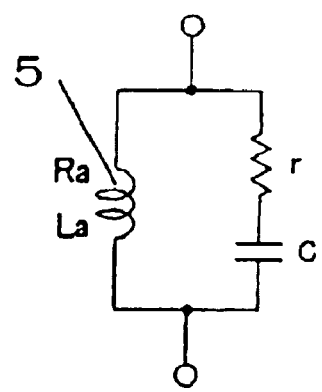
FIG. 9 is a circuit configuration view of a capacitor and a resistance connected in parallel to the drive coil of the disk storage apparatus in the first embodiment according to the present invention.

FIG. 9 shows a circuit configuration to stabilize the positioning control system, in which a circuit having a capacitor C and a resistor r connected in series is connected to the drive coil 5 in parallel. In FIG. 9, a composite impedance $Z_a$ if the circuit having the capacitor C and the resistor r connected in series is connected to the drive coil 5 in parallel is expressed by the following formula 21. In the formula 21, $R_a$ indicates the coil resistance of the drive coil 5 and $L_a$ indicates the inductance thereof.

$$Z_a = \frac{(R_a + L_a \cdot s)\left(r + \frac{1}{C \cdot s}\right)}{R_a + r + L_a \cdot s + \frac{1}{C \cdot s}} \tag{21}$$

Selecting the values of the resistor r and the capacitor C as shown in formulas 22 and 23, respectively, Za in the formula 21 can be expressed by formula 24.

$$r = R_a \tag{22}$$

$$C = \frac{L_a}{R_a^2} \tag{23}$$

$$Z_a R_a \tag{24}$$

That is, if the values of the resistor r and the capacitor C which constitute the circuit shown in FIG. 9 are set at those shown in the formulas 22 and 23, respectively, the composite impedance $Z_a$ generated across the drive coil 5 is equal to a resistance $R_a$ as seen in the formula 24, so that the drive coil 5 does not equivalently include the coil inductance $L_a$. Therefore, as shown in FIG. 9, by connecting the circuit having the resistor r and the capacitor C connected in series, to the drive coil 5 in parallel, it suffices to consider only the voltage drop caused by the coil resistance $R_{an}$ generated by the conductance of the drive current $I_a$ to the drive coil 5 in the block 39 included in the voltage detection device 11 in the block diagram of the positioning control system shown in FIG. 2, and to use a block 49 shown in FIG. 10 instead of the block 39 included in the voltage detection device 11 shown in FIG. 2. As a result, it is possible to configure the voltage detection device 11 more simply.

Figure 10:
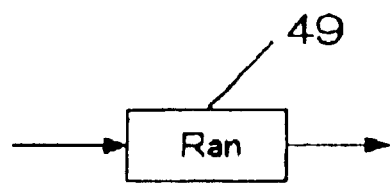
FIG. 10 is a block diagram showing the changed parts of the disturbance estimation device of the disk storage apparatus in the first embodiment according to the present invention.

In FIGS. 8A and 8B, waveforms indicated by dotted lines are open loop frequency characteristics which show the transfer from the position error signal e to the head position x if the block 39 is replaced by the block 49 shown in FIG. 10 and if the circuit having the resistor r and the capacitor C, expressed by the formulas 22 and 23, respectively, connected in series is connected in parallel to the drive coil 5 of the actuator 7 across the coil 5, in the block diagram of the positioning control system of the disk storage apparatus of the first embodiment shown in FIG. 2. As can be understood from FIGS. 8A and 8B, the open loop frequency characteristics are almost equal to those shown in FIGS. 7A and 7B.

In the above-mentioned explanation, the stability of the positioning control system if the coil resistance $R_{an}$ of the block 49 included in the voltage detection device 11 is equal to the coil resistance $R_a$ of the drive coil 5 of the actuator 7, i.e., the formula 8 ($R_a = R_{an}$) is satisfied and the transfer function F(s) of the filter device 16 is 1, is shown.

However, the coil resistance $R_a$ of the drive coil 5 of the actuator 7 has a fluctuation of resistance value and the resistance value is changed following temperature rise after a drive current $I_a$ is carried to the drive coil 5 to heat the drive coil 5. Therefore, even if the coil resistance $R_a$ of the drive coil 5 of the actuator 7 is initially equal to a nominal value $R_{an}$, the resistance value of the drive coil 5 is changed by the temperature rise during the operation, with the result that the formula 8 ($R_a = R_{an}$) is not satisfied.

Figure 11A:
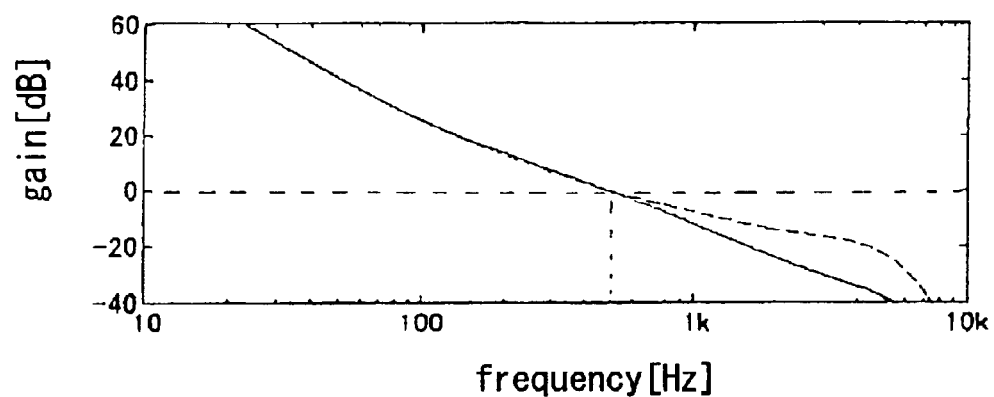
FIG. 11A is a frequency gain characteristic view of the open loop of the positioning control system of the disk storage apparatus in the first embodiment according to the present invention in a case where a filter is not inserted between the output of the disturbance estimation device and the input of the correction device (indicated by a solid line) and in a case where the disturbance estimation device does not take account of the inductance of the drive coil (indicated by a broken line)
Figure 11B:
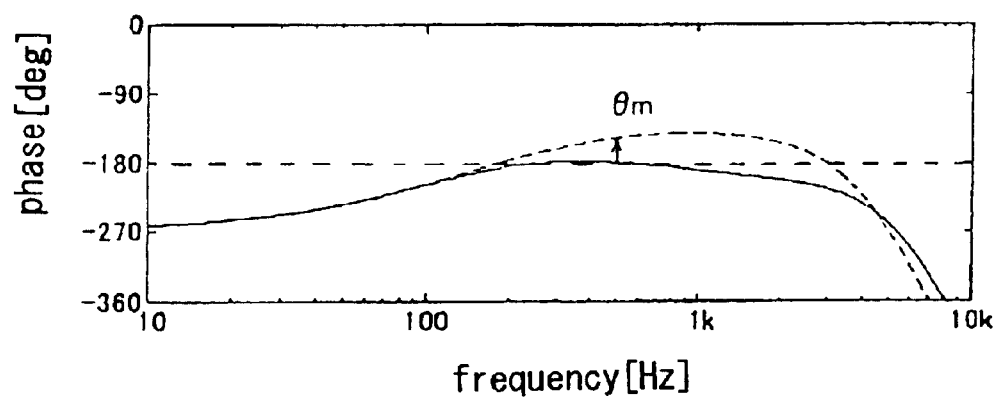
FIG. 11B is a frequency phase characteristic view corresponding to FIG. 11A.

In FIGS. 11A and 11B, waveforms indicated by solid lines are open loop frequency characteristics which show the transfer from the position error signal e to the head position x if the coil resistance $R_a$ of the drive coil 5 of actuator 7 is not equal to the nominal value $R_{an}$, in the block diagram of the positioning control system shown in FIG. 2.

In a simulation, the component of a coil inductance $L_{an}$ is omitted in the block 39 included in the voltage detection device 11, and frequency characteristics if the coil resistance $R_a$ of the drive coil 5 of the actuator 7 is larger than the nominal value $R_{an}$ by 5% is obtained while the circuit having the resistor r and the capacitor c connected in series and determined by the formulas 22 and 23 is connected in parallel to the drive coil (FIG. 9). That is, as can be understood from the gain characteristic view of FIG. 11A, the gain crossover frequency fc with which the open loop gain becomes zero is 500 Hz. As shown in FIG. 11B, phase at that time is approximately −180 degrees. Because of insufficient phase margin, the control system is unstable.

Next, the significance of providing the filter device 16 between the disturbance estimation device 12 and the correction device 15 will be described.

In the disk storage apparatus in the first embodiment shown in FIG. 2, if the disturbance estimation signal $\tau_{dest}$ outputted from the disturbance estimation device 12 is applied to the positioning control system as it is through the correction device 15 while the coil resistance $R_a$ of the drive coil 5 of the actuator 7 is not equal to the nominal value $R_{an}$, the positioning control system becomes unstable. To stabilize the positioning control system, therefore, the disturbance estimation signal $\tau_{dest}$ outputted from the disturbance estimation device 12 expressed by the block 30 in FIG. 2 is outputted to the correction device 15 of the block 47 through the filter device 16 of the block 54.

The filter device 16 conducts filter processing as expressed by the transfer function F(s) of the formulas 4 and 5, produces a filter signal f, and inputs the filter signal into the correction device 15. That is, the high frequency components higher in frequency than the filter low-pass cut-off frequency $f_x$ are out off by the filter device 16. As a result, the high frequency components of the disturbance estimation signal $\tau_{dest}$ outputted from the disturbance estimation device 12 are not equivalently outputted to the correction device 15. That is the significance of providing the filter device 16 between the disturbance estimation device 12 and the correction device 15. The significance will be described concretely below.

In FIGS. 11A and 11B, waveforms indicated by dotted lines are open loop frequency characteristics which show the transfer from the position error signal e to the head position x if the disturbance estimation signal $\tau_{dest}$ outputted from the disturbance estimation device 12 is outputted to the correction device 15 of the block 47 through the filter device 16 of the block 54, in the block diagram of the positioning control system of the disk storage apparatus in the first embodiment shown in FIG. 2.

In a simulation, frequency characteristics if the filter low-pass cut-off frequency $f_x$ is set at 400 Hz in the block 54 showing the filter device 16, and the coil resistance $R_a$ of the drive coil 5 of the actuator 7 is higher than the nominal value $R_{an}$ by 5%. As can be understood from the gain characteristic view of FIG. 11A, the gain crossover frequency fc with which the open loop gain becomes zero is 500 Hz. In addition, as can be understood from the phase characteristic view of FIG. 11B, with the gain crossover frequency fc, the phase margin $\theta_m$ is 40 degrees, thus constituting a stable head positioning control system.

That is, by inserting the filter device 16 between the output of the disturbance estimation device 12 and the input of the correction device 15, it is possible to stabilize the positioning control system even if the coil resistance $R_a$ of the drive coil 5 of the actuator 7 is not equal to the nominal value $R_{an}$ due to the change of the resistance value by the resistance fluctuation or temperature rise.

The disk storage apparatus of the first embodiment explained above is configured such that the drive signal u outputted from the block 47 is outputted as one of the input signals for the disturbance estimation device 12. Needless to say, the same effect can be attained even if the drive current $I_a$ outputted from the drive device 10 outputted from the block 22 instead of the drive signal u is used.

Second Embodiment

Figure 12:
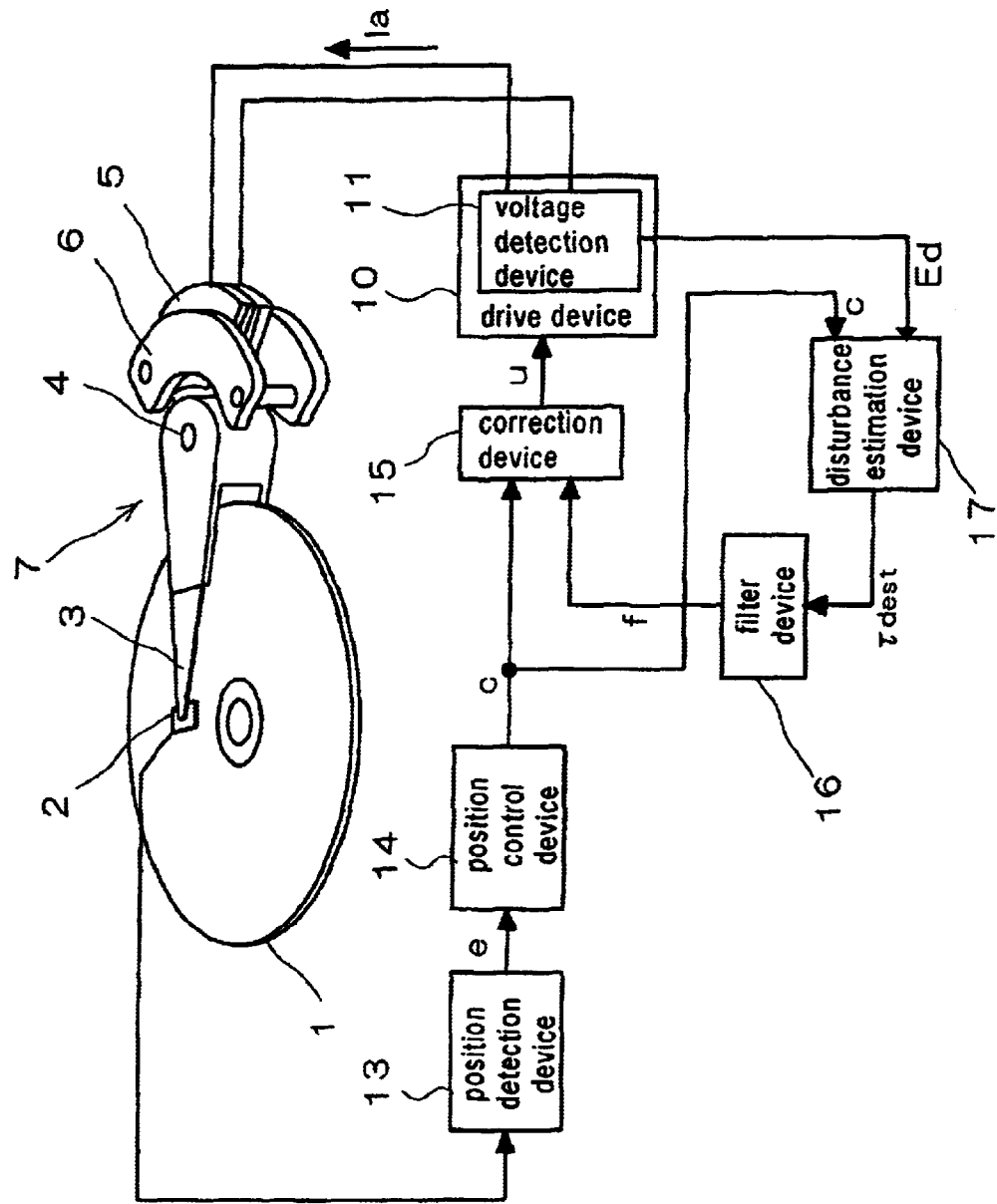
FIG. 12 is a block diagram showing the configuration of a disk storage apparatus in the second embodiment according to the present invention.
Figure 13:
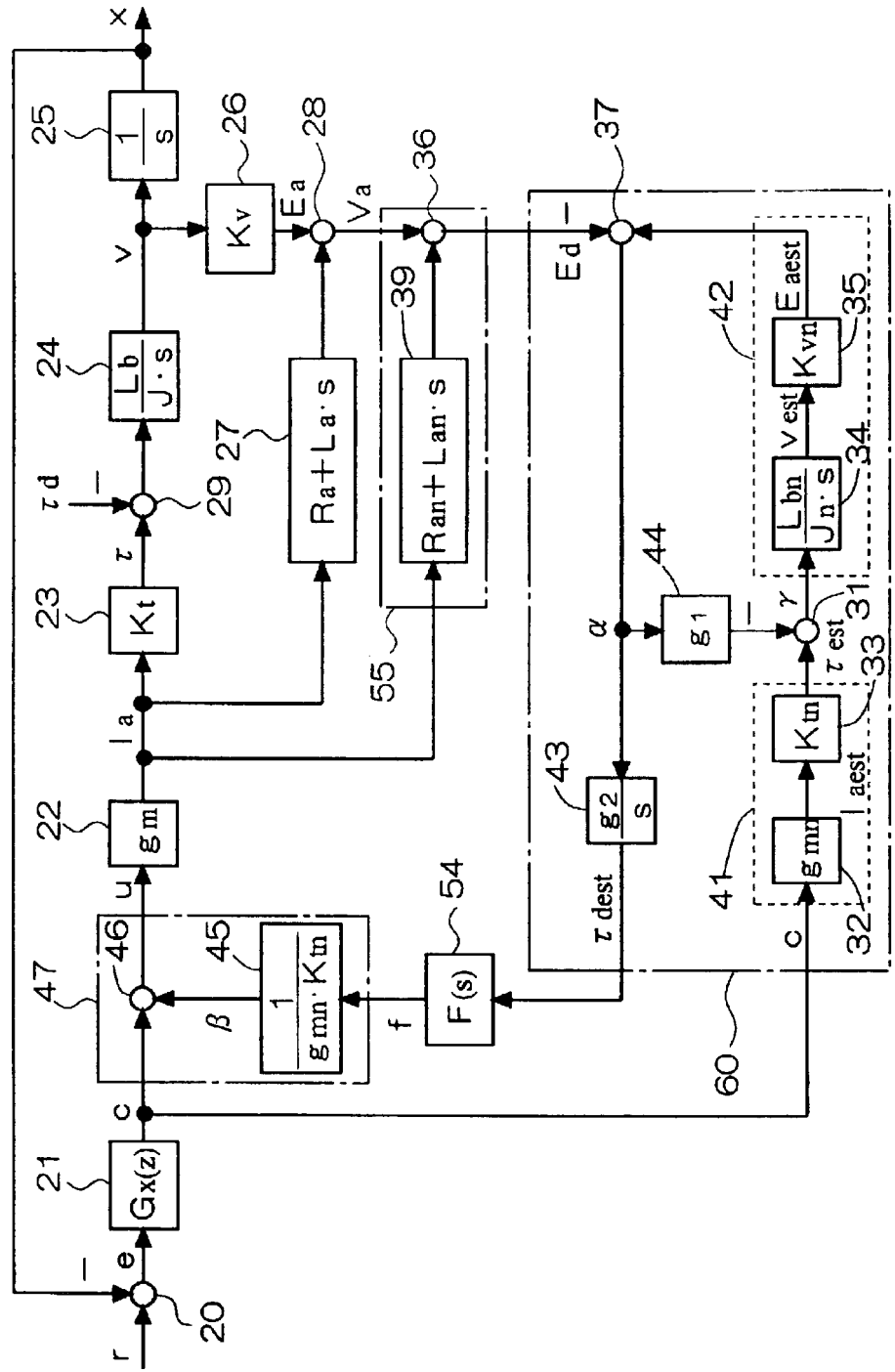
FIG. 13 is a block diagram showing the whole configuration of the positioning control system of the disk storage apparatus in the second embodiment according to the present invention.

FIG. 12 is a block diagram showing the configuration of a magnetic disk storage apparatus which is one example of a disk storage apparatus in the second embodiment according to the present invention. FIG. 13 is a block diagram showing the whole configuration of a head positioning control system in the magnetic disk storage apparatus in the second embodiment. It is noted that components having the same functions are those in the first embodiment are denoted by the same reference numerals, respectively and will not be repeatedly explained.

The disk storage apparatus in the second embodiment of FIG. 12 is different from that in the first embodiment of FIG. 1 in a signal inputted into the disturbance estimation device. While the first embodiment of FIG. 1 has been configured such that the voltage signal $E_d$ and the drive signal u produced by the voltage detection device 11 are inputted into the disturbance estimation device 12, in the second embodiment of FIG. 12, the voltage signal $E_d$ produced by the voltage detection device 11 and the position control signal c produced by the position control device 14 are inputted into disturbance estimation device 17.

The disturbance estimation signal $\tau_{dest}$ produced by the disturbance estimation device 17 of FIG. 12 is inputted into the correction device 15 through the filter device 16. The correction device 15, into which the position control signal c outputted from the position control device 14, the disturbance estimation signal $\tau_{dest}$ produced by the disturbance estimation device 17, and the filter signal f passing through the filter device 16 are inputted, implements a correction computing and then outputs the drive signal u to the drive device 10.

The block 60 surrounded with a single-dot chain line in FIG. 13 is a block diagram of the disturbance estimation device 17. Inputted into the disturbance estimation device 17 are the voltage signal $E_d$ produced by the voltage detection device 11 as the output of the adder 36 and the position control signal c produced by the position control device 14 expressed by the block 21.

In the above-mentioned disturbance estimation device 12 of the first embodiment, the computing has been implemented as follows: A signal obtained by multiplying a deviation signal α from a comparator 37 by the coefficient $g_2/s$ of the first integrator 43, and a signal obtained by multiplying a deviation signal α by the coefficient $g_1$ of the second multiplier 44 are added to each other at the adder 38. A signal obtained by the addition and the drive torque estimation signal $\tau_{dest}$ produced by multiplying a drive signal u by the coefficient $g_{mn} \cdot K_{tn}$ of the first multiplier 41 are inputted into the subtracter 31. The signal γ obtained by the subtraction of the subtractor 31 has been inputted into the second integrator 42. That is, the drive signal u obtained by adding the correction signal β to the control signal c has been inputted into the disturbance estimation device 12, so that the adder 38 of FIG. 2 has been required.

However, the disturbance estimation device 17 of the second embodiment is configured such that the position control signal c is inputted before the correction signal β is added, so that the adder 38 as shown in FIG. 2 is not required.

Compared to the operation of the disturbance estimation device 12 of the first embodiment, the operation of the disturbance estimation device 17 of the disk storage apparatus of the second embodiment configured as explained above will be explained hereinafter referring to FIGS. 2 and 13.

First, in FIG. 2, expressing the input of the second integrator 42 constituting the disturbance estimation device 12 of the first embodiment as γ, by noting the subtracter 31, the signal γ is expressed as follows:

$$\gamma = \tau_{est} - (\tau_{dest} + g_1 \cdot \alpha)$$

$$\gamma = \tau_{est} - (\tau d_{est} + g_1 \cdot \alpha) \tag{25}$$

$$= g_{mn} \cdot K_{tn} \cdot u - (\tau d_{est} + g_1 \cdot \alpha)$$

$$= g_{mn} \cdot K_{th} \cdot u - (\tau_{dest} + g_1 \cdot \alpha)$$

While by noting the adder 46 of FIG. 2, the drive signal u is expressed by the formula 26:

$$u = c + \beta \tag{26}$$

$$= c + \frac{1}{g_{mn} \cdot K_{th}} \cdot \tau_{dest}$$

-continued $$u = c + \beta$$
$$= c + \frac{1}{g_{mn} \cdot K_{tn}} \cdot \tau d_{est}$$

Therefore, from the formulas 25 and 26, the signal γ can be expressed by the formula 27:

$$\gamma = g_{mn} \cdot K_m \cdot c - g_1 \cdot \alpha \quad (27)$$

Based on the formula 27, the block diagram 30 of the disturbance estimation device 12 of the first embodiment shown in FIG. 2 is changed to the block diagram 60 of the disturbance estimation device 17 shown in FIG. 13. As shown in FIG. 13, the position control signal c produced by the position control device 14 (block 21) is inputted into the multiplier 32, and the output of the multiplier 32 is inputted into the multiplier 33. Hence, multiplying the position control signal c by the coefficient $g_{mn} \cdot K_{tn}$ allows the drive torque estimation signal $\tau_{est}$ to be obtained.

On the other hand, the disturbance estimation signal $\tau_{dest}$ is inputted into the correction device 15 expressed by the block 47 through the filter device 16 expressed by the block 54. Therefore, similarly the first embodiment, the disk storage apparatus of the second embodiment estimates the disturbance torque acting on the arm 3 from the voltage signal $E_d$ produced by the voltage detection device 11 and the position control signal c produced by the position control device 14, and outputs the disturbance estimation signal $\tau_{dest}$ by the function of the disturbance estimation device 17. The disturbance estimation signal $\tau_{dest}$ is inputted into the correction device 15 so as to negate the disturbance $\tau_d$ such as a pivot bearing friction, an elastic force, and an inertia force exerted on the arm 3.

Further, similarly to the disk storage apparatus of the first embodiment, since the filter device 16 is inserted between the output of the disturbance estimation device 17 and the input of the correction device 15, it is possible to stabilize the positioning control system even if the coil resistance $R_a$ of the drive coil 5 of the actuator 7 is not equal to the nominal value $R_{an}$ due to the change of the resistance value by the resistance fluctuation or temperature rise.

Therefore, the disk storage apparatus of the second embodiment can correctly detect the disturbance such as an inertia force acting on the actuator 7 due to shock/vibration applied from the outside by the disturbance estimation device 17. This disk storage apparatus is configured such that even if the disturbance $\tau_d$ acts on the actuator 7, such as pivot bearing friction, an elastic force of the FPC, an inertia force due to shock/vibration exerted from the outside, the disturbance estimation device 17 is controlled to estimate this disturbance $\tau_d$ and the disturbance $\tau_d$ exerted from the outside is negated by the disturbance estimation signal $\tau_{dest}$ thus estimated. Therefore, similarly to the first embodiment, the disturbance $\tau_d$ exerted from the outside acts as if the disturbance $\tau_d$ is exerted through the filter having the cut-off frequency characteristic of the formula 19 and FIG. 5 on the positioning control system. Hence, according to the disk storage apparatus of the second embodiment, with a frequency lower than the angular frequency $\omega_0$, it is possible to inhibit the disturbance by the first-order low frequency cut-off characteristic, and to inhibit a track dislocation due to the disturbance, whereby the head 2 is controlled at a high accuracy to be positioned to the target track. Therefore, the tracking control stable against the shock or vibration can be implemented, thereby improving the reliability of the disk storage apparatus.

As can be seen, according to the disk storage apparatus of the second embodiment, the number of adders required to constitute the disturbance estimation device 17 can be reduced compared with the disk storage apparatus of the first embodiment. Therefore, compared with the first embodiment, the disk storage apparatus of the second embodiment can estimate the disturbance $\tau_d$ acting on the arm 3 such as a pivot bearing friction, an elastic force and an inertia force acting on the head positioning control system as the disturbance, by simple configuration, stably control head positioning, and position the head 2 to the target track formed at narrow track pitches with high accuracy.

Furthermore, according to the disk storage apparatus of the second embodiment, the number of the adders can be reduced, so that when the positioning control system is embodied with a hardware such as an analog circuit, the adjustment of such circuit can be simplified. Further, when the positioning control system is embodied with a software, the computing time delay by computing process can be shortened.

The disturbance estimation device 12 configured similarly to the block 30 shown in FIG. 2, is not affected by the sampling frequency of the sector servo of the disk storage apparatus. Therefore, the control band of the disturbance estimation device 12 can be set higher than that of the positioning control system.

Moreover, according to the disk storage apparatus of the second embodiment, the number of the adders constituting the disturbance estimation device 17 can be reduced. Therefore, when the control system is embodied with a hardware such as an analog circuit, the adjustment of such circuit can be simplified. Further, when the control system is embodied with a software, the computing time delay by computing process can be shortened, thereby making it possible to set the control band higher.

Additionally, according to the disk storage apparatus of the second embodiment, by inserting the filter device 16 between the output of the disturbance estimation device 12 and the input of the correction device 15, it is possible to stabilize the positioning control system even if the coil resistance $R_a$ of the drive coil 5 of the actuator 7 is not equal to the nominal value $R_{an}$ due to the change of the resistance value by the resistance fluctuation or temperature rise.

Third Embodiment

Figure 14:
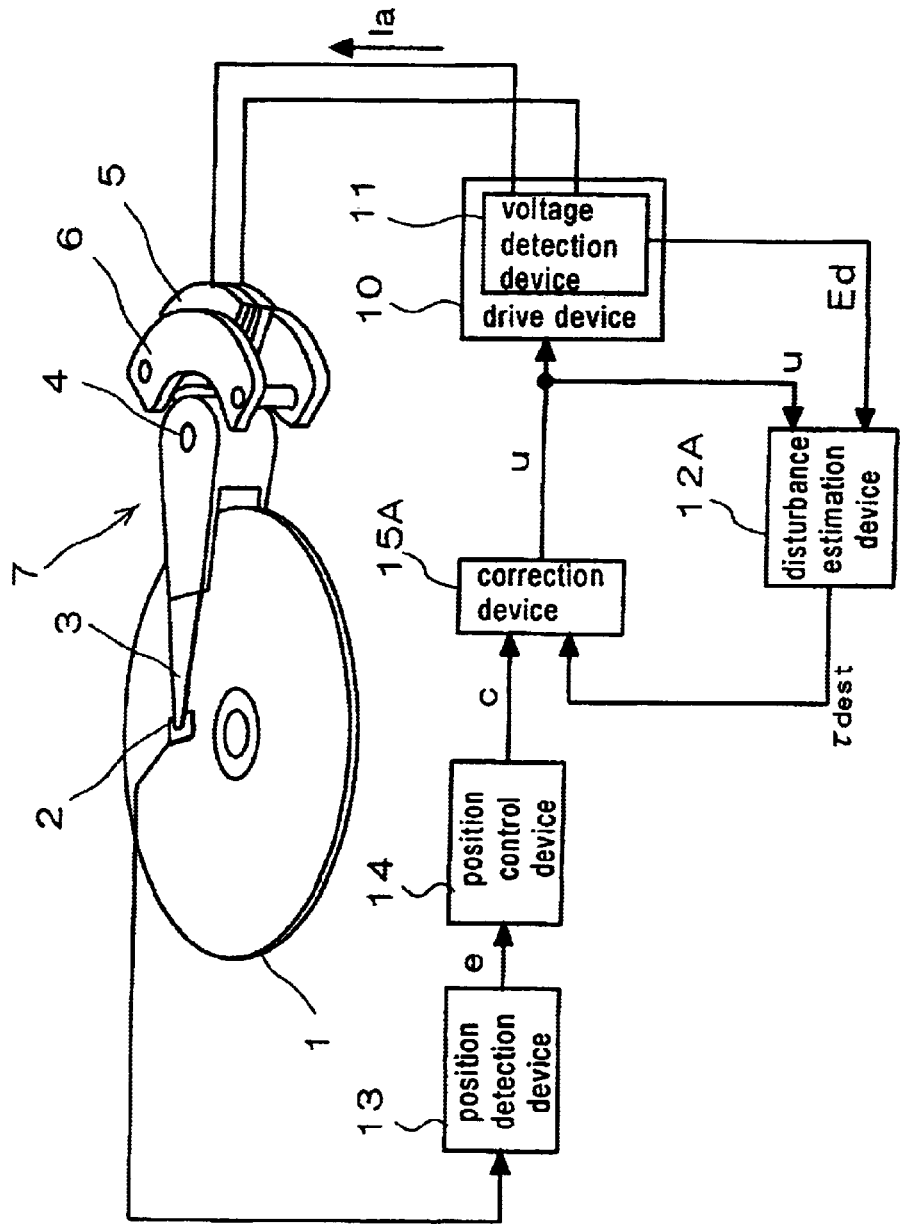
FIG. 14 is a block diagram showing the configuration of a disk storage apparatus in the third embodiment according to the present invention.
Figure 15:
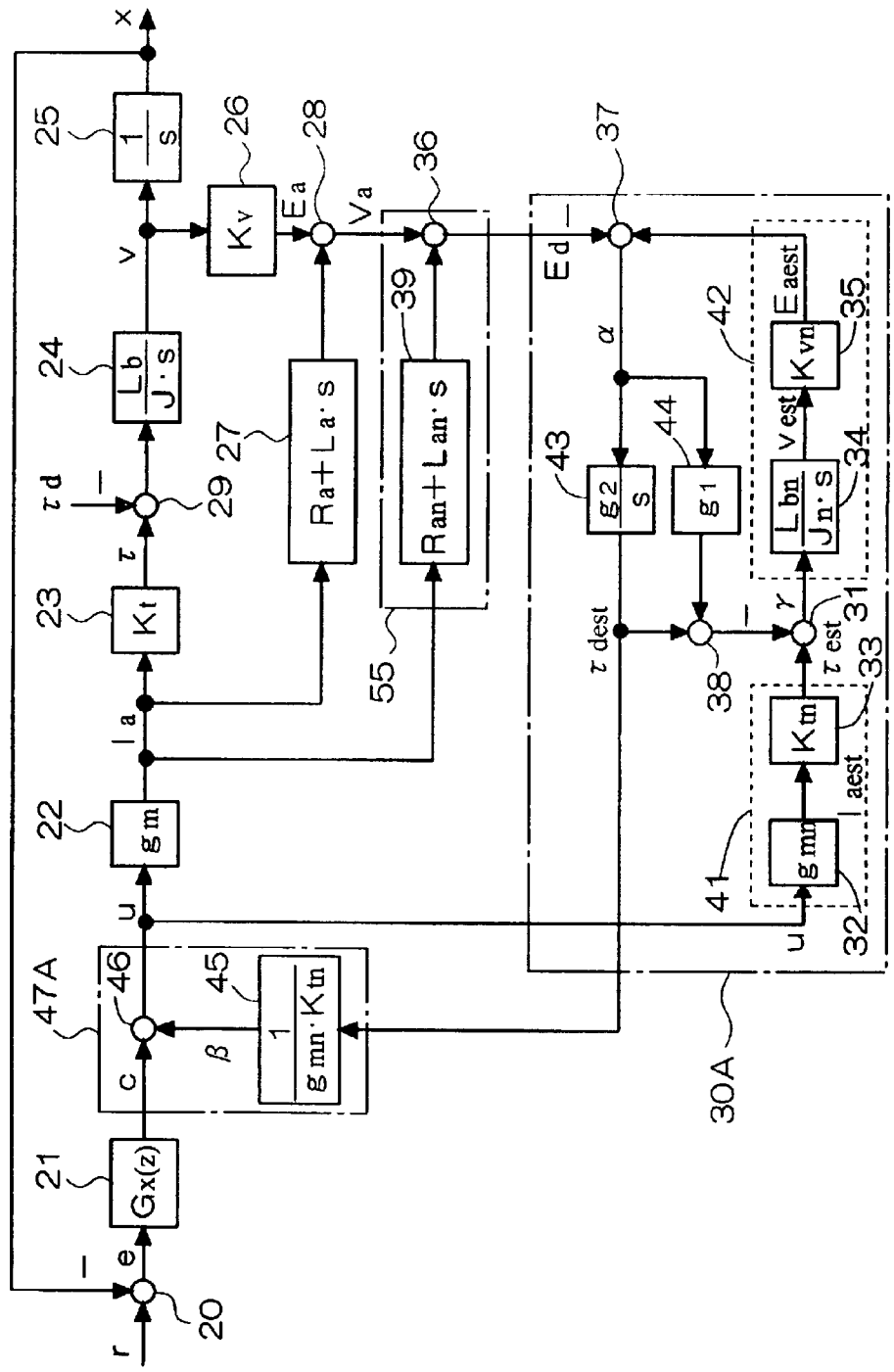
FIG. 15 is a block diagram showing the whole configuration of the positioning control system of the disk storage apparatus in the third embodiment according to the present invention.

FIG. 14 is a block diagram showing the configuration of a magnetic disk storage apparatus which is one example of a disk storage apparatus in the third embodiment according to the present invention. FIG. 15 is a block diagram showing the whole configuration of the positioning control system of the magnetic disk storage apparatus in the third embodiment. In the third embodiment, the filter device 16 and the block 54 having the transfer function F(s) in the first embodiment are not provided. Disturbance estimation device 12A and correction device 15A partially differ from the disturbance estimation device 12 and correction device 15 in the first embodiment. The configurations of the other components are the same as those in the first embodiment shown in FIGS. 1 and 2. It is noted that components or members having the same functions as those shown in the first embodiment are denoted by the same numerals, respectively and will not be repeatedly explained herein.

Next, the operation of the positioning control system of the disk storage apparatus in the third embodiment will be explained hereinafter.

Figure 16A:
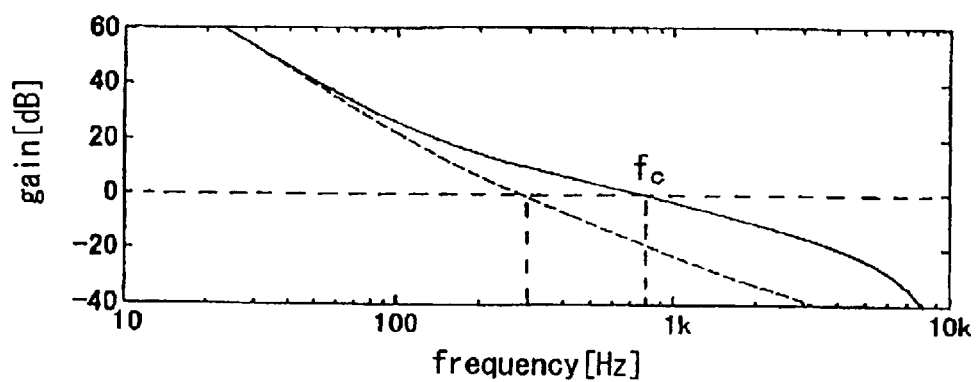
FIG. 16A is a frequency gain characteristic view of the open loop of the positioning control system in a case where the resistance value of the drive coil is not equal to a nominal value in the disturbance estimation device in the third embodiment according to the present invention.
Figure 16B:
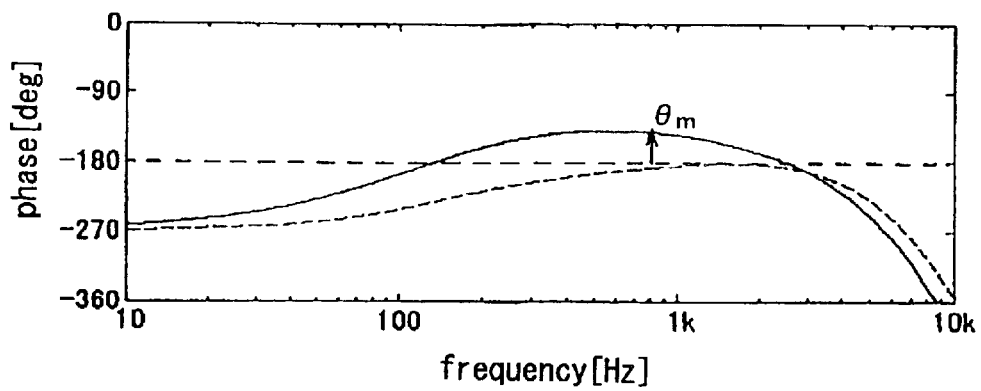
FIG. 16B is a frequency phase characteristic view corresponding to FIG. 16A.

In FIGS. 16A and 16B, waveforms indicated by broken lines are open loop frequency characteristics which show the transfer from the position error signal e to the head position x if the coil resistance $R_a$ of the drive coil 5 of the actuator 7 is not equal to the nominal value $R_{an}$, in the block diagram of the positioning control system shown in FIG. 15. In a simulation, frequency characteristics if the component of the coil inductance $L_{an}$ is omitted in the block 39 included in the voltage detection device 11 and if the coil resistance $R_a$ of the drive coil 5 of the actuator 7 is larger than the nominal value $R_{an}$ by 5%, is obtained. That is, as can be understood from the gain characteristic view indicated by a broken line in FIG. 16A, the gain crossover frequency $f_c$ with which the open loop gain becomes zero is 300 Hz and the phase is almost equal to—210 degrees. Because of lack of phase margin, the positioning control system is unstable.

Next, explanation will be given to a case where the gain crossover frequency with which the open loop gain becomes zero is greatly decreased from that shown in FIG. 7 ($R_a = R_{an}$) if the coil resistance $R_a$ of the drive coil 5 of the actuator 7 is higher than the nominal value $R_{an}$ by 5%.

If the coil resistance $R_a$ of the drive coil 5 of the actuator 7 is not equal to the nominal value $R_{an}$, the voltage signal $E_d$ is expressed by the following formula 28:

$$E_d = E_a + (R_a - R_{an}) \cdot I_a \quad (28)$$

That is, the coil resistance $R_a$ of the drive coil 5 of the actuator 7 is not equal to the nominal value $R_{an}$ due to the change of the resistance value caused by the resistance fluctuation or temperature rise, the voltage signal $E_d$ of the voltage detection device 11 is equal to the output of the addition result of adding the induced voltage $E_a$ induced across the drive coil 5 by the rotation of the actuator 7 to the voltage drop $(R_a - R_{an}) \cdot I_a$ generated by the conduction of the drive current $I_a$ into the drive coil 5.

Figure 17A:
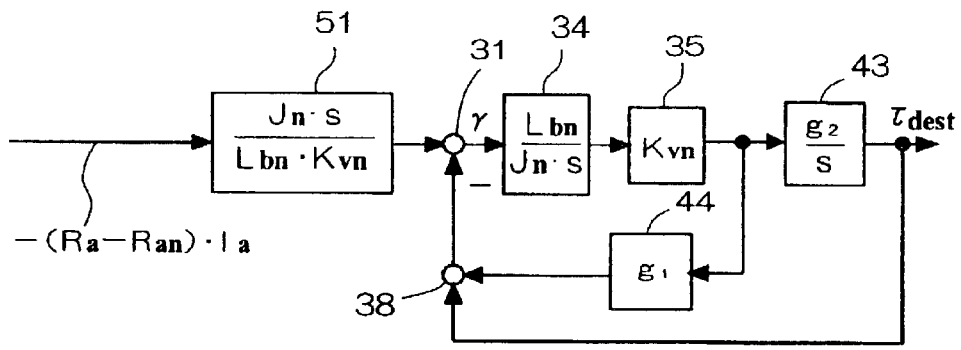
FIG. 17A is a block diagram showing the whole configuration of the positioning control system of the disk storage apparatus in the third embodiment according to the present invention.
Figure 17B:
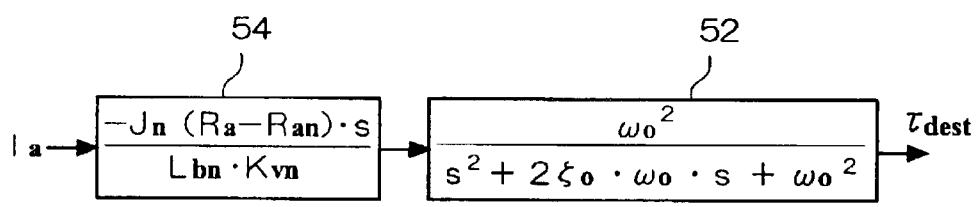
FIG. 17B is a block diagram obtained by equivalently transforming the block diagram of FIG. 17A.

FIGS. 17A and 17B are block diagrams for explaining that the gain changes if the coil resistance $R_a$ of the drive coil 5 of the actuator 7 is not equal to the nominal value $R_{an}$ due to the change of the resistance value caused by the resistance fluctuation or temperature rise.

Figure 17C:
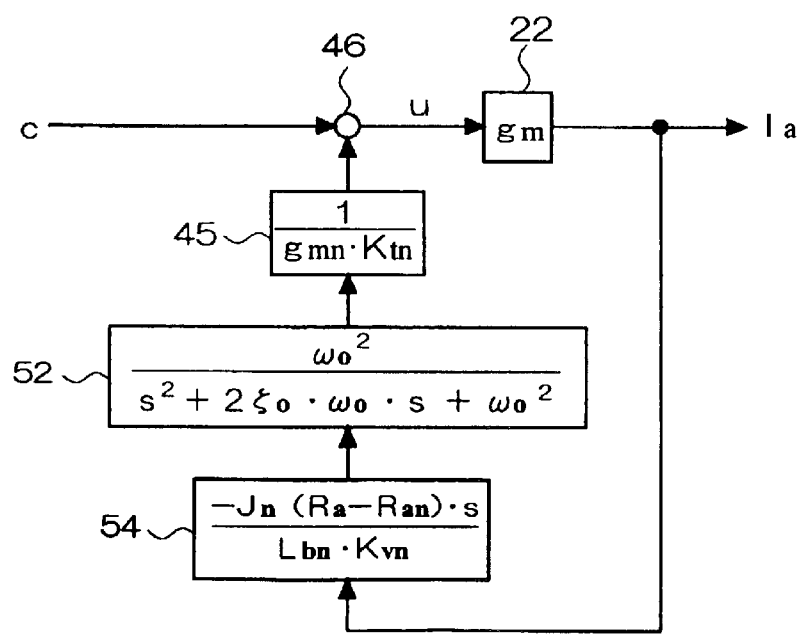
FIG. 17C is a block diagram showing the changed parts of the positioning control system in a case where the resistance value of the drive coil is not equal to the nominal value.

FIG. 17A is a block diagram obtained by changing the block diagram of FIG. 3B while noting the second term of the formula 28. FIG. 17B is a block diagram equivalently transformed from the block diagram of FIG. 17A. FIG. 17C is a block diagram obtained by changing a part of the block diagram of FIG. 15 based on the block diagram of FIG. 17B. That is, if $R_a$ is not equal to $R_{an}$, this is equivalent to the addition of the negative feedback loop of the blocks 54, 52 and 45 to the block 22 (the transfer function is $g_m$) in the block diagram of FIG. 15.

In the block diagram of FIG. 17C, the composite transfer frequency $G_m(s)$ from the position control signal c to the drive current $I_a$ is expressed by the following formula 29.

$$G_m(s) = \frac{g_m}{1 + \frac{g_m}{g_{mn}} \cdot \frac{J_n(R_a - R_{an})}{L_{bn} \cdot K_{vn} \cdot K_{th}} \cdot \frac{\omega_O^2}{s^2 + 2\zeta_O \cdot \omega_O \cdot s + \omega_O^2}} \cdot s \quad (29)$$

In the formula 29, the estimation frequency $f_o$ ($=\omega_o/2\pi$) is set sufficiently higher than the position control band $f_c$, so that formula 30 is established. As a result, the formula 29 can be simplified to formula 31.

$$\frac{\omega_O^2}{s^2 + 2\zeta_O \cdot \omega_O \cdot s + \omega_O^2} = 1 \quad (30)$$

$$G_m(s) = \frac{g_m}{1 + \frac{g_m}{g_{mn}} \cdot \frac{J_n(R_a - R_{an})}{L_{bn} \cdot K_{vn} \cdot K_{th}} \cdot s} \quad (31)$$

In the formula 31, at $R_a = R_{an}$, $G_m(s) = g_{mi}$ however, at $R_a \neq R_{an}$, the gain $G_m(s)$ decreases.

Here, if $g_{mn}$ is substituted as shown in the following formula 32, the formula 31 is transformed to formula 33.

$$g_{mn} = k \cdot g_m \quad (32)$$

$$G_m(s) = \frac{g_m}{1 + \frac{1}{k} \cdot \frac{J_n(R_a - R_{an})}{L_{bn} \cdot K_{vn} \cdot K_{th}} \cdot s} \quad (33)$$

Here, selecting, as the coefficient k of a real number, a number sufficiently greater than 1 (k>>1), the term including $(R_a - R_{an})$, in the denominator of the formula 33 can be regarded as 0. Even if $R_a \neq R_{an}$, the formula 33 can be expressed by formula 34 by approximation.

$$G_m(s) = g_m \quad (34)$$

As stated above, according to the third embodiment, even if the coil resistance $R_a$ of the drive coil 5 of the actuator 7 is not equal to the nominal value $R_{an}$ due to the change of the resistance value by the resistance fluctuation or temperature rise, the composite transfer function $G_m(s)$ from the position control signal c to the drive current $I_a$ does not change and the formula 34 is always established by setting the coefficient k of the actual number sufficiently greater. The significance of this formula is that it does not include $R_a$ and $R_{an}$. Therefore, even if the coil resistance $R_a$ changes due to the resistance fluctuation or temperature rise, the open loop gain of the positioning control system does not greatly change, making it possible to stabilize the positioning control system.

In FIGS. 16A and 16B, waveforms indicated by solid lines are open loop frequency characteristics which show the transfer from the position error signal e to the head position x if the coefficient k of the formula 32 is 50 in the block diagram of the positioning control system shown in FIG. 15. In a simulation, similarly to the cases indicated by broken lines (k=1) in FIGS. 16A and 16B, frequency characteristics are obtained if the coil resistance $R_a$ of the drive coil 5 of the actuator 7 is higher than the nominal value $R_{an}$ by 5%. As can be understood from the gain characteristic view indicated by the solid line in FIG. 16A, the gain crossover frequency $f_c$ with which the open loop gain becomes zero is 800 Hz. In addition, as can be understood from the phase characteristic view indicated by the solid line in FIG. 16B, with the gain crossover frequency $f_c$, the phase margin $\theta_m$ is 50 degrees, thus constituting a stable head positioning control system.

That is, setting the coefficient $g_{mn}$ of the block 32 in the block 30A of the disturbance estimation device 12A and the coefficient $g_{mn}$ of the denominator of the block 45 of the correction device 15A shown in FIG. 15 to be k times (k>>1) of the transfer function $g_m$ of the block 22, it is possible to stabilize the positioning control system even if the coil resistance $R_a$ of the drive coil of the actuator 7 is not equal to the nominal value $R_{an}$ due to the change of the resistance value by the resistance fluctuation or temperature rise.

In the block 30A of the disturbance estimation device 12A in FIG. 15, the block 32 of the first multiplier 41 into which the drive signal u is inputted has a coefficient $g_{mn}$, meaning that the block 32 multiplies the drive signal u by $g_{mn}$. This $g_{mn}$ is expressed by approximation ($g_{mn}=k \cdot g_{mn}$) in the formula 32.

Here, the block 32 can be considered while dividing the block 32 into a block having a coefficient $g_m$ and a block having a coefficient $k_1$ (=k). In this case, similarly to the formula 6 in the first embodiment, the following formula 35 can be set:

$$g_{mn}=g_m \quad (35)$$

Figure 19:
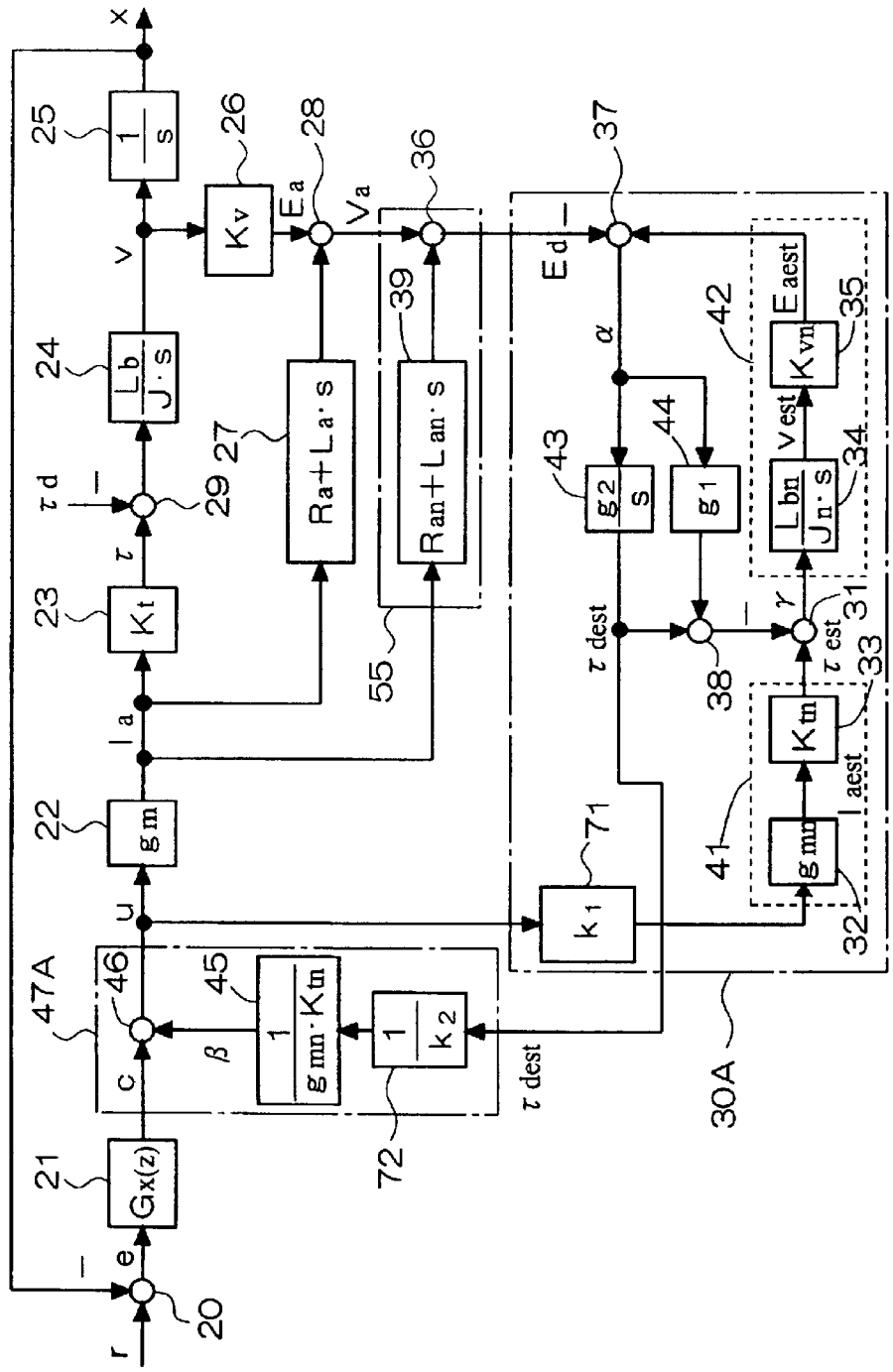
FIG. 19 is a re-drawn block diagram of the whole configuration of the positioning control system (FIG. 15) of the disk storage apparatus in the third embodiment according to the present invention.

If changing FIG. 15 by changing the block 32 to a block having the coefficient $g_{mn}$ equal to the coefficient $g_m$ and the block 71 to a block having the coefficient having a coefficient $k_1$, a block diagram as shown in FIG. 19 is obtained. The coefficient of the block 45, into which the disturbance estimation signal $\tau_{dest}$ is inputted from the first integrator 43, is ($1/g_{mn} \cdot k_{tn}$) and includes $g_{mn}$. Therefore, in FIG. 19, a block 72 having a coefficient ($1/k_2$) is arranged between the first integrator 43 and the block 45. Here, the relationship between $k_1$ of the block 71 and $k_2$ of the block 72 is basically as shown in the following formula 36.

$$k_1=k_2 \quad (36)$$

Practically, however, the condition of the formula 36 is not always essential but $k_1$ and $k_2$ may be approximate to each other with a certain degree of allowance. That is, ks can be expressed by formula 37 wherein an allowance coefficient $\eta$ is close to 1.

$$k_2 \eta \cdot k_1 \quad (37)$$

The concrete value of the allowance coefficient $\eta$ may be appropriately set according to the specification of the actual apparatus. Empirically, the allowance coefficient $\eta$ may be in a range of 0.7 to 1.3, preferably 0.8 to 1.2, more preferably 0.9 to 1.1. These can be expressed as shown in formula 38, 39 and 40, respectively.

$$0.7k_1 \leq k_2 \leq 1.3k_1 \quad (38)$$

$$0.8k_1 \leq k_2 \leq 1.2k_1 \quad (39)$$

$$0.9k_1 \leq k_2 \leq 1.1k_1 \quad (40)$$

It is ideal that the coefficient $\eta$ is 1.0.

Figure 18:
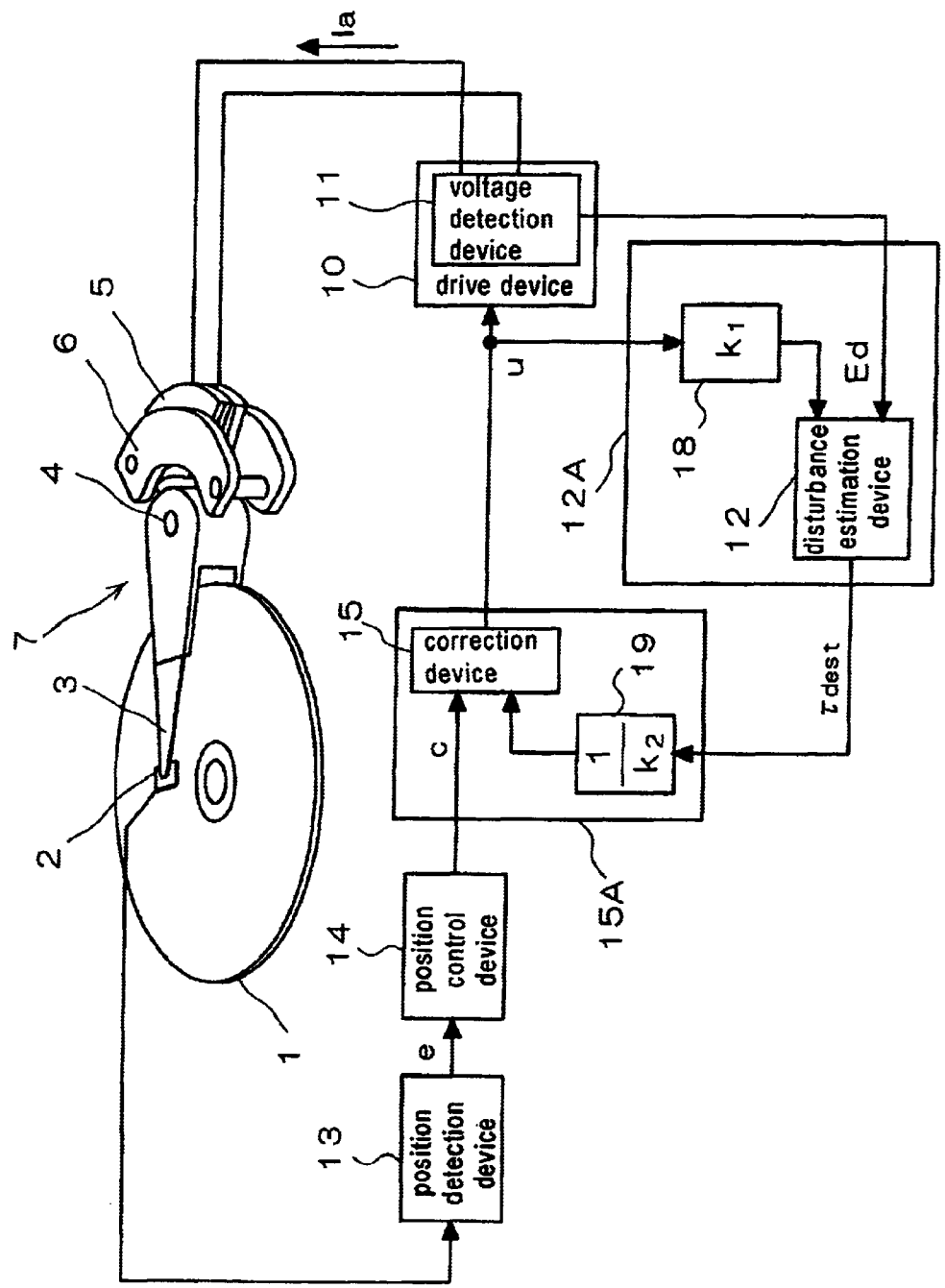
FIG. 18 is a re-drawn diagram of the configuration of the disk storage apparatus (FIG. 14) in the third embodiment according to the present invention.

If changing FIG. 14 to correspond to FIG. 19, the block diagram becomes that shown in FIG. 18. That is, the disturbance estimation device 12A of the third embodiment is the combination of the disturbance estimation device 12 of the first embodiment and the first correction multiplication device 18 of the third embodiment. In addition, the correction device 15A of the third embodiment is the combination of the correction device 15 of the first embodiment and the second correction multiplication device 19 of the third embodiment. The first correction multiplication device 18 having the transfer function of $k_1$ is inserted into the path for transferring the drive signal u from the correction device 15 to the disturbance estimation device 12, and the second correction multiplication device 19 having the transfer function of $k_2$ is inserted into the path for transferring the disturbance estimation signal $\tau_{dest}$ from the disturbance estimation device 12 to the correction device 15. In FIG. 19, the block 71 corresponds to the first correction multiplication device 18, and block 72 corresponds to the second correction multiplication device 19.

If the third embodiment is described based on FIGS. 18 and 19, the disturbance estimation device 12A is configured to generate the disturbance estimation signal $\tau_{dest}$ from the signal obtained by multiplying the drive signal u by $k_1$ and the voltage signal $E_d$. The correction device 15A is configured to combine the position control signal c with the signal obtained by multiplying the disturbance estimation signal $\tau_{dest}$ by $1/k_2$.

The disk storage apparatus in the third embodiment is configured such that the drive signal u outputted from the block 47A is inputted into one of the input signals for the disturbance estimation device 12A. Needless to say, the same effect can be attained even if the drive current $I_a$ outputted from the drive device 10 outputted from the block 22 instead of the drive signal u is used.

Fourth Embodiment

Figure 20:
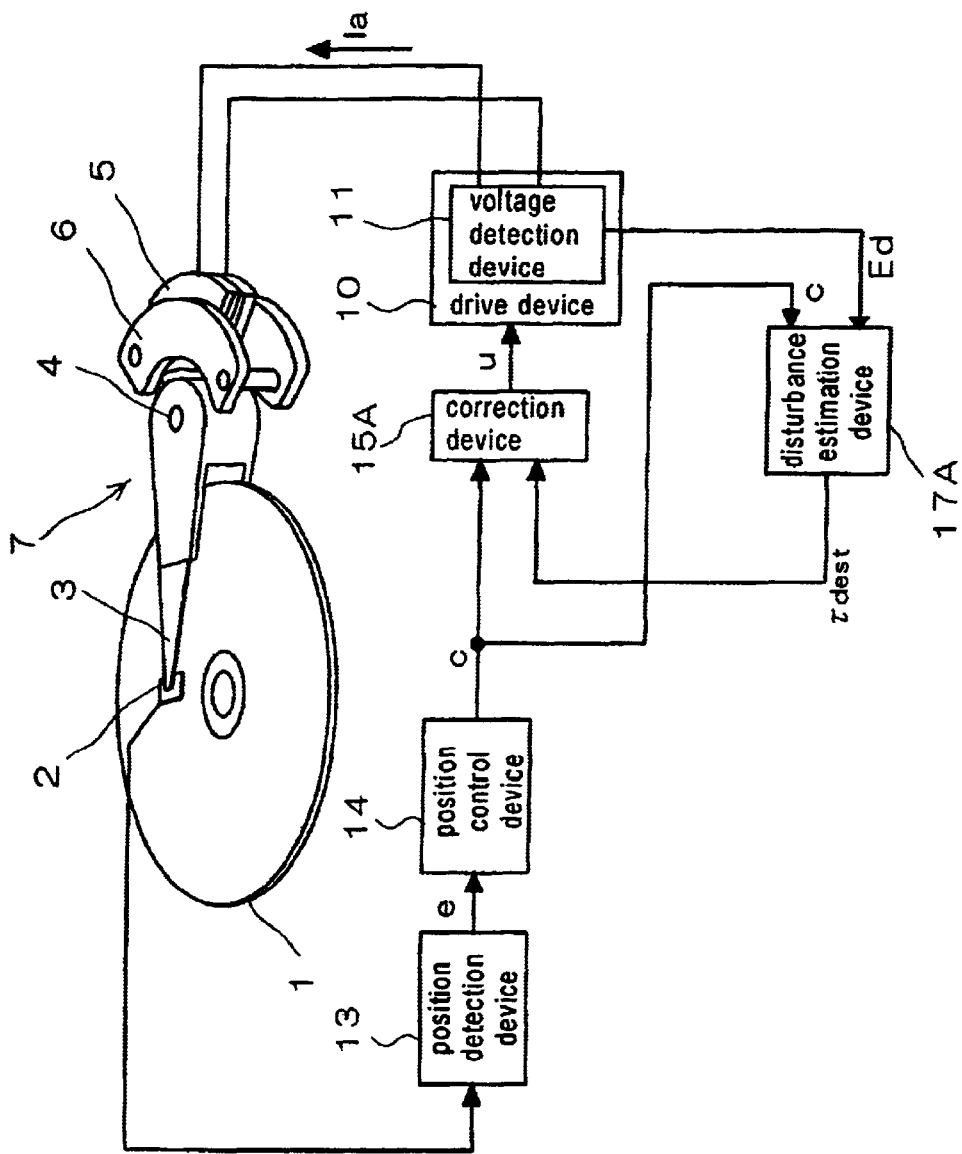
FIG. 20 is a block diagram showing the configuration of a disk storage apparatus in the fourth embodiment according to the present invention.
Figure 21:
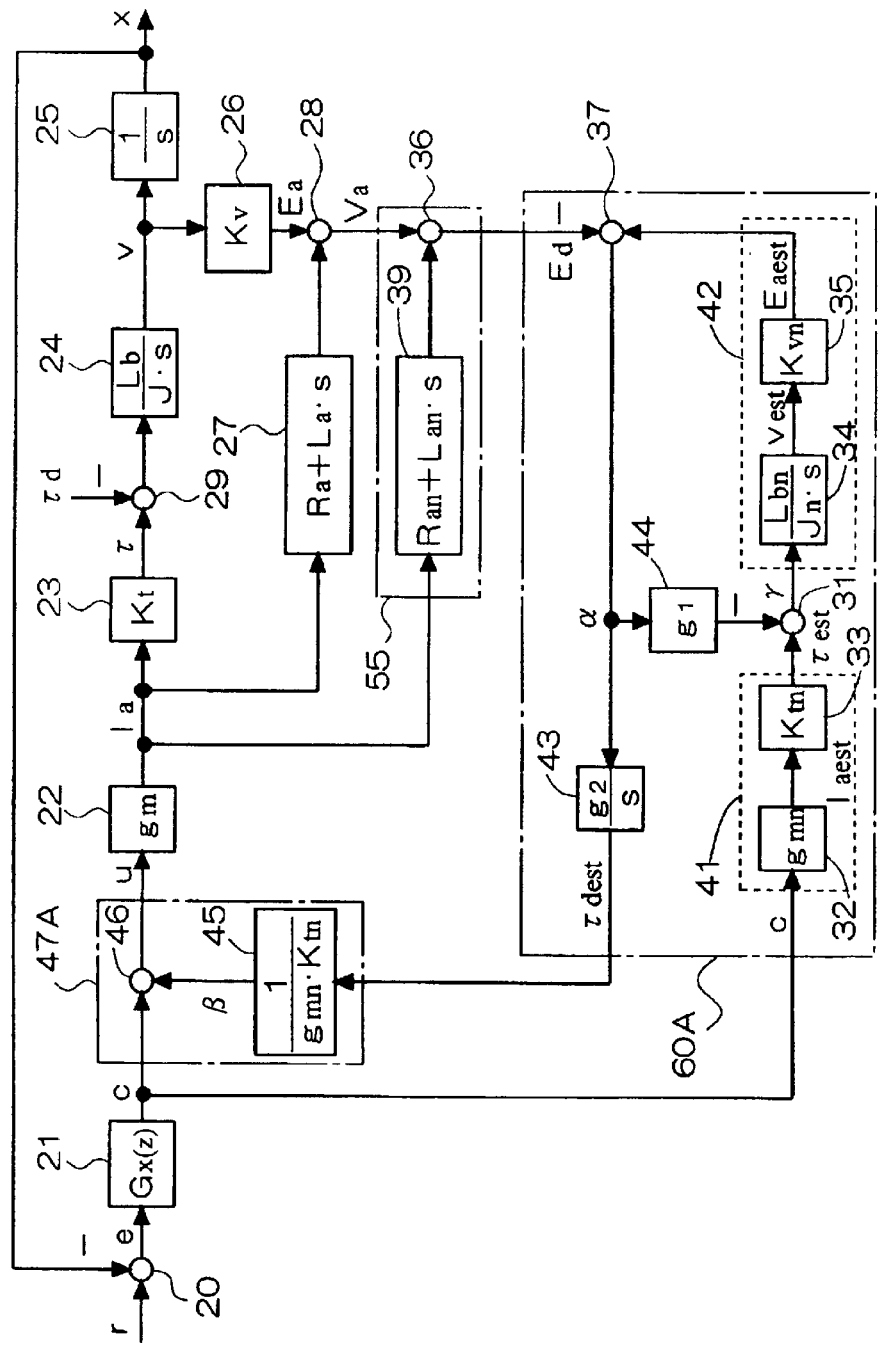
FIG. 21 is a block diagram showing the whole configuration of the positioning control system of the disk storage apparatus in the fourth embodiment according to the present invention.

FIG. 20 is a block diagram showing the configuration of a magnetic disk storage apparatus which is one example of a disk storage apparatus in the fourth embodiment according to the present invention. FIG. 21 is a block diagram showing the whole configuration of the positioning control system of the magnetic disk storage apparatus in the fourth embodiment. In the fourth embodiment, the filter device 16 and the block 54 having the transfer function F(s) in the second embodiment are not provided. Inputs to the disturbance estimation device 17A of the fourth embodiment differ from those of the disturbance estimation device 12A of the third embodiment. That is, the voltage signal $E_d$ from the voltage detection device 11 and the position control signal c from the position control device 14 are inputted into the disturbance estimation device 17A. The configurations of the other components are the same as those in the third embodiment shown in FIGS. 14 and 15. It is noted that components or members having the same functions as those shown in the third embodiment are denoted by the same numerals, respectively and will not be repeatedly explained herein.

The relationship between the disk storage apparatus of the fourth embodiment shown in FIG. 20 and that of the third embodiment shown in FIG. 14 corresponds to the relationship between the disk storage apparatus of the second embodiment shown in FIG. 12 and that of the first embodiment shown in FIG. 1. However, the filter device 16 is not provided. In the third embodiment shown in FIG. 14, the voltage signal $E_d$ produced by the voltage detection device 11 and the drive signal u are inputted into the disturbance estimation device 12A. In the fourth embodiment shown in FIG. 20, the voltage signal $E_d$ produced by the voltage detection device 11 and the position control signal c produced by the position control device 14 are inputted into the disturbance estimation device 17A.

Therefore, in the fourth embodiment, the formulas 25 to 27 are established. Accordingly, if the block 30A of the disturbance estimation device 12A of the third embodiment shown in FIG. 15 is changed, it becomes equal to the block 60A of the disturbance estimation device 17A shown in FIG. 21. This corresponds to FIG. 13 in the second embodiment. However, the block 54 corresponding to the filter 16 is not provided.

Further, by configuring the apparatus similarly to the third embodiment, the formulas 28 to 40 are established in the fourth embodiment. In the formula 32, by setting the coefficient k of the actual number sufficiently greater, it is possible to stabilize the positioning control system even if the coil resistance $R_a$ of the drive coil 5 of the actuator 7 is not equal to the nominal value $R_{an}$ due to the change of the resistance value by the resistance fluctuation or temperature rise.

As a result, according to the disk storage apparatus of the fourth embodiment, the disturbance such as an inertia force acting on the actuator 7 due to shock/vibration exerted from the outside can be correctly detected by the disturbance estimation device 17A. Even if the disturbance $\tau_d$ acts on the actuator 7, such as pivot bearing friction, an elastic force of the FPC, and an inertia force due to shock/vibration exerted from the outside, the disturbance estimation device 17A is controlled to estimate this disturbance $\tau_d$ and the disturbance $\tau_d$ exerted from the outside is negated by the disturbance estimation signal $\tau_{dest}$ thus estimated. Therefore, similarly to the third embodiment, the disturbance $\tau_d$ exerted from the outside acts as if the disturbance $\tau_d$ is exerted through a filter having the cutt-off frequency characteristic of the formula 19 and FIG. 5 on the positioning control system. Hence, according to the disk storage apparatus of the fourth embodiment, with a frequency lower than the angular frequency $\omega_0$, it is possible to inhibit the disturbance by the first-order low frequency cut-off characteristic, and to inhibit a track dislocation due to the disturbance, whereby the head 2 is controlled at a high accuracy to be positioned to the target track. Therefore, the tracking control stable against the shock vibration can be implemented, thereby improving the reliability of the disk storage apparatus.

As can be seen, according to the disk storage apparatus of the fourth embodiment, the number of adders required to constitute the disturbance estimation device 17A can be reduced compared with the disk storage apparatus of the third embodiment. Therefore, compared with the third embodiment, the disk storage apparatus of the fourth embodiment can estimate the disturbance $\tau_d$ acting on the arm 3 such as a pivot bearing friction, an elastic force and an inertia force acting on the head positioning control system as the disturbance, by simple configuration, stably control head positioning, and position the head 2 to the target track formed at narrow track pitches with high accuracy. Furthermore, according to the disk storage apparatus of the fourth embodiment, the number of the adders can be reduced, so that when the positioning control system is embodied with a hardware such as an analog circuit, the adjustment of such circuit can be simplified. Further, when the positioning control system is embodied with a software, the computing time delay by computing process can be shortened.

Similarly to the third embodiment, the disturbance estimation device 17A is not affected by the sampling frequency of the sector servo of the disk storage apparatus. Therefore, the control band of the disturbance estimation device 17A can be set higher than that of the positioning control system.

Moreover, according to the disk storage apparatus of the fourth embodiment, the number of the adders constituting the disturbance estimation device 17A can be reduced. Therefore, when the control system is embodied with a hardware such as an analog circuit, the adjustment of such circuit can be simplified. Further, when the control system is embodied with a software, the computing time delay by computing process can be shortened, thereby making it possible to set the control band higher.

Figure 22:
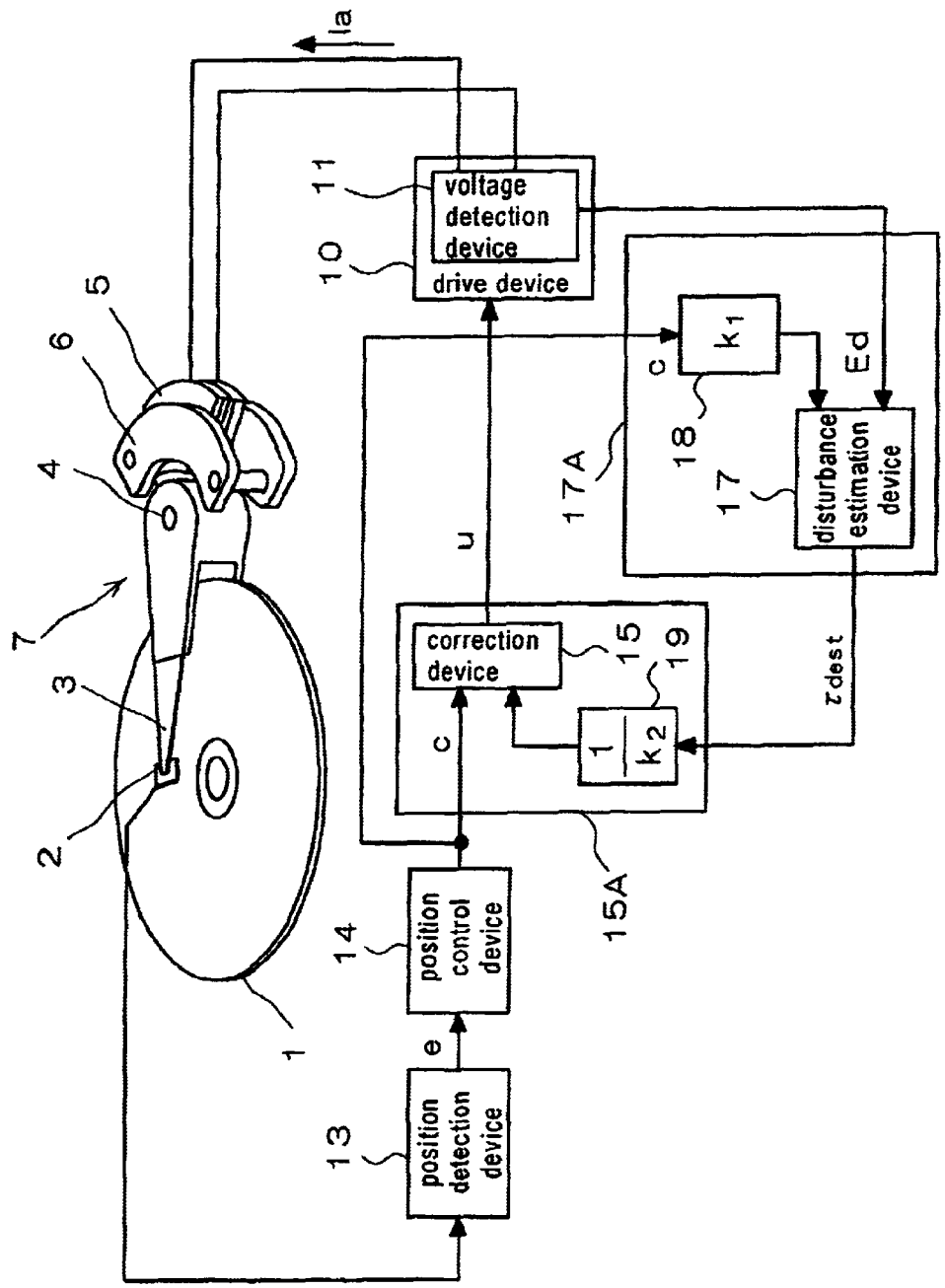
FIG. 22 is a re-drawn block diagram of the configuration of the disk storage apparatus (FIG. 14) in the third embodiment according to the present invention.
Figure 23:
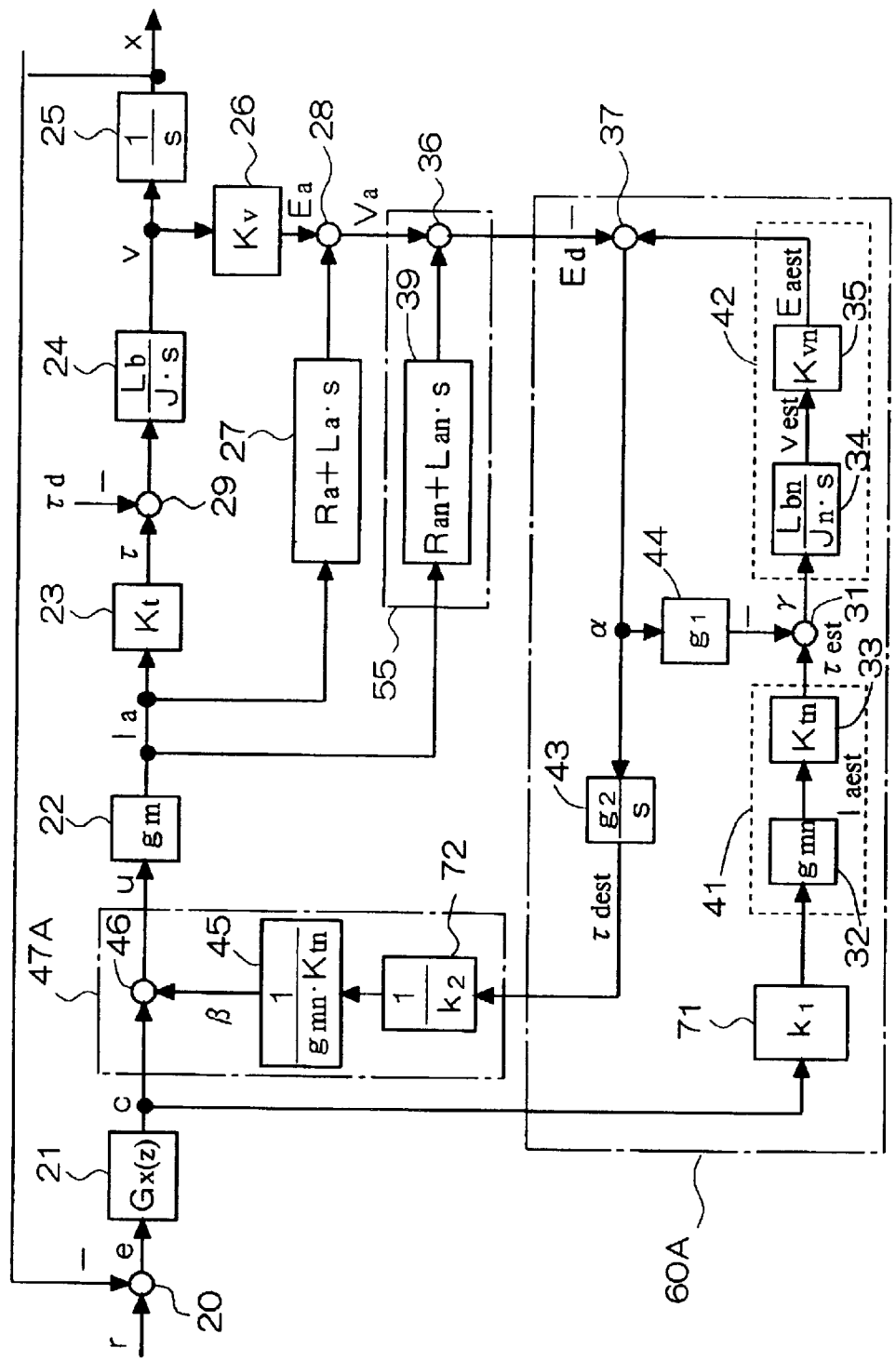
FIG. 23 is a re-drawn block diagram of the whole configuration of the positioning control system (FIG. 15) of the disk storage apparatus in the third embodiment according to the present invention.

If changing FIGS. 20 and 21 using the coefficient $k_1$ and $k_2$ similarly to the third embodiment, the block diagrams become those shown in FIG. 22 and 23, respectively. That is, the disturbance estimation device 17A of the fourth embodiment is the combination of the disturbance estimation device 17 of the second embodiment and the first correction multiplication device 18 of the fourth embodiment. In addition, the correction device 15A of the fourth embodiment is the combination of the correction device 15 of the second embodiment of the second correction multiplication device 19 of the fourth embodiment. The first correction multiplication device 18 having the transfer function of $k_1$ is inserted into the path for transferring the drive signal u from the correction device 15 to the disturbance estimation device 17, and the second correction multiplication device 19 having the transfer function of $k_2$ is inserted into the path for transferring the disturbance estimation signal $\tau_{dest}$ from the disturbance estimation device 17 to the correction device 15. In FIG. 23, the block 71 corresponds to the first correction multiplication device 18, and block 72 corresponds to the second correction multiplication device 19.

If the fourth embodiment is described based on FIGS. 22 and 23, the disturbance estimation device 17A is configured to generate the disturbance estimation signal $\tau_{dest}$ from the signal obtained by multiplying the position control signal c by $k_1$ and the voltage signal $E_d$. The correction device 15A is configured to combine the position control signal c with the signal obtained by multiplying the disturbance estimation signal $\tau_{dest}$ by $1/k_2$.

Figure 24:
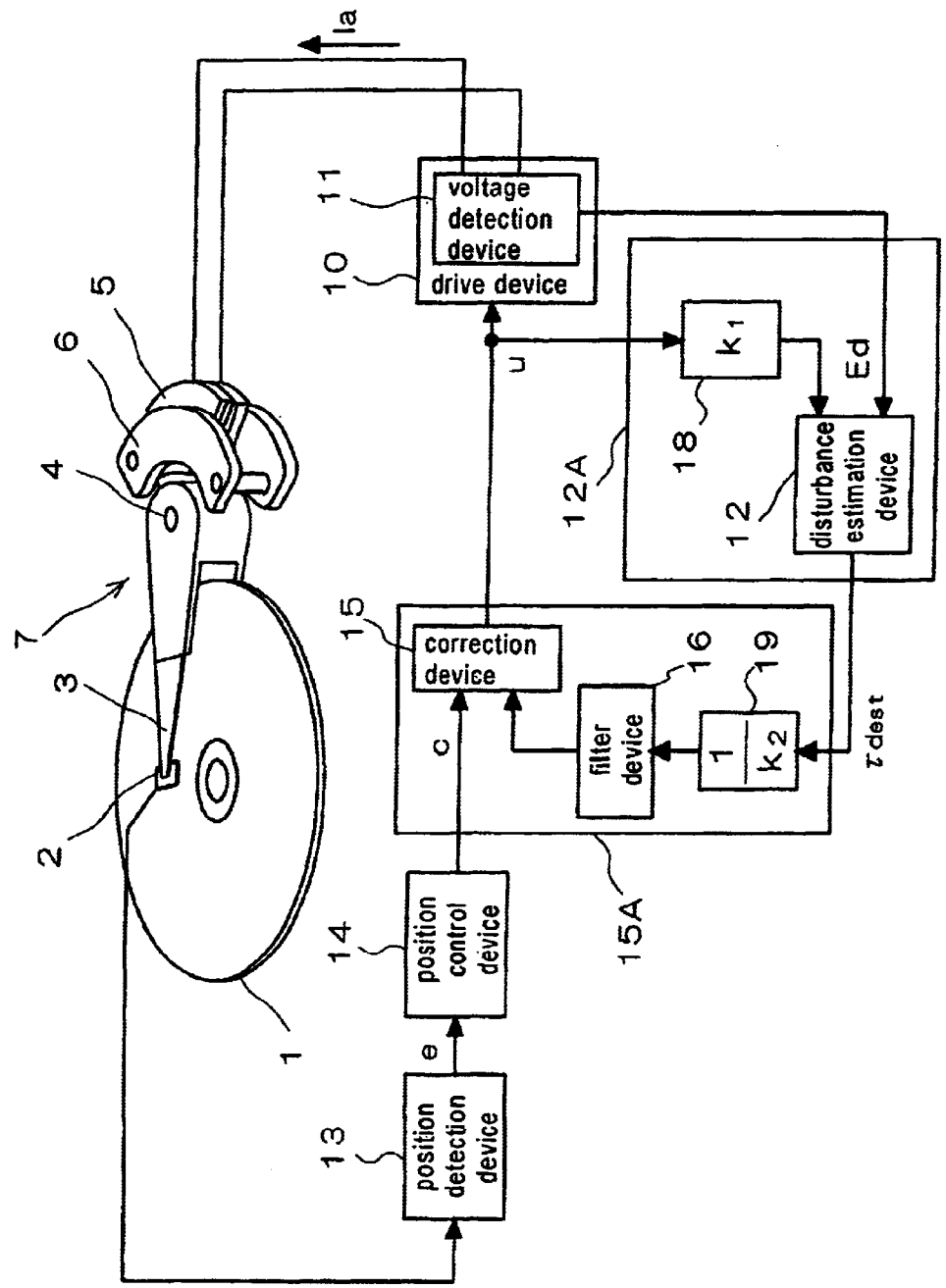
FIG. 24 is a block diagram showing the configuration of a disk storage apparatus in an embodiment which is a combination of the first and third embodiments according to the present invention.

The following embodiments may be employed besides the above-mentioned embodiments. As shown in FIG. 24, the first and third embodiments may be combined. As shown in FIG. 25, the second and fourth embodiments may be combined. That is, in either embodiment, the filter device 16 for cutting off the high frequency components of the disturbance estimation signal $\tau_{dest}$ is added to the correction device 15A.

In the disk storage apparatus in the first to fourth embodiment explained so far, the multipliers and integrators are configured by analog filters. Alternatively, they can be configured by digital filters. Further, the respective components constituting the positioning control system in each embodiment may be embodied in a software by a microcomputer.

While the disk storage apparatuses of the first to fourth embodiments have been explained as the magnetic disk storage apparatuses, the present invention is not limited to this, and can be applied to the other information recording apparatuses such as an optical disk storage apparatus and a magneto-optical disk storage apparatus.

As stated so far, according to the disk storage apparatus of the present invention, to estimate the disturbance such as a pivot bearing friction, an elastic force or an inertia force exerted on the actuator device, the disturbance estimation signal is produced by combining one of the drive signal and the position control signal with the voltage signal induced across the drive coil of the actuator device. Since the voltage signal is a continuous signal, it is possible to correctly detect the disturbance, compared with the conventional art using discrete servo information. Accordingly, even if the fluctuation of the disturbance during following operation directed toward the target track is large, it is possible to surely compensate this fluctuation and to improve the positioning accuracy of the head with respect to the target track. Besides, by negating the inertia force exerted on the actuator device due to shock/vibration from the outside, it is possible to improve the shock resistance characteristic of the disk storage apparatus and to stably implement head positioning control.

According to the disk storage apparatus of the present invention, besides the above-stated functions and effects, to produce the drive signal based on the position control signal for the head position and the disturbance estimation signal, the high frequency components of the disturbance estimation signal are cut off by the filter device to thereby produce a filter signal, and the filter signal is combined with the position control signal for the head position to thereby produce the drive signal. Therefore, it is possible to stabilize the positioning control system even if the coil resistance of the drive coil of the actuator device is not equal to the nominal value due to the change of the resistance value by the resistance fluctuation or temperature rise.

Moreover, the disturbance estimation device is configured to produce the disturbance estimation signal based on the signal obtained by multiplying the drive signal or position control signal by $k_1$ and the voltage signal, and the correction device is configured to produce the drive signal by combining the signal obtained by multiplying the disturbance estimation signal by $1/k_2$ with the position control signal ($k_1 \gg 1$, $k_2 \gg 1$). By so configuring, it is possible to stabilize the positioning control system even if the coil resistance of the drive coil of the actuator device is not equal to the nominal value due to the change of the resistance value by the resistance fluctuation or temperature rise.

Hence, particularly if the influence of the disturbance, which is exerted on the actuator device, on the positioning control system increases as the actuator device is made small in size and light in weight and the resistance fluctuation of the drive coil and the change of the resistance value occur, the disk storage apparatus of the present invention can deal with more diverse conditional changes by improving the head positioning accuracy and improve the track density compared from the conventional apparatus. It is, therefore, possible to realize a large capacity disk storage apparatus.

What is claimed is:

1. A disk storage apparatus comprising:
    actuator for positioning a head with respect to a disk;
    drive for driving said actuator in accordance with an input drive signal;
    voltage detection for detecting a voltage induced in driving said actuator, and for outputting a voltage signal;
    disturbance estimation for estimating a magnitude of a disturbance exerted on said head from said drive signal and said voltage signal, and for producing a disturbance estimation signal;
    filter for cutting off a high frequency component of said disturbance estimation signal, and for outputting a filter signal;
    position detection for producing a position error signal corresponding to a current position of said head from servo information previously recorded on said disk and detected by said head, and for outputting the position error signal;
    position control for producing a position control signal corresponding to said position error signal, and for outputting the position control signal; and
    correction for combining said position control signal with said filter signal to produce said drive signal, and for outputting the drive signal.

2. A disk storage apparatus according to claim 1, wherein said disturbance estimation comprises:
    comparison for receiving the voltage signal detected by said voltage detection;
    first multiplication for multiplying said drive signal by a coefficient consisting of a first transfer function;
    second multiplication for multiplying an output of said comparison by a coefficient consisting of a second transfer function;
    first integration for integrating the output of said comparison; and
    second integration for integrating a value obtained by subtracting the added value of the output of said second multiplication and the output of said first integration from the output of said first multiplication, and
    said comparison compares said voltage signal with the output of said second integration, and outputs a comparison result to said second multiplication and said first integration.

3. A disk storage apparatus according to claim 1, wherein an estimation frequency of said disturbance estimation signal produced by said disturbance estimation is set at a value higher than a control frequency band of said position control.

4. A disk storage apparatus according to claim 1, wherein a cut-off frequency of said filter is set at a value lower than a control band of said position control.

5. A disk storage apparatus according to claim 1, wherein said actuator is configured by a permanent magnet fixedly attached to at least one yoke of a pair of yokes in a cavity of the pair of yokes opposite to each other through the cavity, and a drive coil provided in a magnetic cavity formed by said permanent magnet and said yokes,
    a circuit having a capacitor and a resistor connected in series, is connected to said drive coil in parallel,
    said capacitor and said resistor connected to said drive coil in parallel are set to have a capacitance value C and a resistance value r as expressed by $$C=La/Ra^2, \text{ and } r=Ra, \text{ or}$$

approximate to $C=La/Ra^2$, and $r=Ra$, respectively.

6. A disk storage apparatus comprising:
    actuator for positioning a head with respect to a disk;
    drive for driving said actuator in accordance with an input drive signal;
    voltage detection for detecting a voltage induced in driving said actuator, and for outputting a voltage signal;
    position detection for producing a position error signal corresponding to a current position of said head from servo information previously recorded on said disk and detected by said head, and for outputting the position error signal;
    position control for producing a position control signal corresponding to said position error signal, and for outputting the position control signal;
    disturbance estimation for estimating a magnitude of a disturbance exerted on said head from said voltage signal and said position control signal, and for producing a disturbance estimation signal;
    filter for cutting off a high frequency component of said disturbance estimation signal, and for outputting a filter signal; and
    correction for combining said position control signal with said filter signal to produce said drive signal, and for outputting the drive signal.

7. A disk storage apparatus according to claim 6, wherein said disturbance estimation comprises:
    comparison for receiving the voltage signal detected by said voltage detection;
    first multiplication for multiplying said position control signal by a coefficient consisting of a first transfer function;
    second multiplication for multiplying an output of said comparison by a coefficient consisting of a second transfer function;
    first integration for integrating the output of said comparison; and
    second integration for integrating a value obtained by subtracting the output of said second multiplication from the output of said first multiplication, and said comparison compares said voltage signal with the output of said second integration, and outputs a comparison result to said second multiplication and said first integration.

8. A disk storage apparatus according to claim 6, wherein an estimation frequency of said disturbance estimation signal produced by said disturbance estimation is set at a value higher than a control frequency band of said position control.

9. A disk storage apparatus according to claim 6, wherein a cut-off frequency of said filter is set at a value smaller than a control band of said position control.

10. A disk storage apparatus according to claim 6, wherein said actuator is configured by a permanent magnet fixedly attached to at least one yoke of a pair of yokes in a cavity of the pair of yokes opposite to each other through the cavity, and a drive coil provided in a magnetic cavity formed by said permanent magnet and said yokes, a circuit having a capacitor and a resistor connected in series, is connected to said drive coil in parallel, said capacitor and said resistor connected to said drive coil in parallel are set to have a capacitance value C and a resistance value r as expressed by $C = La/Ra^2$, and $r = Ra$, respectively.

11. A disk storage apparatus comprising:

actuator for positioning a head with respect to a disk;

drive for driving said actuator in accordance with an input drive signal;

voltage detection for detecting a voltage induced in driving said actuator, and for outputting a voltage signal;

disturbance estimation for estimating a magnitude of a disturbance exerted on said head from a signal obtained by multiplying said drive signal by $k_1$, where $k_1$ is a coefficient of a real number not smaller than 1, and from said voltage signal, and for producing a disturbance estimation signal;

position detection for producing a position error signal corresponding to a current position of said head from servo information previously recorded on said disk and detected by said head, and for outputting the position error signal;

position control for producing a position control signal corresponding to said position error signal, and for outputting the position control signal; and correction for receiving said position control signal and said disturbance estimation signal, combining a signal obtained by multiplying said disturbance estimation signal by $1/k_2$, where $k_2$ is a coefficient of a real number greater than 1, with said position control signal to produce said drive signal, and for outputting the drive signal.

12. A disk storage apparatus according to claim 11, wherein said coefficients $k_1$ and $k_2$ are set almost equal to each other.

13. A disk storage apparatus according to claim 11, wherein said disturbance estimation comprises:

comparison for receiving the voltage signal detected by said voltage detection;

first multiplication for multiplying the signal, which is obtained by multiplying said drive signal by $k_1$, by a coefficient consisting of a first transfer function;

second multiplication for multiplying an output of said comparison by a coefficient consisting of a second transfer function;

first integration for integrating the output of said comparison; and second integration for integrating a value obtained by subtracting the added value of the output of said second multiplication and the output of said first integration from the output of said first multiplication, and said comparison compares said voltage signal with the output of said second integration, and outputs a comparison result to said second multiplication and said first integration.

14. A disk storage apparatus according to claim 11, wherein an estimation frequency of said disturbance estimation signal produced by said disturbance estimation is set at a value higher than a control frequency band of said position control.

15. A disk storage apparatus comprising:

actuator for positioning a head with respect to a disk;

drive for driving said actuator in accordance with an input drive signal;

voltage detection for detecting a voltage induced in driving said actuator, and for outputting a voltage signal;

position detection for producing a position error signal corresponding to a current position of said head from servo information previously recorded on said disk and detected by said head, and for outputting the position error signal;

position control for producing a position control signal corresponding to said position error signal, and for outputting the position control signal;

disturbance estimation for estimating a magnitude of a disturbance exerted on said head from a signal obtained by multiplying said position control signal by $k_1$, where k1 is a coefficient of a real number greater than 1, and from said voltage signal, and for producing a disturbance estimation signal; and correction for receiving said position control signal and said disturbance estimation signal, combining a signal obtained by multiplying said disturbance estimation signal by $1/k_2$, where $k_2$ is a coefficient of a real number greater than 1, with said position control signal to produce said drive signal, and for outputting the drive signal.

16. A disk storage apparatus according to claim 15, wherein said coefficients $k_1$ and $k_2$ are set almost equal to each other.

17. A disk storage apparatus according to claim 15, wherein said disturbance estimation comprises:

comparison for receiving the voltage signal detected by said voltage detection;

first multiplication for multiplying the signal, which is obtained by multiplying said position control signal by $k_1$, by a coefficient consisting of a first transfer function;

second multiplication for multiplying an output of said comparison by a coefficient consisting of a second transfer function;

first integration for integrating the output of said comparison; and second integration for integrating a value obtained by subtracting the output of said second multiplication from the output of said first multiplication, and said comparison compares said voltage signal with the output of said second integration, and outputs a comparison result to said second multiplication and said first integration.

18. A disk storage apparatus according to claim 15, wherein an estimation frequency of said disturbance estimation signal produced by said disturbance estimation is set at a value higher than a control frequency band of said position control.

19. A disk storage apparatus comprising:

actuator for positioning a head with respect to a disk;

drive for driving said actuator in accordance with an input drive signal;

voltage detection for detecting a voltage induced in driving said actuator, and for outputting a voltage signal;

disturbance estimation for estimating a magnitude of a disturbance exerted on said head from a signal obtained by multiplying said drive signal by $k_1$, where $k_1$ is a coefficient of a real number greater than 1, and from said voltage signal, and for producing a disturbance estimation signal;

position detection for producing a position error signal corresponding to a current position of said head from servo information previously recorded on said disk and detected by said head, and for outputting the position error signal;

position control for producing a position control signal corresponding to said position error signal, and for outputting the position control signal; and correction for receiving said position control signal and said disturbance estimation signal, cutting off a high frequency component of a signal, which is obtained by multiplying said disturbance estimation signal by $1/k_2$, where $k_2$ is a coefficient of a real number greater than 1, to produce a filter signal, combining said position control signal with said filter signal to produce said drive signal, and for outputting the drive signal.

20. A disk storage apparatus according to claim 15, wherein said coefficients $k_1$ and $k_2$ are set almost equal to each other.

21. A disk storage apparatus according to claim 19, wherein said disturbance estimation comprises:
  comparison for receiving the voltage signal detected by said voltage detection;
  first multiplication for multiplying the signal, which is obtained by multiplying said drive signal by $k_1$, by a coefficient consisting of a first transfer function;
  second multiplication for multiplying an output of said comparison by a coefficient consisting of a second transfer function;
  first integration for integrating the output of said comparison; and
  second integration for integrating a value obtained by subtracting an added value of the output of said second multiplication and the output of said first integration from the output of said first multiplication, and
  said comparison compares said voltage signal with the output of said second integration, and outputs a comparison result to said second multiplication and said first integration.

22. A disk storage apparatus according to claim 19, wherein an estimation frequency of said disturbance estimation signal produced by said disturbance estimation is set at a value higher than a control frequency band of said position control.

23. A disk storage apparatus according to claim 19, wherein a cut-off frequency of the filter signal of said correction is set at a value smaller than a control frequency band of said position control.

24. A disk storage apparatus comprising:

actuator for positioning a head with respect to a disk;

drive for driving said actuator in accordance with an input drive signal;

voltage detection for detecting a voltage induced in driving said actuator, and for outputting a voltage signal;

position detection for producing a position error signal corresponding to a current position of said head from servo information previously recorded on said disk and detected by said head, and for outputting the position error signal;

position control for producing a position control signal corresponding to said position error signal, and for outputting the position control signal;

disturbance estimation for estimating a magnitude of a disturbance exerted on said head from a signal obtained by multiplying said position control signal by $k_1$, where $k_1$ is a coefficient of a real number greater than 1, and from said voltage signal, and for producing a disturbance estimation signal; and correction for receiving said position control signal and said disturbance estimation signal, cutting off a high frequency component of a signal, which is obtained by multiplying said disturbance estimation signal by $1/k_2$, where $k_2$ is a coefficient of a real number greater than 1, to produce a filter signal, combining said position control signal with said filter signal to produce said drive signal, and for outputting the drive signal.

25. A disk storage apparatus according to claim 24, wherein said coefficients $k_1$ and $k_2$ are set almost equal to each other.

26. A disk storage apparatus according to claim 24, wherein said disturbance estimation comprises:
  comparison for receiving the voltage signal detected by said voltage detection;
  first multiplication for multiplying the signal, which is obtained by multiplying said position control signal by $k_1$, by a coefficient consisting of a first transfer function;
  second multiplication for multiplying an output of said comparison by a coefficient consisting of a second transfer function;
  first integration for integrating the output of said comparison; and
  second integration for integrating a value obtained by subtracting the output of said second multiplication from the output of said first multiplication, and
  said comparison compares said voltage signal with the output of said second integration, and outputs a comparison result to said second multiplication and said first integration.

27. A disk storage apparatus according to claim 24, wherein an estimation frequency of said disturbance estimation signal produced by said disturbance estimation is set at a value higher than a control frequency band of said position control.

28. A disk storage apparatus according to claim 24, wherein a cut-off frequency of the filter signal of said correction is set at a value lower than a control frequency band of said position control.

29. A disk storage apparatus control method comprising the steps of:

producing a position error signal corresponding to a current position of a head from servo information previously recorded on a disk and detected by said head;

producing a position control signal corresponding to said position error signal; and estimating a magnitude of a disturbance exerted on said head from a drive signal of actuator for positioning said head and from a voltage signal induced in driving said actuator, and producing a disturbance estimation signal;

cutting off a high frequency component of said disturbance estimation signal, and producing a filter signal;

combining said position control signal with said filter signal, and producing said drive signal; and positioning said head with respect to said disk by said drive signal.

30. A disk storage apparatus control method according to claim 29, wherein an estimation frequency of said disturbance estimation signal is set at a value higher than a control frequency band of said position control signal.

31. A disk storage apparatus control method, comprising the steps of:

producing a position error signal corresponding to a current position of a head from servo information previously recorded on a disk and detected by said head;

producing a position control signal corresponding to said position error signal; and estimating a magnitude of a disturbance exerted on said head from said position control signal and a voltage signal induced in driving said actuator, and producing a disturbance estimation signal;

cutting off a high frequency component of said disturbance estimation signal, and producing a filter signal;

combining said position control signal with said filter signal, and producing said drive signal; and positioning said head with respect to said disk by said drive signal.

32. A disk storage apparatus control method according to claim 31, wherein an estimation frequency of said disturbance estimation signal is set at a value higher than a control frequency band of said position control signal.

33. A disk storage apparatus control method, comprising the steps of:

producing a position error signal corresponding to a current position of a head from servo information previously recorded on a disk and detected by said head;

producing a position control signal corresponding to said position error signal; and estimating a magnitude of a disturbance exerted on said head from a signal obtained by multiplying a drive signal of actuator for positioning said head by $k_1$, where $k_1$ is a coefficient of a real number not smaller than 1, and from a voltage signal induced in driving said actuator, and producing a disturbance estimation signal;

combining a signal obtained by multiplying said disturbance estimation signal by $1/k_2$, where $k_2$ is a coefficient of a real number greater than 1, with said position control signal, and producing said drive signal; and positioning said head with respect to said disk by said drive signal.

34. A disk storage apparatus control method according to claim 33, wherein said coefficients $k_1$ and $k_2$ are set almost equal to each other.

35. A disk storage apparatus control method according to claim 33, wherein an estimation frequency of said disturbance estimation signal is set at a value higher than a control frequency band of said position control signal.

36. A disk storage apparatus control method, comprising the steps of:

producing a position error signal corresponding to a current position of a head from servo information previously recorded on a disk and detected by said head;

producing a position control signal corresponding to said position error signal;

estimating a magnitude of a disturbance exerted on said head from a signal obtained by multiplying said position control signal by $k_1$, where $k_1$ is a coefficient of a real number greater than 1, and from a voltage signal induced in driving actuator, and producing a disturbance estimation signal;

combining a signal obtained by multiplying said disturbance estimation signal by $1/k_2$, where $k_2$ is a coefficient of a real number greater than 1, with said position control signal, and producing said drive signal; and positioning said head with respect to said disk by said drive signal.

37. A disk storage apparatus control method according to claim 36, wherein said coefficients $k_1$ and $k_2$ are set almost equal to each other.

38. A disk storage apparatus control method according to claim 36, wherein an estimation frequency of said disturbance estimation signal is set at a value higher than a control frequency band of said position control signal.

39. A disk storage apparatus control method, comprising the steps of:

producing a position error signal corresponding to a current position of a head from servo information previously recorded on a disk and detected by said head;

producing a position control signal corresponding to said position error signal; and estimating a magnitude of a disturbance exerted on said head from a signal obtained by multiplying a drive signal of actuator for positioning said head by $k_1$, where $k_1$ is a coefficient of a real number greater than 1, and from a voltage signal induced in driving said actuator, and producing a disturbance estimation signal;

cutting off a high frequency component of a signal, which is obtained by multiplying said disturbance estimation signal by $1/k_2$, where $k_2$ is a coefficient of a real number greater than 1, and producing a filter signal;

combining said position control signal with said filter signal, and producing said drive signal; and positioning said head with respect to said disk by said drive signal.

40. A disk storage apparatus control method according to claim 39, wherein said coefficients $k_1$ and $k_2$ are set almost equal to each other.

41. A disk storage apparatus control method according to claim 39, wherein an estimation frequency of said disturbance estimation signal is set at a value higher than a control frequency band of said position control signal.

42. A disk storage apparatus control method, comprising the steps of:

producing a position error signal corresponding to a current position of a head from servo information previously recorded on a disk and detected by said head;

producing a position control signal corresponding to said position error signal; and estimating a magnitude of a disturbance exerted on said head from a signal obtained by multiplying said position control signal by $k_1$, where $k_1$ is a coefficient of a real number greater than 1, and from a voltage signal induced in driving actuator, and producing a disturbance estimation signal;

cutting off a high frequency component of a signal, which is obtained by multiplying said disturbance estimation signal by $1/k_2$, where $k_2$ is a coefficient of a real number greater than 1, and producing a filter signal;

combining said position control signal with said filter signal, and producing said drive signal; and positioning said head with respect to said disk by said drive signal.

43. A disk storage apparatus control method according to claim 42, wherein said coefficients $k_1$ and $k_2$ are set almost equal to each other.

44. A disk storage apparatus control method according to claim 42, wherein an estimation frequency of said disturbance estimation signal is set at a value higher than a control frequency band of said position control signal.

* * * * *

UNITED STATES PATENT AND TRADEMARK OFFICE
CERTIFICATE OF CORRECTION

PATENT NO. : 6,950,274 B2
APPLICATION NO. : 10/305366
DATED : September 27, 2005
INVENTOR(S) : Toshio et al.

It is certified that error appears in the above-identified patent and that said Letters Patent is hereby corrected as shown below:

DELETE CLAIMS 1 – 11, COLUMNS 35 LINES 25 THRU 67; COLUMNS 36-37 LINES 1 THRU 55 WITH CLAIMS 1 – 11 AS SHOWN BELOW

1. A disk storage apparatus comprising:

an actuator device for positioning a head with respect to a disk;

a drive device for driving said actuator device in accordance with an input drive signal;

a voltage detection device for detecting a voltage induced in driving said actuator device, and for outputting a voltage signal;

a disturbance estimation device for estimating a magnitude of a disturbance exerted on said head from said drive signal and said voltage signal, and for producing a disturbance estimation signal;

a filter device for cutting off a high frequency component of said disturbance estimation signal, and for outputting a filter signal;

a position detection device for producing a position error signal corresponding to a current position of said head from servo information previously recorded on said disk and detected by said head, and for outputting the position error signal;

a position control device for producing a position control signal corresponding to said position error signal, and for outputting the position control signal; and a correction device for combining said position control signal with said filter signal to produce said drive signal, and for outputting the drive signal.

2. A disk storage apparatus according to claim 1, wherein said disturbance estimation device comprises:

a comparison device for receiving the voltage signal detected by said voltage detection device;

a first multiplication device for multiplying said drive signal by a coefficient consisting of a first transfer function;

a second multiplication device for multiplying an output of said comparison device by a coefficient consisting of a second transfer function;

a first integration device for integrating the output of said comparison device; and a second integration device for integrating a value obtained by subtracting the added value of the output of said second multiplication device and the output of said first integration device from the output of said first multiplication device, and said comparison device compares said voltage signal with the output of said second integration device, and outputs a comparison result to said second multiplication device and said first integration device.

UNITED STATES PATENT AND TRADEMARK OFFICE
CERTIFICATE OF CORRECTION

PATENT NO. : 6,950,274 B2
APPLICATION NO. : 10/305366
DATED : September 27, 2005
INVENTOR(S) : Toshio et al.

It is certified that error appears in the above-identified patent and that said Letters Patent is hereby corrected as shown below:

3. A disk storage apparatus according to claim 1, wherein an estimation frequency of said disturbance estimation signal produced by said disturbance estimation device is set at a value higher than a control frequency band of said position control device.

4. A disk storage apparatus according to claim 1, wherein a cut-off frequency of said filter device is set at a value lower than a control band of said position control device.

5. A disk storage apparatus according to claim 1, wherein said actuator device is configured by a permanent magnet fixedly attached to at least one yoke of a pair of yokes in a cavity of the pair of yokes opposite to each other through the cavity, and a drive coil provided in a magnetic cavity formed by said permanent magnet and said yokes, a circuit having a capacitor and a resistor connected in series, is connected to said drive coil in parallel, said capacitor and said resistor connected to said drive coil in parallel are set to have a capacitance value C and a resistance value r as expressed by $C = La/Ra^2$, and $r = Ra$, or approximate to $C = La/Ra^2$, and $r = Ra$, respectively.

6. A disk storage apparatus, comprising:

an actuator device for positioning a head with respect to a disk;

a drive device for driving said actuator device in accordance with an input drive signal;

a voltage detection device for detecting a voltage induced in driving said actuator device, and for outputting a voltage signal;

a position detection device for producing a position error signal corresponding to a current position of said head from servo information previously recorded on said disk and detected by said head, and for outputting the position error signal;

a position control device for producing a position control signal corresponding to said position error signal, and for outputting the position control signal;

a disturbance estimation device for estimating a magnitude of a disturbance exerted on said head from said voltage signal and said position control signal, and for producing a disturbance estimation signal;

a filter device for cutting off a high frequency component of said disturbance estimation signal, and for outputting a filter signal; and a correction device for combining said position control signal with said filter signal to produce said drive signal, and for outputting the drive signal.

UNITED STATES PATENT AND TRADEMARK OFFICE
CERTIFICATE OF CORRECTION

PATENT NO. : 6,950,274 B2
APPLICATION NO. : 10/305366
DATED : September 27, 2005
INVENTOR(S) : Toshio et al.

It is certified that error appears in the above-identified patent and that said Letters Patent is hereby corrected as shown below:

7. A disk storage apparatus according to claim 6, wherein said disturbance estimation device comprises:

a comparison device for receiving the voltage signal detected by said voltage detection device;

a first multiplication device for multiplying said position control signal by a coefficient consisting of a first transfer function;

a second multiplication device for multiplying an output of said comparison device by a coefficient consisting of a second transfer function;

a first integration device for integrating the output of said comparison device; and a second integration device for integrating a value obtained by subtracting the output of said second multiplication device from the output of said first multiplication device, and said comparison device compares said voltage signal with the output of said second integration device, and outputs a comparison result to said second multiplication device and said first integration device.

8. A disk storage apparatus according to claim 6, wherein an estimation frequency of said disturbance estimation signal produced by said disturbance estimation device is set at a value higher than a control frequency band of said position control device.

9. A disk storage apparatus according to claim 6, wherein a cut-off frequency of said filter device is set at a value smaller than a control band of said position control device.

10. A disk storage apparatus according to claim 6, wherein said actuator device is configured by a permanent magnet fixedly attached to at least one yoke of a pair of yokes in a cavity of the pair of yokes opposite to each other through the cavity, and a drive coil provided in a magnetic cavity formed by said permanent magnet and said yokes, a circuit having a capacitor and a resistor connected in series, is connected to said drive coil in parallel, said capacitor and said resistor connected to said drive coil in parallel are set to have a capacitance value C and a resistance value r as expressed by $C=La/Ra^2$, and $r=Ra$, or approximate to $C=La/Ra^2$, and $r=Ra$, respectively.

UNITED STATES PATENT AND TRADEMARK OFFICE
CERTIFICATE OF CORRECTION

PATENT NO. : 6,950,274 B2
APPLICATION NO. : 10/305366
DATED : September 27, 2005
INVENTOR(S) : Toshio et al.

It is certified that error appears in the above-identified patent and that said Letters Patent is hereby corrected as shown below:

11. A disk storage apparatus comprising:

an actuator device for positioning a head with respect to a disk;

a drive device for driving said actuator device in accordance with an input drive signal;

a voltage detection device for detecting a voltage induced in driving said actuator device, and for outputting a voltage signal;

a disturbance estimation device for estimating a magnitude of a disturbance exerted on said head from a signal obtained by multiplying said drive signal by $k_1$, where $k_1$ is a coefficient of a real number not smaller than 1, and from said voltage signal, and for producing a disturbance estimation signal;

a position detection device for producing a position error signal corresponding to a current position of said head from servo information previously recorded on said disk and detected by said head, and for outputting the position error signal;

a position control device for producing a position control signal corresponding to said position error signal, and for outputting the position control signal; and a correction device for receiving said position control signal and said disturbance estimation signal, combining a signal obtained by multiplying said disturbance estimation signal by $1/k_2$, where $k_2$ is a coefficient of a real number greater than 1, with said position control signal to produce said drive signal, and for outputting the drive signal.

DELETE CLAIMS 13 – 15, COLUMNS 37 LINE 60 THRU COLUMN 38 LINE 49 WITH CLAIMS 13 – 15 AS SHOWN BELOW

13. A disk storage apparatus according to claim 11, wherein said disturbance estimation device comprises:

a comparison device for receiving the voltage signal detected by said voltage detection device;

a first multiplication device for multiplying the signal, which is obtained by multiplying said drive signal by $k_1$, by a coefficient consisting of a first transfer function;

a second multiplication device for multiplying an output of said comparison device by a coefficient consisting of a second transfer function;

a first integration device for integrating the output of said comparison device; and a second integration device for integrating a value obtained by subtracting the added value of the output of said second multiplication device and the output of said first integration device from the output of said first multiplication device, and said comparison device compares said voltage signal with the output of said second integration device, and outputs a comparison result to said second multiplication device and said first integration device.

UNITED STATES PATENT AND TRADEMARK OFFICE
CERTIFICATE OF CORRECTION

PATENT NO.         : 6,950,274 B2
APPLICATION NO. : 10/305366
DATED                  : September 27, 2005
INVENTOR(S)       : Toshio et al.

It is certified that error appears in the above-identified patent and that said Letters Patent is hereby corrected as shown below:

14. A disk storage apparatus according to claim 11, wherein
an estimation frequency of said disturbance estimation signal produced by said disturbance estimation device is set at a value higher than a control frequency band of said position control device.

15. A disk storage apparatus comprising:
an actuator device for positioning a head with respect to a disk;
a drive device for driving said actuator device in accordance with an input drive signal;
a voltage detection device for detecting a voltage induced in driving said actuator device, and for outputting a voltage signal;
a position detection device for producing a position error signal corresponding to a current position of said head from servo information previously recorded on said disk and detected by said head, and for outputting the position error signal;
a position control device for producing a position control signal corresponding to said position error signal, and for outputting the position control signal;
a disturbance estimation device for estimating a magnitude of a disturbance exerted on said head from a signal obtained by multiplying said position control signal by $k_1$, where k1 is a coefficient of a real number greater than 1, and from said voltage signal, and for producing a disturbance estimation signal; and
a correction device for receiving said position control signal and said disturbance estimation signal, combining a signal obtained by multiplying said disturbance estimation signal by $1/k_2$, where $k_2$ is a coefficient of a real number greater than 1, with said position control signal to produce said drive signal, and for outputting the drive signal.

UNITED STATES PATENT AND TRADEMARK OFFICE
CERTIFICATE OF CORRECTION

PATENT NO. : 6,950,274 B2
APPLICATION NO. : 10/305366
DATED : September 27, 2005
INVENTOR(S) : Toshio et al.

It is certified that error appears in the above-identified patent and that said Letters Patent is hereby corrected as shown below:

DELETE CLAIMS 17 – 19, COLUMNS 38 LINE 54 THRU COLUMN 39 LINE 43 WITH CLAIMS 17 - 19 AS SHOWN BELOW

17. A disk storage apparatus according to claim 15, wherein
    said disturbance estimation device comprises:
    a comparison device for receiving the voltage signal detected by said voltage detection device;
    a first multiplication device for multiplying the signal, which is obtained by multiplying said position control signal by $k_1$, by a coefficient consisting of a first transfer function;
    a second multiplication device for multiplying an output of said comparison device by a coefficient consisting of a second transfer function;
    a first integration device for integrating the output of said comparison device; and
    a second integration device for integrating a value obtained by subtracting the output of said second multiplication device from the output of said first multiplication device, and
    said comparison device compares said voltage signal with the output of said second integration device, and outputs a comparison result to said second multiplication device and said first integration device.

18. A disk storage apparatus according to claim 15, wherein
    an estimation frequency of said disturbance estimation signal produced by said disturbance estimation device is set at a value higher than a control frequency band of said position control device.

19. A disk storage apparatus comprising:
    an actuator device for positioning a head with respect to a disk;
    a drive device for driving said actuator device in accordance with an input drive signal;
    a voltage detection device for detecting a voltage induced in driving said actuator device, and for outputting a voltage signal;
    a disturbance estimation device for estimating a magnitude of a disturbance exerted on said head from a signal obtained by multiplying said drive signal by $k_1$, where $k_1$ is a coefficient of a real number greater than 1, and from said voltage signal, and for producing a disturbance estimation signal;
    a position detection device for producing a position error signal corresponding to a current position of said head from servo information previously recorded on said disk and detected by said head, and for outputting the position error signal;
    a position control device for producing a position control signal corresponding to said position error signal, and for outputting the position control signal; and
    a correction device for receiving said position control signal and said disturbance estimation signal, cutting off a high frequency component of a signal, which is obtained by multiplying said disturbance estimation signal by $1/k_2$, where $k_2$ is a coefficient of a real number greater than 1, to produce a filter signal, combining said position control signal with said filter signal to produce said drive signal, and for outputting the drive signal.

UNITED STATES PATENT AND TRADEMARK OFFICE
CERTIFICATE OF CORRECTION

PATENT NO. : 6,950,274 B2
APPLICATION NO. : 10/305366
DATED : September 27, 2005
INVENTOR(S) : Toshio et al.

It is certified that error appears in the above-identified patent and that said Letters Patent is hereby corrected as shown below:

DELETE CLAIMS 21 – 24, COLUMNS 39 LINE 48 THRU COLUMN 40 LINE 42 WITH CLAIMS 21- 24 AS SHOWN BELOW

21. A disk storage apparatus according to claim 19, wherein
   said disturbance estimation device comprises:
   a comparison device for receiving the voltage signal detected by said voltage detection device;
   a first multiplication device for multiplying the signal, which is obtained by multiplying said drive signal by $k_1$, by a coefficient consisting of a first transfer function;
   a second multiplication device for multiplying an output of said comparison device by a coefficient consisting of a second transfer function;
   a first integration device for integrating the output of said comparison device; and
   a second integration device for integrating a value obtained by subtracting an added value of the output of said second multiplication device and the output of said first integration device from the output of said first multiplication device, and
   said comparison device compares said voltage signal with the output of said second integration device, and outputs a comparison result to said second multiplication device and said first integration device.

22. A disk storage apparatus according to claim 19, wherein
   an estimation frequency of said disturbance estimation signal produced by said disturbance estimation device is set at a value higher than a control frequency band of said position control device.

23. A disk storage apparatus according to claim 19, wherein
   a cut-off frequency of the filter signal of said correction device is set at a value smaller than a control frequency band of said position control device.

24. A disk storage apparatus comprising:
   an actuator device for positioning a head with respect to a disk;
   a drive device for driving said actuator device in accordance with an input drive signal;
   a voltage detection device for detecting a voltage induced in driving said actuator device, and for outputting a voltage signal;
   a position detection device for producing a position error signal corresponding to a current position of said head from servo information previously recorded on said disk and detected by said head, and for outputting the position error signal;
   a position control device for producing a position control signal corresponding to said position error signal, and for outputting the position control signal;
   a disturbance estimation device for estimating a magnitude of a disturbance exerted on said head from a signal obtained by multiplying said position control signal by $k_1$, where $k_1$ is a

UNITED STATES PATENT AND TRADEMARK OFFICE
CERTIFICATE OF CORRECTION

PATENT NO. : 6,950,274 B2
APPLICATION NO. : 10/305366
DATED : September 27, 2005
INVENTOR(S) : Toshio et al.

It is certified that error appears in the above-identified patent and that said Letters Patent is hereby corrected as shown below:

coefficient of a real number greater than 1, and from said voltage signal, and for producing a disturbance estimation signal; and a correction device for receiving said position control signal and said disturbance estimation signal, cutting off a high frequency component of a signal, which is obtained by multiplying said disturbance estimation signal by $1/k_2$, where $k_2$ is a coefficient of a real number greater than 1, to produce a filter signal, combining said position control signal with said filter signal to produce said drive signal, and for outputting the drive signal.

DELETE CLAIMS 26 – 29, COLUMNS 40 LINE 47 THRU COLUMN 41 LINE 32 WITH CLAIMS 26 - 29 AS SHOWN BELOW

26. A disk storage apparatus according to claim 24, wherein
said disturbance estimation device comprises:
a comparison device for receiving the voltage signal detected by said voltage detection device;
a first multiplication device for multiplying the signal, which is obtained by multiplying said position control signal by $k_1$, by a coefficient consisting of a first transfer function;
a second multiplication device for multiplying an output of said comparison device by a coefficient consisting of a second transfer function;
a first integration device for integrating the output of said comparison device; and
a second integration device for integrating a value obtained by subtracting the output of said second multiplication device from the output of said first multiplication device, and
said comparison device compares said voltage signal with the output of said second integration device, and outputs a comparison result to said second multiplication device and said first integration device.

27. A disk storage apparatus according to claim 24, wherein
an estimation frequency of said disturbance estimation signal produced by said disturbance estimation device is set at a value higher than a control frequency band of said position control device.

28. A disk storage apparatus according to claim 24, wherein
a cut-off frequency of the filter signal of said correction device is set at a value lower than a control frequency band of said position control device.

UNITED STATES PATENT AND TRADEMARK OFFICE
CERTIFICATE OF CORRECTION

PATENT NO. : 6,950,274 B2
APPLICATION NO. : 10/305366
DATED : September 27, 2005
INVENTOR(S) : Toshio et al.

It is certified that error appears in the above-identified patent and that said Letters Patent is hereby corrected as shown below:

29. A disk storage apparatus control method comprising the steps of:

producing a position error signal corresponding to a current position of a head from servo information previously recorded on a disk and detected by said head;

producing a position control signal corresponding to said position error signal; and estimating a magnitude of a disturbance exerted on said head from a drive signal of an actuator device for positioning said head and from a voltage signal induced in driving said actuator device, and producing a disturbance estimation signal;

cutting off a high frequency component of said disturbance estimation signal, and producing a filter signal;

combining said position control signal with said filter signal, and producing said drive signal; and positioning said head with respect to said disk by said drive signal.

DELETE CLAIM 31 COLUMN 41, LINES 38 THRU 56 WITH CLAIM 31 AS SHOWN BELOW

31. A disk storage apparatus control method, comprising the steps of:

producing a position error signal corresponding to a current position of a head from servo information previously recorded on a disk and detected by said head;

producing a position control signal corresponding to said position error signal; and estimating a magnitude of a disturbance exerted on said head from said position control signal and a voltage signal induced in driving said actuator device, and producing a disturbance estimation signal;

cutting off a high frequency component of said disturbance estimation signal, and producing a filter signal;

combining said position control signal with said filter signal, and producing said drive signal; and positioning said head with respect to said disk by said drive signal.

DELETE CLAIM 33 COLUMN 41 THRU 41 LINES 62 –16 WITH CLAIM 33 AS SHOWN BELOW

33. A disk storage apparatus control method, comprising the steps of:

producing a position error signal corresponding to a current position of a head from servo information previously recorded on a disk and detected by said head;

producing a position control signal corresponding to said position error signal; and estimating a magnitude of a disturbance exerted on said head from a signal obtained by multiplying a drive signal of an actuator device for positioning said head by $k_1$, where $k_1$ is a coefficient of a real number not smaller than 1, and from a voltage signal induced in driving said actuator device, and producing a disturbance estimation signal;

UNITED STATES PATENT AND TRADEMARK OFFICE
CERTIFICATE OF CORRECTION

| | | |
|---|---|---|
| PATENT NO. | : 6,950,274 B2 | |
| APPLICATION NO. | : 10/305366 | |
| DATED | : September 27, 2005 | |
| INVENTOR(S) | : Toshio et al. | |

It is certified that error appears in the above-identified patent and that said Letters Patent is hereby corrected as shown below:

combining a signal obtained by multiplying said disturbance estimation signal by $1/k_2$, where $k_2$ is a coefficient of a real number greater than 1, with said position control signal, and producing said drive signal; and positioning said head with respect to said disk by said drive signal.

DELETE CLAIM 36 COLUMN 42 LINES 26 – 46 WITH CLAIM 36 AS SHOWN BELOW

36. A disk storage apparatus control method, comprising the steps of:

producing a position error signal corresponding to a current position of a head from servo information previously recorded on a disk and detected by said head;

producing a position control signal corresponding to said position error signal;

estimating a magnitude of a disturbance exerted on said head from a signal obtained by multiplying said position control signal by $k_1$, where $k_1$ is a coefficient of a real number greater than 1, and from a voltage signal induced in driving an actuator device, and producing a disturbance estimation signal;

combining a signal obtained by multiplying said disturbance estimation signal by $1/k_2$, where $k_2$ is a coefficient of a real number greater than 1, with said position control signal, and producing said drive signal; and positioning said head with respect to said disk by said drive signal.

DELETE CLAIM 39 COLUMN 42 – 43 LINES 56 – 11 WITH CLAIM 39 AS SHOWN BELOW

39. A disk storage apparatus control method, comprising the steps of:

producing a position error signal corresponding to a current position of a head from servo information previously recorded on a disk and detected by said head;

producing a position control signal corresponding to said position error signal; and estimating a magnitude of a disturbance exerted on said head from a signal obtained by multiplying a drive signal of an actuator device for positioning said head by $k_1$, where $k_1$ is a coefficient of a real number greater than 1, and from a voltage signal induced in driving said actuator device, and producing a disturbance estimation signal;

cutting off a high frequency component of a signal, which is obtained by multiplying said disturbance estimation signal by $1/k_2$, where $k_2$ is a coefficient of a real number greater than 1, and producing a filter signal;

combining said position control signal with said filter signal, and producing said drive signal; and positioning said head with respect to said disk by said drive signal.

UNITED STATES PATENT AND TRADEMARK OFFICE
CERTIFICATE OF CORRECTION

PATENT NO. : 6,950,274 B2
APPLICATION NO. : 10/305366
DATED : September 27, 2005
INVENTOR(S) : Toshio et al.

It is certified that error appears in the above-identified patent and that said Letters Patent is hereby corrected as shown below:

DELETE CLAIM 42 COLUMNS 43 – 44 LINES 22 – 16 WITH CLAIM 42 AS SHOWN BELOW

42. A disk storage apparatus control method, comprising the steps of:

producing a position error signal corresponding to a current position of a head from servo information previously recorded on a disk and detected by said head;

producing a position control signal corresponding to said position error signal; and estimating a magnitude of a disturbance exerted on said head from a signal obtained by multiplying said position control signal by $k_1$, where $k_1$ is a coefficient of a real number greater than 1, and from a voltage signal induced in driving an actuator device, and producing a disturbance estimation signal;

cutting off a high frequency component of a signal, which is obtained by multiplying said disturbance estimation signal by $1/k_2$, where $k_2$ is a coefficient of a real number greater than 1, and producing a filter signal;

combining said position control signal with said filter signal, and producing said drive signal; and positioning said head with respect to said disk by said drive signal.

Signed and Sealed this

Second Day of January, 2007

JON W. DUDAS
*Director of the United States Patent and Trademark Office*